United States Patent
Turgeman

(10) Patent No.: US 11,330,012 B2
(45) Date of Patent: *May 10, 2022

(54) SYSTEM, METHOD, AND DEVICE OF AUTHENTICATING A USER BASED ON SELFIE IMAGE OR SELFIE VIDEO

(71) Applicant: BioCatch Ltd., Tel Aviv (IL)

(72) Inventor: Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 72 days.

This patent is subject to a terminal disclaimer.

(21) Appl. No.: 17/089,846

(22) Filed: Nov. 5, 2020

(65) Prior Publication Data

US 2021/0051172 A1 Feb. 18, 2021

Related U.S. Application Data

(63) Continuation of application No. 16/512,399, filed on Jul. 16, 2019, now Pat. No. 10,917,431, which is a
(Continued)

(51) Int. Cl.
*G06F 7/04* (2006.01)
*H04L 29/06* (2006.01)
(Continued)

(52) U.S. Cl.
CPC .......... *H04L 63/1458* (2013.01); *G06F 3/041* (2013.01); *G06F 3/0488* (2013.01);
(Continued)

(58) Field of Classification Search
CPC ........ G06F 21/31; G06F 21/316; G06F 21/32; G06F 21/552; G06F 21/554;
(Continued)

(56) References Cited

U.S. PATENT DOCUMENTS 3,618,019 A 11/1971 Nemirovsky
3,699,517 A 10/1972 Dyche
(Continued)

FOREIGN PATENT DOCUMENTS

EP 2410450 A1 1/2012
EP 2477136 A1 7/2012
(Continued)

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.
(Continued)

*Primary Examiner* — Gary S Gracia
(74) *Attorney, Agent, or Firm* — Eitan Mehulal Sadot

(57) ABSTRACT

System, method, and device of detecting identity of a user and authenticating a user; as well as detecting a possible attacker or impostor, and differentiating among users of an electronic device or of a computerized service. A mobile or portable electronic device is utilized to capture a self-taken image or video of a user, which is utilized as a user-authentication factor. The accelerometer and gyroscope or device-orientation sensor of the mobile device, sense and measure spatial and physical device properties during, before or after the submission of the self-taken image or video. Based on such spatial and physical device properties, in combination with computer-vision analysis of the content shown in the self-taken image or video, the system determines liveness of the user and freshness of the submitted self-taken image or video, and differentiates between a legitimate user and an attacker.

21 Claims, 5 Drawing Sheets

Related U.S. Application Data continuation-in-part of application No. 15/294,951, filed on Oct. 17, 2016, now Pat. No. 10,395,018, which is a continuation-in-part of application No. 14/272,873, filed on Jun. 2, 2015, now Pat. No. 9,526,006, which is a continuation-in-part of application No. 14/566,723, filed on Dec. 11, 2014, now Pat. No. 9,071,969, which is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, which is a continuation-in-part of application No. 16/416,222, filed on May 19, 2019, now Pat. No. 10,747,305, which is a continuation-in-part of application No. 15/708,155, filed on Sep. 19, 2017, now Pat. No. 10,298,614, which is a continuation-in-part of application No. 15/422,479, filed on Feb. 2, 2017, now Pat. No. 9,779,423, which is a continuation-in-part of application No. 15/276,803, filed on Sep. 27, 2016, now Pat. No. 10,055,560, which is a continuation-in-part of application No. 14/325,398, filed on Jul. 8, 2014, now Pat. No. 9,477,826, which is a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942, said application No. 14/325,398 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, said application No. 15/422,479 is a continuation-in-part of application No. 15/210,221, filed on Jul. 14, 2016, now Pat. No. 9,674,218, which is a continuation of application No. 14/675,768, filed on Apr. 1, 2015, now Pat. No. 9,418,221, which is a continuation-in-part of application No. 14/566,723, filed on Dec. 11, 2014, now Pat. No. 9,071,969, which is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, said application No. 16/416,222 is a continuation-in-part of application No. 15/368,608, filed on Dec. 4, 2016, now Pat. No. 10,949,757, which is a continuation-in-part of application No. 15/001,259, filed on Jan. 20, 2016, now Pat. No. 9,541,995, which is a continuation of application No. 14/320,653, filed on Jul. 1, 2014, now Pat. No. 9,275,337, which is a continuation-in-part of application No. 13/922,271, filed on Jun. 20, 2013, now Pat. No. 8,938,787, and a continuation-in-part of application No. 13/877,676, filed as application No. PCT/IL2011/000907 on Nov. 29, 2011, now Pat. No. 9,069,942, said application No. 15/368,608 is a continuation-in-part of application No. 14/727,873, filed on Jun. 2, 2015, now Pat. No. 9,526,006, and a continuation-in-part of application No. 15/360,291, filed on Nov. 23, 2016, now Pat. No. 9,747,436, which is a continuation-in-part of application No. 14/718,096, filed on May 21, 2015, now Pat. No. 9,531,701, said application No. 16/512,399 is a continuation-in-part of application No. 16/242,015, filed on Jan. 8, 2019, now Pat. No. 10,685,355, which is a continuation-in-part of application No. 16/057,825, filed on Aug. 8, 2018, now Pat. No. 10,523,680, and a continuation-in-part of application No. 15/885,819, filed on Feb. 1, 2018, now Pat. No. 10,834,590, and a continuation-in-part of application No. 15/368,608, filed on Dec. 4, 2016, now Pat. No. 10,949,757.

(60) Provisional application No. 61/417,479, filed on Nov. 29, 2010, provisional application No. 62/308,878, filed on Mar. 16, 2016, provisional application No. 62/312,140, filed on Mar. 23, 2016, provisional application No. 61/843,915, filed on Jul. 9, 2013, provisional application No. 61/973,855, filed on Apr. 2, 2014, provisional application No. 62/621,600, filed on Jan. 25, 2018.

(51) Int. Cl.

| | |
|---|---|
| *G06F 21/55* | (2013.01) |
| *H04L 67/50* | (2022.01) |
| *H04L 67/306* | (2022.01) |
| *G06F 21/31* | (2013.01) |
| *G06F 21/32* | (2013.01) |
| *G06F 3/041* | (2006.01) |
| *G06F 3/0488* | (2022.01) |
| *G06Q 30/02* | (2012.01) |
| *G06F 15/16* | (2006.01) |
| *H04W 12/12* | (2021.01) |

(52) U.S. Cl.
CPC ............ *G06F 21/31* (2013.01); *G06F 21/316* (2013.01); *G06F 21/32* (2013.01); *G06F 21/552* (2013.01); *G06F 21/554* (2013.01); *G06Q 30/0248* (2013.01); *G06Q 30/0277* (2013.01); *H04L 63/08* (2013.01); *H04L 63/10* (2013.01); *H04L 63/1408* (2013.01); *H04L 67/22* (2013.01); *H04L 67/306* (2013.01); *G06F 2221/2133* (2013.01); *H04L 2463/102* (2013.01); *H04L 2463/144* (2013.01); *H04W 12/12* (2013.01)

(58) Field of Classification Search
CPC ............. G06F 2221/2133; G06F 3/041; G06F 3/0488; G06Q 30/0248; G06Q 30/0277; H04L 2463/102; H04L 2463/144; H04L 63/08; H04L 63/0861; H04L 63/10; H04L 63/1408; H04L 63/1458; H04L 67/22; H04L 67/306; H04W 12/12
See application file for complete search history.

(56) References Cited

U.S. PATENT DOCUMENTS

| | | |
|---|---|---|
| 3,983,535 A | 9/1976 | Herbst |
| 4,128,829 A | 12/1978 | Herbst |
| 4,621,334 A | 11/1986 | Garcia |
| 4,760,386 A | 7/1988 | Heath |
| 4,805,222 A | 2/1989 | Young |
| 5,305,238 A | 4/1994 | Starr |
| 5,442,342 A | 8/1995 | Kung |
| 5,485,171 A | 1/1996 | Copper |
| 5,557,686 A | 9/1996 | Brown |
| 5,565,657 A | 10/1996 | Merz |
| 5,581,261 A | 12/1996 | Hickman |
| 5,838,306 A | 11/1998 | O'Connor |
| 5,874,941 A | 2/1999 | Kamada |
| 5,999,162 A | 12/1999 | Takahashi |
| 6,028,271 A | 2/2000 | Gillespie |
| 6,202,023 B1 | 3/2001 | Hancock |
| 6,209,102 B1 | 3/2001 | Hoover |

(56) References Cited

U.S. PATENT DOCUMENTS

| | | | |
|---|---|---|---|
| 6,337,686 B2 | 1/2002 | Wong | |
| 6,337,919 B1 | 1/2002 | Dunton | |
| 6,442,692 B1 | 8/2002 | Zilberman | |
| 6,572,014 B1 | 6/2003 | Lambert | |
| 6,743,022 B1 | 6/2004 | Sarel | |
| 6,819,219 B1 | 11/2004 | Bolle | |
| 6,836,554 B1 | 12/2004 | Bolle | |
| 6,895,514 B1 | 5/2005 | Kermani | |
| 6,931,131 B1 | 8/2005 | Becker | |
| 6,938,061 B1 | 8/2005 | Rumynin | |
| 6,938,159 B1 | 8/2005 | O'Connor | |
| 6,957,185 B1 | 10/2005 | Labaton | |
| 6,957,186 B1 | 10/2005 | Guheen | |
| 6,983,061 B2 | 1/2006 | Ikegami | |
| 7,092,926 B2 | 8/2006 | Cerrato | |
| 7,130,452 B2 | 10/2006 | Bolle | |
| 7,133,792 B2 | 11/2006 | Murakami | |
| 7,139,916 B2 | 11/2006 | Billingsley | |
| 7,158,118 B2 | 1/2007 | Liberty | |
| 7,236,156 B2 | 6/2007 | Liberty | |
| 7,245,218 B2 | 7/2007 | Ikehara | |
| 7,366,919 B1 | 4/2008 | Sobel | |
| 7,395,436 B1 | 7/2008 | Nemovicher | |
| 7,494,061 B2 | 2/2009 | Reinhold | |
| 7,523,191 B1 | 4/2009 | Thomas | |
| 7,535,456 B2 | 5/2009 | Liberty | |
| 7,606,915 B1 | 10/2009 | Calinov | |
| 7,796,013 B2 | 9/2010 | Murakami | |
| 7,815,106 B1 | 10/2010 | McConnell | |
| 7,818,290 B2 | 10/2010 | Davis | |
| 7,860,870 B2 | 12/2010 | Sadagopan | |
| 8,031,175 B2 | 10/2011 | Rigazio | |
| 8,065,624 B2* | 11/2011 | Morin | G06F 1/1698 715/773 |
| 8,125,312 B2 | 2/2012 | Orr | |
| 8,156,324 B1 | 4/2012 | Shnowske | |
| 8,170,953 B1 | 5/2012 | Tullis | |
| 8,171,085 B1 | 5/2012 | Tevanian, Jr. | |
| 8,201,222 B2 | 6/2012 | Inoue | |
| 8,244,211 B2 | 8/2012 | Clark | |
| 8,285,658 B1 | 10/2012 | Kellas-Dicks | |
| 8,401,248 B1* | 3/2013 | Moon | G06V 40/176 382/103 |
| 8,402,533 B2 | 3/2013 | LeBeau | |
| 8,417,960 B2 | 4/2013 | Takahashi | |
| 8,433,785 B2 | 4/2013 | Awadallah | |
| 8,449,393 B2 | 5/2013 | Sobel | |
| 8,488,023 B2* | 7/2013 | Bacivarov | G06V 40/172 382/118 |
| 8,499,245 B1 | 7/2013 | Froment | |
| 8,510,113 B1 | 8/2013 | Conkie | |
| 8,548,208 B2 | 10/2013 | Schultz | |
| 8,549,629 B1 | 10/2013 | Mccreesh | |
| 8,555,077 B2 | 10/2013 | Davis | |
| 8,621,209 B1 | 12/2013 | Johansson | |
| 8,745,729 B2 | 6/2014 | Poluri | |
| 8,788,838 B1 | 8/2014 | Fadell | |
| 8,803,797 B2 | 8/2014 | Scott | |
| 8,819,812 B1 | 8/2014 | Weber | |
| 8,832,823 B2* | 9/2014 | Boss | G06F 21/36 726/16 |
| 8,838,060 B2 | 9/2014 | Walley | |
| 8,880,441 B1 | 11/2014 | Chen | |
| 8,898,787 B2 | 11/2014 | Thompson | |
| 8,904,479 B1 | 12/2014 | Johansson | |
| 8,938,787 B2 | 1/2015 | Turgeman | |
| 8,941,466 B2* | 1/2015 | Bayram | G06F 3/04883 340/5.82 |
| 8,990,959 B2 | 3/2015 | Zhu | |
| 9,069,942 B2 | 6/2015 | Turgeman | |
| 9,071,969 B2 | 6/2015 | Turgeman | |
| 9,154,534 B1 | 10/2015 | Gayles | |
| 9,174,123 B2 | 11/2015 | Nasir | |
| 9,195,351 B1 | 11/2015 | Rosenberg | |
| 9,203,860 B1 | 12/2015 | Casillas | |
| 9,275,337 B2 | 3/2016 | Turgeman | |
| 9,282,112 B2 | 3/2016 | Filatov | |
| 9,301,140 B1 | 3/2016 | Costigan | |
| 9,304,915 B2* | 4/2016 | Adams | G06F 12/0802 |
| 9,355,231 B2 | 5/2016 | Disraeli | |
| 9,355,234 B1 | 5/2016 | Magi Shaashua | |
| 9,418,221 B2 | 8/2016 | Turgeman | |
| 9,430,629 B1 | 8/2016 | Ziraknejad | |
| 9,450,971 B2 | 9/2016 | Turgeman | |
| 9,477,826 B2 | 10/2016 | Turgeman | |
| 9,483,292 B2 | 11/2016 | Turgeman | |
| 9,526,006 B2 | 12/2016 | Turgeman | |
| 9,529,987 B2 | 12/2016 | Deutschmann | |
| 9,531,701 B2 | 12/2016 | Turgeman | |
| 9,531,733 B2 | 12/2016 | Turgeman | |
| 9,536,071 B2 | 1/2017 | Turgeman | |
| 9,541,995 B2 | 1/2017 | Turgeman | |
| 9,547,766 B2 | 1/2017 | Turgeman | |
| 9,552,470 B2 | 1/2017 | Turgeman | |
| 9,558,339 B2 | 1/2017 | Turgeman | |
| 9,589,120 B2 | 3/2017 | Samuel | |
| 9,621,567 B2 | 4/2017 | Turgeman | |
| 9,626,677 B2 | 4/2017 | Turgeman | |
| 9,654,485 B1 | 5/2017 | Neumann | |
| 9,665,703 B2 | 5/2017 | Turgeman | |
| 9,674,218 B2 | 6/2017 | Turgeman | |
| 9,690,915 B2 | 6/2017 | Turgeman | |
| 9,703,953 B2 | 7/2017 | Turgeman | |
| 9,710,316 B1 | 7/2017 | Chheda | |
| 9,712,558 B2 | 7/2017 | Turgeman | |
| 9,747,436 B2 | 8/2017 | Turgeman | |
| 9,779,423 B2 | 10/2017 | Turgeman | |
| 9,832,192 B2 | 11/2017 | Alonso Cebrian | |
| 9,838,373 B2 | 12/2017 | Turgeman | |
| 9,848,009 B2 | 12/2017 | Turgeman | |
| 9,927,883 B1 | 3/2018 | Lin | |
| 10,032,010 B2 | 7/2018 | Turgeman | |
| 10,037,421 B2* | 7/2018 | Turgeman | G07C 9/33 |
| 10,049,209 B2* | 8/2018 | Turgeman | G06F 3/041 |
| 10,055,560 B2* | 8/2018 | Turgeman | G06F 21/316 |
| 10,069,837 B2* | 9/2018 | Turgeman | H04L 67/2804 |
| 10,069,852 B2* | 9/2018 | Turgeman | G06F 21/121 |
| 10,079,853 B2* | 9/2018 | Turgeman | G06Q 30/0277 |
| 10,083,439 B2* | 9/2018 | Turgeman | G06Q 20/308 |
| 10,164,985 B2* | 12/2018 | Turgeman | H04L 63/1408 |
| 10,198,122 B2 | 2/2019 | Turgeman | |
| 10,262,324 B2 | 4/2019 | Turgeman | |
| 10,298,614 B2 | 5/2019 | Turgeman | |
| 10,395,018 B2 | 8/2019 | Turgeman | |
| 10,397,262 B2* | 8/2019 | Karabchevsky | G06F 21/554 |
| 10,404,729 B2* | 9/2019 | Turgeman | G06F 21/32 |
| 10,474,815 B2 | 11/2019 | Turgeman | |
| 10,476,873 B2 | 11/2019 | Turgeman | |
| 10,523,680 B2 | 12/2019 | Turgeman | |
| 10,579,784 B2 | 3/2020 | Turgeman | |
| 10,586,036 B2 | 3/2020 | Turgeman | |
| 10,621,585 B2 | 4/2020 | Turgeman | |
| 10,685,355 B2 | 6/2020 | Novick | |
| 10,719,765 B2 | 7/2020 | Novik | |
| 10,728,761 B2 | 7/2020 | Kedem | |
| 10,747,305 B2 | 8/2020 | Turgeman | |
| 10,776,476 B2 | 9/2020 | Turgeman | |
| 10,834,090 B2 | 11/2020 | Turgeman | |
| 10,834,590 B2 | 11/2020 | Turgeman | |
| 10,897,482 B2 | 1/2021 | Rivner | |
| 10,917,431 B2 | 2/2021 | Turgeman | |
| 10,949,514 B2 | 3/2021 | Turgeman | |
| 10,949,757 B2 | 3/2021 | Turgeman | |
| 10,970,394 B2 | 4/2021 | Kedem | |
| 11,055,395 B2 | 7/2021 | Novik | |
| 2001/0004733 A1* | 6/2001 | Eldering | G06Q 30/0268 725/35 |
| 2002/0023229 A1* | 2/2002 | Hangai | G06F 21/32 726/21 |
| 2002/0089412 A1* | 7/2002 | Heger | G06F 21/32 340/5.82 |
| 2003/0033526 A1* | 2/2003 | French | H04L 63/105 713/168 |

(56) References Cited

U.S. PATENT DOCUMENTS

| | | | |
|---|---|---|---|
| 2003/0074201 A1* | 4/2003 | Grashey | G10L 17/22 704/E17.015 |
| 2003/0137494 A1* | 7/2003 | Tulbert | G06F 3/0488 345/173 |
| 2003/0149803 A1 | 8/2003 | Wilson | |
| 2003/0212811 A1* | 11/2003 | Thornton | G09G 5/001 709/231 |
| 2004/0015714 A1 | 1/2004 | Abraham | |
| 2004/0017355 A1* | 1/2004 | Shim | G06F 3/0338 345/157 |
| 2004/0021643 A1* | 2/2004 | Hoshino | G06F 3/03547 345/173 |
| 2004/0034784 A1 | 2/2004 | Fedronic | |
| 2004/0062423 A1* | 4/2004 | Doi | G06V 40/16 382/118 |
| 2004/0111523 A1 | 6/2004 | Hall | |
| 2004/0123156 A1 | 6/2004 | Hammond | |
| 2004/0128240 A1 | 7/2004 | Yusin | |
| 2004/0143737 A1 | 7/2004 | Teicher | |
| 2004/0186882 A1* | 9/2004 | Ting | H04L 63/0861 709/202 |
| 2004/0187037 A1 | 9/2004 | Checco | |
| 2004/0221171 A1* | 11/2004 | Ahmed | G06F 21/316 726/23 |
| 2005/0008148 A1* | 1/2005 | Jacobson | G06F 3/038 713/168 |
| 2005/0060138 A1* | 3/2005 | Wang | G06F 40/289 704/1 |
| 2005/0179657 A1 | 8/2005 | Russo | |
| 2005/0289264 A1* | 12/2005 | Illowsky et al. | G06F 11/2082 710/72 |
| 2006/0006803 A1* | 1/2006 | Huang | H01J 61/0672 313/607 |
| 2006/0080263 A1* | 4/2006 | Willis | H04L 63/10 705/76 |
| 2006/0090073 A1 | 4/2006 | Steinberg | |
| 2006/0123101 A1* | 6/2006 | Buccella | G06F 21/552 709/223 |
| 2006/0143454 A1* | 6/2006 | Walmsley | G06F 21/85 713/170 |
| 2006/0195328 A1* | 8/2006 | Abraham | G06Q 30/02 235/382 |
| 2006/0215886 A1* | 9/2006 | Black | G06V 40/30 382/124 |
| 2006/0224898 A1 | 10/2006 | Ahmed | |
| 2006/0238490 A1 | 10/2006 | Stanley | |
| 2006/0239430 A1 | 10/2006 | Gue | |
| 2006/0280339 A1 | 12/2006 | Cho | |
| 2006/0282660 A1 | 12/2006 | Varghese | |
| 2006/0284969 A1* | 12/2006 | Kim | H04M 1/67 348/14.01 |
| 2006/0287079 A1* | 12/2006 | Nonaka | G07F 17/32 463/29 |
| 2007/0118804 A1* | 5/2007 | Raciborski | G06F 11/3438 715/745 |
| 2007/0156443 A1* | 7/2007 | Gurvey | G06Q 30/02 705/64 |
| 2007/0174082 A1* | 7/2007 | Singh | H04W 4/02 705/44 |
| 2007/0183633 A1* | 8/2007 | Hoffmann | G06V 40/16 382/116 |
| 2007/0198286 A1* | 8/2007 | Tomita | G06F 21/32 713/182 |
| 2007/0214426 A1* | 9/2007 | Ruelle | H04N 21/4316 715/767 |
| 2007/0226797 A1* | 9/2007 | Thompson | H04L 63/1416 726/22 |
| 2007/0236330 A1 | 10/2007 | Cho | |
| 2007/0240230 A1 | 10/2007 | O'Connell | |
| 2007/0241861 A1 | 10/2007 | Venkatanna | |
| 2007/0250920 A1* | 10/2007 | Lindsay | G06F 21/31 726/7 |
| 2007/0255821 A1* | 11/2007 | Ge | G06Q 10/00 709/224 |
| 2007/0266305 A1 | 11/2007 | Cong | |
| 2007/0271466 A1* | 11/2007 | Mak | G06F 21/316 713/184 |
| 2007/0283416 A1 | 12/2007 | Renaud | |
| 2008/0046982 A1* | 2/2008 | Parkinson | H04L 9/3273 726/5 |
| 2008/0059474 A1* | 3/2008 | Lim | H04L 67/32 707/E17.106 |
| 2008/0066167 A1 | 3/2008 | Andri | |
| 2008/0068343 A1 | 3/2008 | Hoshino | |
| 2008/0084972 A1 | 4/2008 | Burke | |
| 2008/0091453 A1 | 4/2008 | Meehan | |
| 2008/0091639 A1 | 4/2008 | Davis | |
| 2008/0092209 A1 | 4/2008 | Davis | |
| 2008/0092245 A1* | 4/2008 | Alward | G06F 21/316 726/28 |
| 2008/0097851 A1* | 4/2008 | Bemmel | G06Q 30/0236 705/14.1 |
| 2008/0098456 A1* | 4/2008 | Alward | G06F 21/316 726/1 |
| 2008/0120717 A1 | 5/2008 | Shakkarwar | |
| 2008/0136790 A1 | 6/2008 | Hio | |
| 2008/0162449 A1* | 7/2008 | Chao-Yu | G06F 16/248 707/999.005 |
| 2008/0181508 A1* | 7/2008 | Kaneda | G06V 40/175 382/190 |
| 2008/0183745 A1 | 7/2008 | Cancel | |
| 2008/0192005 A1* | 8/2008 | Elgoyhen | G06V 40/20 345/158 |
| 2008/0200310 A1* | 8/2008 | Tagliabue | A63B 24/0006 342/357.57 |
| 2008/0211766 A1* | 9/2008 | Westerman | G06F 3/04883 345/156 |
| 2008/0215576 A1* | 9/2008 | Zhao | G06F 16/337 707/999.005 |
| 2008/0263636 A1* | 10/2008 | Gusler | H04L 63/1466 726/4 |
| 2008/0298588 A1* | 12/2008 | Shakkarwar | G06Q 20/12 380/255 |
| 2008/0301808 A1* | 12/2008 | Calo | H04L 63/1408 726/23 |
| 2008/0306897 A1 | 12/2008 | Liu | |
| 2008/0307236 A1 | 12/2008 | Lu | |
| 2008/0309616 A1 | 12/2008 | Massengill | |
| 2008/0319841 A1 | 12/2008 | Oliver | |
| 2009/0037983 A1 | 2/2009 | Chiruvolu | |
| 2009/0038010 A1* | 2/2009 | Ma | G06F 11/3672 726/23 |
| 2009/0049555 A1 | 2/2009 | Cho | |
| 2009/0083850 A1 | 3/2009 | Fadell | |
| 2009/0089879 A1* | 4/2009 | Wang | G06F 21/53 726/24 |
| 2009/0094311 A1 | 4/2009 | Awadallah | |
| 2009/0132395 A1 | 5/2009 | Lam | |
| 2009/0133106 A1 | 5/2009 | Bentley | |
| 2009/0134972 A1 | 5/2009 | Wu, Jr | |
| 2009/0157792 A1* | 6/2009 | Fiatal | G06Q 30/06 709/201 |
| 2009/0172551 A1* | 7/2009 | Kane | G06Q 30/02 715/733 |
| 2009/0177562 A1 | 7/2009 | Peace | |
| 2009/0189736 A1* | 7/2009 | Hayashi | G06F 21/32 340/5.81 |
| 2009/0199296 A1* | 8/2009 | Xie | G06F 21/554 726/23 |
| 2009/0203355 A1 | 8/2009 | Clark | |
| 2009/0227232 A1* | 9/2009 | Matas | H04M 1/665 455/411 |
| 2009/0241188 A1* | 9/2009 | Komura | H04L 63/1416 726/22 |
| 2009/0254336 A1* | 10/2009 | Dumais | G06F 9/451 704/9 |
| 2009/0281979 A1 | 11/2009 | Tysowski | |
| 2009/0285456 A1* | 11/2009 | Moon | G06V 40/176 382/118 |

(56) References Cited

U.S. PATENT DOCUMENTS

| | | |
|---|---|---|
| 2009/0293119 A1 | 11/2009 | Jonsson |
| 2009/0299967 A1 | 12/2009 | Li |
| 2009/0300589 A1 | 12/2009 | Watters |
| 2009/0303204 A1 | 12/2009 | Nasir |
| 2009/0309702 A1* | 12/2009 | Hirai .................. G06V 40/174 340/5.83 |
| 2009/0320123 A1* | 12/2009 | Yu ..................... H04L 9/3226 726/16 |
| 2010/0007632 A1* | 1/2010 | Yamazaki .......... H01L 27/3234 345/175 |
| 2010/0040293 A1* | 2/2010 | Hermann .............. G06F 21/31 382/218 |
| 2010/0042387 A1 | 2/2010 | Gibbon |
| 2010/0042403 A1* | 2/2010 | Chandrasekar ........ G06Q 30/02 704/9 |
| 2010/0042954 A1 | 2/2010 | Rosenblatt |
| 2010/0046806 A1 | 2/2010 | Baughman |
| 2010/0070405 A1 | 3/2010 | Joa |
| 2010/0077470 A1* | 3/2010 | Kozat ................. H04L 63/14 726/11 |
| 2010/0082747 A1* | 4/2010 | Yue ................... G06F 16/954 709/227 |
| 2010/0082998 A1* | 4/2010 | Kohavi ................ G06F 21/36 713/182 |
| 2010/0097324 A1 | 4/2010 | Anson |
| 2010/0115610 A1* | 5/2010 | Tredoux .............. G06F 21/316 726/19 |
| 2010/0122082 A1 | 5/2010 | Deng |
| 2010/0125816 A1* | 5/2010 | Bezos ................. G06F 3/017 715/863 |
| 2010/0138370 A1* | 6/2010 | Wu ..................... H04H 60/33 707/769 |
| 2010/0164897 A1 | 7/2010 | Morin |
| 2010/0171753 A1* | 7/2010 | Kwon ............... G06F 3/04886 345/173 |
| 2010/0197352 A1* | 8/2010 | Runstedler ............ G06F 21/31 455/566 |
| 2010/0203876 A1 | 8/2010 | Krishnaswamy |
| 2010/0225443 A1 | 9/2010 | Bayram |
| 2010/0245553 A1 | 9/2010 | Schuler |
| 2010/0269165 A1* | 10/2010 | Chen ................... G06F 21/36 345/157 |
| 2010/0281539 A1* | 11/2010 | Burns ............... H04L 63/1441 726/13 |
| 2010/0284532 A1 | 11/2010 | Burnett |
| 2010/0287229 A1 | 11/2010 | Hauser |
| 2010/0321304 A1* | 12/2010 | Rofougaran ........... G06F 21/36 345/173 |
| 2010/0325721 A1 | 12/2010 | Bandyopadhyay |
| 2010/0328074 A1* | 12/2010 | Johnson ............... G06F 21/31 340/573.1 |
| 2011/0010209 A1* | 1/2011 | McNally ................ G06N 20/00 706/47 |
| 2011/0012829 A1* | 1/2011 | Yao ..................... G06F 3/045 345/157 |
| 2011/0016320 A1* | 1/2011 | Bergsten ............ H04L 63/083 713/170 |
| 2011/0016534 A1* | 1/2011 | Jakobsson .......... H04L 63/0892 726/28 |
| 2011/0018828 A1 | 1/2011 | Wu |
| 2011/0023115 A1* | 1/2011 | Wright ................. G06F 21/552 726/22 |
| 2011/0029902 A1 | 2/2011 | Bailey |
| 2011/0039529 A1* | 2/2011 | Kim ..................... H04W 68/00 455/418 |
| 2011/0039602 A1* | 2/2011 | McNamara ............ G06F 3/017 345/173 |
| 2011/0043475 A1* | 2/2011 | Rigazio ............ H04N 21/42222 345/173 |
| 2011/0050394 A1 | 3/2011 | Zhang |
| 2011/0055077 A1 | 3/2011 | French |
| 2011/0063211 A1 | 3/2011 | Hoerl |
| 2011/0065504 A1 | 3/2011 | Dugan |
| 2011/0066682 A1 | 3/2011 | Aldunate |
| 2011/0082768 A1 | 4/2011 | Eisen |
| 2011/0102570 A1 | 5/2011 | Wilf |
| 2011/0105103 A1 | 5/2011 | Ullrich |
| 2011/0105859 A1* | 5/2011 | Popovic ............... A61B 5/0006 600/301 |
| 2011/0113388 A1 | 5/2011 | Eisen |
| 2011/0119370 A1 | 5/2011 | Huang |
| 2011/0134240 A1* | 6/2011 | Anderson ............... H04W 4/02 348/143 |
| 2011/0154273 A1* | 6/2011 | Abu ..................... G03F 1/70 716/52 |
| 2011/0154497 A1 | 6/2011 | Bailey |
| 2011/0159650 A1* | 6/2011 | Shiraishi ............. H01L 29/0865 438/269 |
| 2011/0159850 A1* | 6/2011 | Faith .................. G06Q 30/0201 455/411 |
| 2011/0162076 A1* | 6/2011 | Song .................. H04L 63/1416 709/217 |
| 2011/0191820 A1 | 8/2011 | Ivey |
| 2011/0193737 A1 | 8/2011 | Chiueh |
| 2011/0196791 A1 | 8/2011 | Dominguez |
| 2011/0202453 A1 | 8/2011 | Issa |
| 2011/0221684 A1 | 9/2011 | Rydenhag |
| 2011/0223888 A1* | 9/2011 | Esaki ................... G06F 21/32 455/411 |
| 2011/0225644 A1* | 9/2011 | Pullikottil ........... H04L 63/1425 726/11 |
| 2011/0246902 A1* | 10/2011 | Tsai ..................... A63F 13/211 715/740 |
| 2011/0248941 A1 | 10/2011 | Abdo |
| 2011/0251823 A1 | 10/2011 | Davis |
| 2011/0271342 A1* | 11/2011 | Chung ................ H04L 63/1416 726/23 |
| 2011/0276414 A1* | 11/2011 | Subbarao ............. G06Q 20/102 705/40 |
| 2011/0286730 A1 | 11/2011 | Gallagher |
| 2011/0300831 A1 | 12/2011 | Chin |
| 2011/0304531 A1* | 12/2011 | Brooks ................ G06F 16/9537 345/156 |
| 2011/0320822 A1* | 12/2011 | Lind ................... G06F 21/316 713/182 |
| 2012/0005483 A1* | 1/2012 | Patvarczki ............. G06F 21/36 713/182 |
| 2012/0005719 A1* | 1/2012 | McDougal ............ G06F 21/562 709/224 |
| 2012/0007821 A1* | 1/2012 | Zaliva ................. G06F 3/04166 345/173 |
| 2012/0054834 A1* | 3/2012 | King .................... G06F 21/31 726/4 |
| 2012/0072982 A1 | 3/2012 | Ranganathan |
| 2012/0096555 A1* | 4/2012 | Mahaffey ............. G06F 21/562 726/25 |
| 2012/0101930 A1 | 4/2012 | Li |
| 2012/0102551 A1 | 4/2012 | Bidare |
| 2012/0113061 A1* | 5/2012 | Ikeda .................. G06F 3/04883 345/173 |
| 2012/0123932 A1 | 5/2012 | LeCuyer |
| 2012/0124662 A1* | 5/2012 | Baca ................... G06F 21/32 726/17 |
| 2012/0133055 A1* | 5/2012 | Machida .............. H01L 24/06 257/777 |
| 2012/0151044 A1 | 6/2012 | Luna |
| 2012/0151559 A1 | 6/2012 | Koudys |
| 2012/0154173 A1 | 6/2012 | Chang |
| 2012/0154273 A1* | 6/2012 | Mcdade, Sr ........... G06F 3/041 345/157 |
| 2012/0154823 A1* | 6/2012 | Sakamoto ............. G03B 27/32 356/620 |
| 2012/0158503 A1* | 6/2012 | Mardikar ............. G06Q 30/0255 705/14.66 |
| 2012/0159599 A1* | 6/2012 | Szoke .................. G06F 21/32 726/7 |
| 2012/0164978 A1 | 6/2012 | Conti |
| 2012/0167170 A1* | 6/2012 | Shi ..................... G06F 21/316 726/2 |

(56) References Cited

U.S. PATENT DOCUMENTS

| | | | |
|---|---|---|---|
| 2012/0167204 A1* | 6/2012 | Akka | G06F 21/36 715/862 |
| 2012/0174213 A1 | 7/2012 | Geiger | |
| 2012/0188198 A1* | 7/2012 | Jeong | G06F 3/044 345/174 |
| 2012/0204257 A1* | 8/2012 | O'Connell | G06F 21/316 726/19 |
| 2012/0218193 A1* | 8/2012 | Weber | G09B 21/004 345/173 |
| 2012/0239557 A1 | 9/2012 | Weinflash | |
| 2012/0246737 A1* | 9/2012 | Paxton | G06F 21/316 726/27 |
| 2012/0252410 A1 | 10/2012 | Williams | |
| 2012/0278804 A1 | 11/2012 | Narayanasamy | |
| 2012/0278886 A1 | 11/2012 | Luna | |
| 2012/0284380 A1* | 11/2012 | Anderson, III | G06F 9/45558 709/223 |
| 2012/0297476 A1 | 11/2012 | Zeljkovic | |
| 2013/0018796 A1 | 1/2013 | Kolhatkar | |
| 2013/0024239 A1* | 1/2013 | Baker | G06Q 40/06 705/7.28 |
| 2013/0036416 A1* | 2/2013 | Raju | H04L 43/0811 718/1 |
| 2013/0061169 A1 | 3/2013 | Pearcy | |
| 2013/0076650 A1 | 3/2013 | Vik | |
| 2013/0088434 A1* | 4/2013 | Masuda | G06F 3/0393 345/173 |
| 2013/0097682 A1* | 4/2013 | Zeljkovic | H04L 9/3231 726/7 |
| 2013/0097706 A1* | 4/2013 | Titonis | G06F 21/566 726/22 |
| 2013/0109944 A1 | 5/2013 | Sparacino | |
| 2013/0111586 A1* | 5/2013 | Jackson | G06F 21/316 726/23 |
| 2013/0132091 A1 | 5/2013 | Skerpac | |
| 2013/0133055 A1* | 5/2013 | Ali | H04L 63/0861 726/7 |
| 2013/0135218 A1 | 5/2013 | Jain | |
| 2013/0139248 A1* | 5/2013 | Rhee | G06F 3/0346 726/19 |
| 2013/0154999 A1* | 6/2013 | Guard | G06F 3/04883 345/174 |
| 2013/0162603 A1* | 6/2013 | Peng | G06F 3/0418 345/178 |
| 2013/0167212 A1 | 6/2013 | Azar | |
| 2013/0173737 A1 | 7/2013 | Liu | |
| 2013/0198832 A1 | 8/2013 | Draluk | |
| 2013/0212674 A1 | 8/2013 | Boger | |
| 2013/0226992 A1 | 8/2013 | Bapst | |
| 2013/0237272 A1 | 9/2013 | Prasad | |
| 2013/0239195 A1* | 9/2013 | Turgeman | G06F 21/554 726/19 |
| 2013/0239206 A1* | 9/2013 | Draluk | G06F 21/00 726/19 |
| 2013/0243208 A1 | 9/2013 | Fawer | |
| 2013/0254642 A1 | 9/2013 | Seo | |
| 2013/0282637 A1 | 10/2013 | Costigan | |
| 2013/0288647 A1 | 10/2013 | Turgeman | |
| 2013/0301830 A1 | 11/2013 | Bar-El | |
| 2013/0305357 A1* | 11/2013 | Ayyagari | H04W 12/06 726/22 |
| 2013/0312097 A1* | 11/2013 | Turnbull | H04L 63/145 726/24 |
| 2013/0335349 A1 | 12/2013 | Ferren | |
| 2013/0346309 A1 | 12/2013 | Giori | |
| 2013/0346311 A1 | 12/2013 | Boding | |
| 2014/0033317 A1* | 1/2014 | Barber | G06Q 30/0242 709/224 |
| 2014/0041020 A1* | 2/2014 | Zhao | G06F 21/36 726/19 |
| 2014/0078061 A1* | 3/2014 | Simons | G06F 3/03543 345/163 |
| 2014/0078193 A1* | 3/2014 | Barnhoefer | G09G 5/10 345/87 |
| 2014/0082369 A1* | 3/2014 | Waclawsky | G06F 21/62 713/189 |
| 2014/0111451 A1 | 4/2014 | Park | |
| 2014/0114843 A1 | 4/2014 | Klein | |
| 2014/0118520 A1 | 5/2014 | Slaby | |
| 2014/0123275 A1 | 5/2014 | Azar | |
| 2014/0143304 A1* | 5/2014 | Hegarty | G06F 11/3438 709/203 |
| 2014/0168093 A1 | 6/2014 | Lawrence | |
| 2014/0196119 A1 | 7/2014 | Hill | |
| 2014/0200953 A1 | 7/2014 | Mun | |
| 2014/0223531 A1 | 8/2014 | Outwater | |
| 2014/0244499 A1 | 8/2014 | Gruner | |
| 2014/0250538 A1 | 9/2014 | Rapaport | |
| 2014/0259130 A1 | 9/2014 | Li | |
| 2014/0270571 A1 | 9/2014 | Dwan | |
| 2014/0283059 A1 | 9/2014 | Sambamurthy | |
| 2014/0283068 A1 | 9/2014 | Call | |
| 2014/0289833 A1 | 9/2014 | Briceno | |
| 2014/0310764 A1 | 10/2014 | Tippett | |
| 2014/0310805 A1 | 10/2014 | Kandekar | |
| 2014/0317028 A1 | 10/2014 | Turgeman | |
| 2014/0317726 A1 | 10/2014 | Turgeman | |
| 2014/0317734 A1 | 10/2014 | Valencia | |
| 2014/0317744 A1 | 10/2014 | Turgeman | |
| 2014/0325223 A1 | 10/2014 | Turgeman | |
| 2014/0325645 A1 | 10/2014 | Turgeman | |
| 2014/0325646 A1 | 10/2014 | Turgeman | |
| 2014/0325682 A1 | 10/2014 | Turgeman | |
| 2014/0337786 A1 | 11/2014 | Luo | |
| 2014/0344927 A1 | 11/2014 | Turgeman | |
| 2015/0002479 A1 | 1/2015 | Kawamura | |
| 2015/0012920 A1 | 1/2015 | De Santis | |
| 2015/0062078 A1 | 3/2015 | Christman | |
| 2015/0081549 A1 | 3/2015 | Kimberg | |
| 2015/0091858 A1 | 4/2015 | Rosenberg | |
| 2015/0094030 A1 | 4/2015 | Turgeman | |
| 2015/0101031 A1* | 4/2015 | Harjanto | H04L 63/0876 726/7 |
| 2015/0128252 A1 | 5/2015 | Konami | |
| 2015/0146945 A1 | 5/2015 | Han | |
| 2015/0205944 A1 | 7/2015 | Turgeman | |
| 2015/0205955 A1 | 7/2015 | Turgeman | |
| 2015/0205957 A1 | 7/2015 | Turgeman | |
| 2015/0205958 A1 | 7/2015 | Turgeman | |
| 2015/0212843 A1 | 7/2015 | Turgeman | |
| 2015/0213244 A1* | 7/2015 | Lymberopoulos | G06F 21/45 726/19 |
| 2015/0213245 A1 | 7/2015 | Tartz | |
| 2015/0213246 A1 | 7/2015 | Turgeman | |
| 2015/0213251 A1 | 7/2015 | Turgeman | |
| 2015/0242601 A1 | 8/2015 | Griffiths | |
| 2015/0256528 A1 | 9/2015 | Turgeman | |
| 2015/0256556 A1 | 9/2015 | Kaminsky | |
| 2015/0264572 A1 | 9/2015 | Turgeman | |
| 2015/0268768 A1 | 9/2015 | Woodhull | |
| 2015/0279155 A1 | 10/2015 | Chun | |
| 2015/0310196 A1 | 10/2015 | Turgeman | |
| 2015/0348038 A1 | 12/2015 | Femrite | |
| 2015/0358317 A1 | 12/2015 | Deutschmann | |
| 2016/0006800 A1 | 1/2016 | Summers | |
| 2016/0012465 A1 | 1/2016 | Sharp | |
| 2016/0019546 A1 | 1/2016 | Eisen | |
| 2016/0034673 A1 | 2/2016 | Chandra | |
| 2016/0042164 A1 | 2/2016 | Goldsmith | |
| 2016/0048937 A1 | 2/2016 | Mathura | |
| 2016/0055324 A1 | 2/2016 | Agarwal | |
| 2016/0057623 A1 | 2/2016 | Dutt | |
| 2016/0077620 A1 | 3/2016 | Choi | |
| 2016/0087952 A1 | 3/2016 | Tartz | |
| 2016/0109969 A1 | 4/2016 | Keating | |
| 2016/0132105 A1 | 5/2016 | Turgeman | |
| 2016/0155126 A1 | 6/2016 | D'Uva | |
| 2016/0164905 A1 | 6/2016 | Pinney Wood | |
| 2016/0164906 A1 | 6/2016 | Pinney Wood | |
| 2016/0174044 A1 | 6/2016 | Jones | |
| 2016/0179245 A1 | 6/2016 | Johansson | |

(56) References Cited

U.S. PATENT DOCUMENTS

| | | |
|---|---|---|
| 2016/0182503 A1 | 6/2016 | Cheng |
| 2016/0191237 A1 | 6/2016 | Roth |
| 2016/0196414 A1 | 7/2016 | Stuntebeck |
| 2016/0197918 A1 | 7/2016 | Turgeman |
| 2016/0209948 A1 | 7/2016 | Tulber |
| 2016/0226865 A1 | 8/2016 | Chen |
| 2016/0241555 A1 | 8/2016 | Vo |
| 2016/0294837 A1 | 10/2016 | Turgeman |
| 2016/0300049 A1 | 10/2016 | Guedalia |
| 2016/0300054 A1 | 10/2016 | Turgeman |
| 2016/0306974 A1 | 10/2016 | Turgeman |
| 2016/0307191 A1 | 10/2016 | Turgeman |
| 2016/0307201 A1 | 10/2016 | Turgeman |
| 2016/0321445 A1 | 11/2016 | Turgeman |
| 2016/0321689 A1 | 11/2016 | Turgeman |
| 2016/0328572 A1 | 11/2016 | Valacich |
| 2016/0342826 A1 | 11/2016 | Apostolos |
| 2016/0344783 A1 | 11/2016 | Kushimoto |
| 2016/0364138 A1 | 12/2016 | Luo |
| 2016/0366177 A1 | 12/2016 | Turgeman |
| 2016/0371476 A1 | 12/2016 | Turgeman |
| 2017/0011217 A1 | 1/2017 | Turgeman |
| 2017/0012988 A1 | 1/2017 | Turgeman |
| 2017/0017781 A1 | 1/2017 | Turgeman |
| 2017/0032114 A1 | 2/2017 | Turgeman |
| 2017/0034210 A1 | 2/2017 | Talmor |
| 2017/0048272 A1 | 2/2017 | Yamamura |
| 2017/0054702 A1 | 2/2017 | Turgeman |
| 2017/0063858 A1 | 3/2017 | Bandi |
| 2017/0076089 A1 | 3/2017 | Turgeman |
| 2017/0085587 A1 | 3/2017 | Turgeman |
| 2017/0090418 A1 | 3/2017 | Tsang |
| 2017/0091450 A1 | 3/2017 | Turgeman |
| 2017/0126735 A1 | 5/2017 | Turgeman |
| 2017/0127197 A1 | 5/2017 | Mulder |
| 2017/0140279 A1 | 5/2017 | Turgeman |
| 2017/0149958 A1 | 5/2017 | Kian |
| 2017/0154366 A1 | 6/2017 | Turgeman |
| 2017/0177999 A1 | 6/2017 | Novik |
| 2017/0193526 A1 | 7/2017 | Turgeman |
| 2017/0195354 A1 | 7/2017 | Kesin |
| 2017/0195356 A1 | 7/2017 | Turgeman |
| 2017/0221064 A1 | 8/2017 | Turgeman |
| 2017/0302340 A1 | 10/2017 | Berlin |
| 2017/0364674 A1 | 12/2017 | Grubbs |
| 2017/0364919 A1 | 12/2017 | Ranganath |
| 2018/0004948 A1 | 1/2018 | Martin |
| 2018/0012003 A1 | 1/2018 | Asulin |
| 2018/0012227 A1 | 1/2018 | Tunnell |
| 2018/0034850 A1 | 2/2018 | Turgeman |
| 2018/0046792 A1 | 2/2018 | Toqan |
| 2018/0095596 A1 | 4/2018 | Turgeman |
| 2018/0097841 A1 | 4/2018 | Stolarz |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |
| 2018/0124082 A1 | 5/2018 | Siadati |
| 2018/0160309 A1 | 6/2018 | Turgeman |
| 2018/0183827 A1 | 6/2018 | Zorlular |
| 2018/0302425 A1 | 10/2018 | Esman, Sr |
| 2018/0314816 A1 | 11/2018 | Turgeman |
| 2018/0349583 A1 | 12/2018 | Turgeman |
| 2018/0350144 A1 | 12/2018 | Rathod |
| 2018/0351959 A1 | 12/2018 | Turgeman |
| 2018/0373780 A1 | 12/2018 | Pascarella |
| 2019/0028497 A1 | 1/2019 | Karabchevsky |
| 2019/0057200 A1 | 2/2019 | Sabag |
| 2019/0121956 A1 | 4/2019 | Turgeman |
| 2019/0124068 A1 | 4/2019 | Anders |
| 2019/0156034 A1 | 5/2019 | Kedem |
| 2019/0158535 A1 | 5/2019 | Kedem |
| 2019/0220863 A1 | 7/2019 | Novick |
| 2019/0236391 A1 | 8/2019 | Novik |
| 2019/0272025 A1 | 9/2019 | Turgeman |
| 2019/0342328 A1 | 11/2019 | Rivner |
| 2019/0342329 A1 | 11/2019 | Turgeman |
| 2020/0012770 A1 | 1/2020 | Turgeman |
| 2020/0045044 A1 | 2/2020 | Turgeman |
| 2020/0076816 A1 | 3/2020 | Turgeman |
| 2020/0234306 A1 | 7/2020 | Turgeman |
| 2020/0273040 A1 | 8/2020 | Novick |
| 2020/0327212 A1 | 10/2020 | Kedem |
| 2020/0327422 A1 | 10/2020 | Novik |
| 2021/0004451 A1 | 1/2021 | Novik |
| 2021/0014236 A1 | 1/2021 | Turgeman |
| 2021/0021997 A1 | 1/2021 | Turgeman |
| 2021/0051172 A1 | 2/2021 | Turgeman |
| 2021/0110014 A1 | 4/2021 | Turgeman |
| 2021/0286870 A1 | 9/2021 | Novik |

FOREIGN PATENT DOCUMENTS

| | | |
|---|---|---|
| EP | 2541452 A1 | 1/2013 |
| EP | 2610776 A2 | 7/2013 |
| EP | 2871815 A1 | 5/2015 |
| EP | 2646904 B1 | 8/2018 |
| EP | 3019991 B1 | 2/2019 |
| ES | 2338092 A1 | 5/2010 |
| WO | 2005099166 A2 | 10/2005 |
| WO | 2007146437 A2 | 12/2007 |
| WO | 2012/001697 A1 | 1/2012 |
| WO | 2012073233 A1 | 6/2012 |
| WO | 2013/161077 A1 | 10/2013 |
| WO | 2015/127253 A1 | 8/2015 |
| WO | 2018/007821 A1 | 1/2018 |
| WO | 2018/007823 A1 | 1/2018 |
| WO | 2018/055406 A1 | 3/2018 |

OTHER PUBLICATIONS

Bailey, Kyle O., "Computer Based Behavioral Biometric Authentication via Multi-Modal Fusion", Thesis, 2013, Air Force Insitute of Technology.

Elizabeth Stinson and John C. Mitchell, "Characterizing the Remote Control Behavior of Bots", Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Ben Hansen, "The Blur Busters Mouse Guide", dated Feb. 1, 2014; printed from the Internet on Aug. 5, 2019 from: https://www.blurbusters.com/faq/mouse-guide/.

Chris Cain, "Analyzing Man-in-the-Browser (MITB) Attacks", dated Dec. 2014; downloaded from the Internet on Aug. 5, 2019 from: https://www.sans.org/reading-room/whitepapers/forensics/analyzing-man-in-the-browser-mitb-attacks-35687.

International Search Report for PCT international application PCT/IL2018/051246, dated Mar. 11, 2019.

Written Opinion of the International Searching Authority for PCT international application PCT/IL2018/051246, dated Mar. 11, 2019.

Written Opinion of the International Searching Authority for PCT international application PCT/IL2011/000907, dated Apr. 19, 2012.

(56) References Cited

OTHER PUBLICATIONS

Written Opinion of the International Searching Authority for PCT international application PCT/IB2014/062293, dated Oct. 1, 2014.
Written Opinion of the International Searching Authority for PCT international application PCT/IB2014/062941, dated Dec. 17, 2014.
Written Opinion of the International Searching Authority for PCT international application PCT/IB2016/054064, dated Jul. 9, 2015.
Syed Ahsan Abbas et al., "What is the difference between a rooted and unrooted Android?" Quora.com, dated Jul. 22, 2016, printed on Aug. 12, 2019 from: www.Quora.com/What-is-the-difference-between-a-rooted-and-unrooted-Android.
Sebastian Lindstrom, "Getting to know asynchronous JavaScript: Callbacks, Promises and Async / Await", Medium.com, dated Jul. 2, 2017, printed on Aug. 12, 2019 from: Medium.com/codebuddies/getting-to-know-asynchronous-javascript-callbacks-promises-and-async-await-17e0673281ee.
Machine translation of WO 2013/161077 A1, "Biometric authentication device, biometric authentication program, and biometric authentication method", Obtained on Jan. 24, 2020 from: https://patents.google.com/patent/WO2013161077A1/en?oq=JP2006277341A.
Oriana Riva et al., "Progressive authentication: Deciding when to authenticate on mobile phones", USENIX Security Symposium 2012.
Communication from the European Patent Office (EPO) in EP 14814408, dated Oct. 15, 2019.
Bassam Sayed, "A Static Authentication Framework Based on Mouse Gesture Dynamics", Helwan University, 2003.
Communication from the European Patent Office (EPO) in EP 17739666, dated Jun. 17, 2020.
Communication from the European Patent Office (EPO) in EP 17777357, dated Jul. 23, 2020.
International Search Report (ISR) in PCT/IL2020/050724, dated Sep. 7, 2020.
Written Opinion of the International Searching Authority in PCT/IL2020/050724, dated Sep. 7, 2020.
J. D. Crawford et al., "Spatial Transformations for Eye-Hand Coordination", Journal of Neurophysiology, vol. 92, Issue 1, pp. 10-19, Jul. 2004.
Communication from the European Patent Office (EPO) in patent application No. EP 17739667, dated Oct. 20, 2020.
Machine Translation of patent application No. EP 2338092 A1, Obtained on Jan. 14, 2021 from: https://patents.google.com/patent/EP2338092A1/en.
Asaf Shabtai et al., "Andromaly": a behavioral malware detection framework for android devices, Journal of Intelligent Information Systems, Jan. 6, 2011.
Machine Translation of ES 2338092 A1, Obtained from "Google Patents" on Oct. 10, 2021 from: https://patents.google.com/patent/ES2338092A1/en.
United Kingdom Intellectual Property Office, Examination Report dated Sep. 20, 2021 in patent application No. GB 2006212.1.
BioCatch Ltd., "Social Engineering Attacks: What's Next in Detecting Phishing, Vishing & Smishing", Oct. 19, 2017; Printed on Nov. 5, 2021 from: www.biocatch.com/blog/social-engineering-attacks-whats-next-in-detecting-phishing-vishing-smishing.
Communication from the European Patent Office in patent application EP 14814408, dated Mar. 11, 2021.
Faisal Alkhateeb et al., "Bank Web Sites Phishing Detection and Notification System Based on Semantic Web technologies", International Journal of Security and its Applications 6(4):53-66, Oct. 2012.
Sungzoon Cho et al., "Artificial Rhythms and Cues for Keystroke Dynamics Based Authentication", International Conference on Biometrics (ICB)—Advances in Biometrics, pp. 626-632, year 2006.
International Search Report for PCT/IB2017/055995, dated Feb. 15, 2018.
Written Opinion of the International Search Authority for PCT/IB2017/055995, dated Feb. 15, 2018.
Supplementary European Search Report for U.S. Appl. No. 11/844,440 dated Nov. 17, 2017.
International Search Report for application PCT/IB2016/054064 dated Nov. 21, 2016.
International Search Report for application PCT/IB2014/062941 dated Dec. 17, 2014.
International Search Report for application PCT/IB2014/062293 dated Oct. 1, 2014.
International Search Report for application PCT/IL2011/000907 dated Apr. 19, 2012.
Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.
Nance et al., "Virtual Machine Introspection", IEEE Security & Privacy, 2008.
Garfinkel and Rosenblum, "A virtual Machine Introspection-Based Architecture for Intrusion Detection ", 2003, Proc. Network and Distributed Systems Security Symp., The Internet Society, pp. 191-206.
Spafford et al., "Software Forensics: Can We Track Code to its Authors?", Feb. 1992, Computer Science Technical Report, Purdue e-Pubs, Report No. CSD-TR-92-010.
Tavis Ormandy, "An Empirical Study into the Security Exposure to Hosts of Hostile Virtualized Environments", retrieved from the Internet on May 3, 2017, from: http://taviso.decsystem.org/virtsec.pdf.
Zheng et al., "An Efficient User Verification System via Mouse Movements", Oct. 17-21, 2011, CCS'11, Chicago, Illinois.
Liston et al., "On the Cutting Edge: Thwarting Virtual Machine Detection" retrieved from the Internet on May 3, 2017, from: http://docplayer.net/9791309-On-the-cutting-edge-thwarting-virtual-machine-detection.html.
Georgia Frantzeskou et al., "Identifying Authorship by Byte-Level N-Grams: The source Code Author Profile (SCAP) Method", Spring 2007, International Journal of Digital Evidence, vol. 6, issue 1.
Franklin et al., "Remote Detection of Virtual Machine Monitors with Fuzzy benchmarking", ACM SIGOPS Operating Systems Review, V42, Issue 3, Apr. 2008.
Emmanouil Vasilomanolakis, "A honeypot-driven cyber incident monitor: Lessons learned and steps ahead" Sep. 2015; SIN '15: Proceedings of the 8th International Conference on Security of Information and Networks Publisher: ACM; pp. 1-7.

* cited by examiner

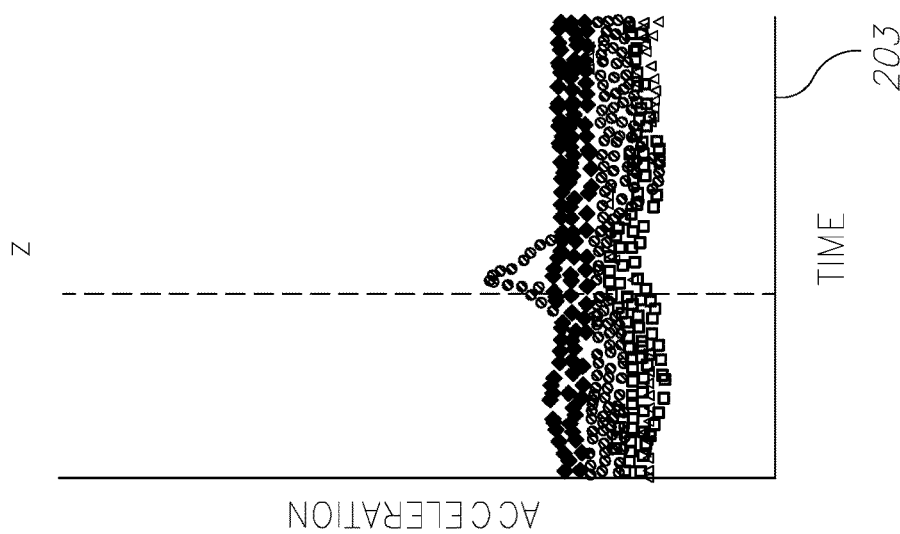
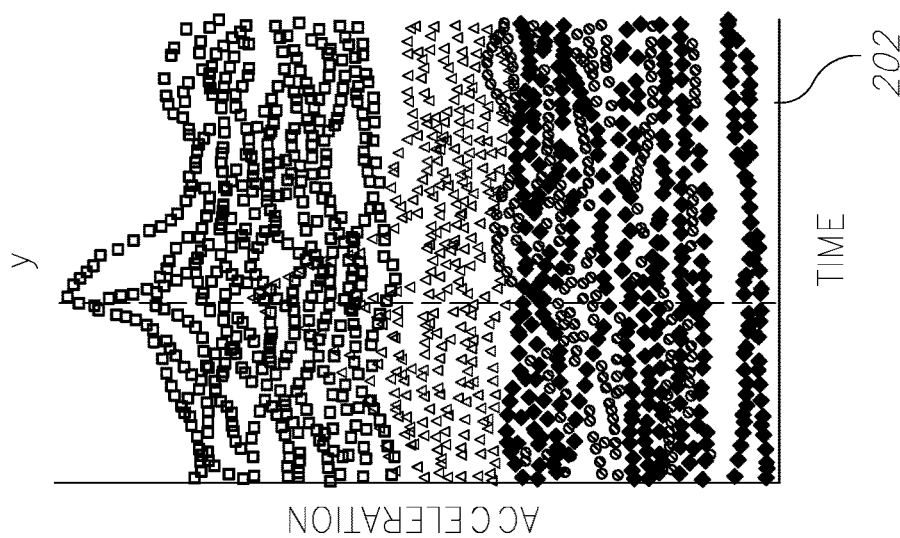
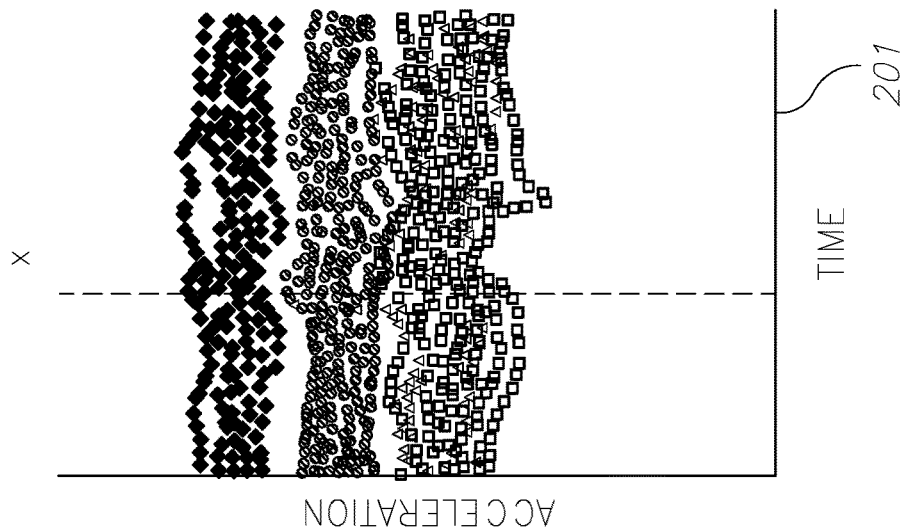
FIG. 2

SYSTEM, METHOD, AND DEVICE OF AUTHENTICATING A USER BASED ON SELFIE IMAGE OR SELFIE VIDEO

CROSS-REFERENCE TO RELATED APPLICATIONS

This patent application is a Continuation of U.S. Ser. No. 16/512,399, filed on Jul. 16, 2019, which is hereby incorporated by reference in its entirety.

The above-mentioned U.S. Ser. No. 16/512,399 is a Continuation-in-Part (CIP) of U.S. Ser. No. 15/294,951, filed on Oct. 17, 2016, now U.S. Pat. No. 10,395,018 (issued on Aug. 27, 2019), which is hereby incorporated by reference in its entirety.

The above-mentioned U.S. Ser. No. 15/294,951 is a Continuation-in-Part (CIP) of U.S. Ser. No. 14/727,873, filed on Jun. 2, 2015, now U.S. Pat. No. 9,526,006 (issued on Dec. 20, 2016); which was a Continuation-in-Part (CIP) of U.S. Ser. No. 14/566,723, filed on Dec. 11, 2014, now U.S. Pat. No. 9,071,969 (issued on Jun. 30, 2015); which is a Continuation of U.S. Ser. No. 13/922,271, filed on Jun. 20, 2013, now U.S. Pat. No. 8,938,787 (issued on Jan. 20, 2015); which is a Continuation-In-Part (CIP) of U.S. Ser. No. 13/877,676, filed on Apr. 4, 2013, now U.S. Pat. No. 9,069,942 (issued on Jun. 30, 2015); which is a National Stage filing of PCT International Application number PCT/IL2011/000907, having an international filing date of Nov. 29, 2011; which claims priority and benefit from U.S. 61/417,479, filed on Nov. 29, 2010; and all of the above-mentioned patent applications are hereby incorporated by reference in their entirety.

The above-mentioned U.S. Ser. No. 15/294,951 also claims priority and benefit from U.S. 62/308,878, filed on Mar. 16, 2016, which is hereby incorporated by reference in its entirety.

The above-mentioned U.S. Ser. No. 16/512,399 is a Continuation-in-Part (CIP) of U.S. Ser. No. 16/416,222, filed on May 19, 2019, now U.S. Pat. No. 10,747,305 (issued on Aug. 18, 2020), which is hereby incorporated by reference in its entirety.

The above-mentioned U.S. Ser. No. 16/416,222 is a Continuation-in-Part (CIP) of U.S. Ser. No. 15/708,155, filed on Sep. 19, 2017, now U.S. Pat. No. 10,298,614 (issued on May 21, 2019), which is hereby incorporated by reference in its entirety.

The above-mentioned U.S. Ser. No. 15/708,155 is a Continuation-In-Part (CIP) of U.S. Ser. No. 15/422,479, filed on Feb. 2, 2017, now U.S. Pat. No. 9,779,423 (issued on Oct. 3, 2017), which is hereby incorporated by reference in its entirety.

The above-mentioned U.S. Ser. No. 15/422,479 claims priority and benefit from U.S. 62/312,140, filed on Mar. 23, 2016, which is hereby incorporated by reference in its entirety.

The above-mentioned U.S. Ser. No. 15/422,479 is also a Continuation-in-Part (CIP) of U.S. Ser. No. 15/276,803, filed Sep. 27, 2016, now U.S. Pat. No. 10,055,560 (issued on Aug. 21, 2018), which is hereby incorporated by reference in its entirety.

The above-mentioned U.S. Ser. No. 15/276,803 is a Continuation-in-Part (CIP) of U.S. Ser. No. 14/325,398, filed on Jul. 8, 2014, now U.S. Pat. No. 9,477,826 (issued on Oct. 25, 2016), which is hereby incorporated by reference in its entirety.

The above-mentioned U.S. Ser. No. 14/325,398 claims priority and benefit from U.S. 61/843,915, filed on Jul. 9, 2013, which is hereby incorporated by reference in its entirety.

The above-mentioned U.S. Ser. No. 14/325,398 is a Continuation-in-Part (CIP) of U.S. Ser. No. 13/922,271, filed on Jun. 20, 2013, now U.S. Pat. No. 8,938,787 (issued on Jan. 20, 2015), which is hereby incorporated by reference in its entirety.

The above-mentioned U.S. Ser. No. 14/325,398 is a Continuation-in-Part (CIP) of U.S. Ser. No. 13/877,676, filed on Apr. 4, 2013, now U.S. Pat. No. 9,069,942 (issued on Jun. 30, 2015); which is a National Stage filing from PCT international application number PCT/IL2011/000907, having an international filing date of Nov. 29, 2011; which claimed priority and benefit from U.S. 61/417,479, filed on Nov. 29, 2010; all of which are hereby incorporated by reference in their entirety.

The above-mentioned U.S. Ser. No. 14/325,398 is a Continuation-in-Part (CIP) of U.S. Ser. No. 14/320,653, filed on Jul. 1, 2014, now U.S. Pat. No. 9,275,337 (issued on Mar. 1, 2016), which is hereby incorporated by reference in its entirety.

The above-mentioned U.S. Ser. No. 14/325,398 is a Continuation-in-Part (CIP) of U.S. Ser. No. 14/320,656, filed on Jul. 1, 2014, now U.S. Pat. No. 9,665,703 (issued on May 30, 2017), which is hereby incorporated by reference in its entirety.

The above-mentioned U.S. Ser. No. 15/422,479 is also a Continuation-in-Part (CIP) of U.S. Ser. No. 15/210,221, filed Jul. 14, 2016, now U.S. Pat. No. 9,674,218 (issued on Jun. 6, 2017), which is hereby incorporated by reference in its entirety.

The above-mentioned U.S. Ser. No. 15/210,221 is a Continuation of U.S. Ser. No. 14/675,768, filed on Apr. 1, 2015, now U.S. Pat. No. 9,418,221 (issued on Aug. 16, 2016), which is hereby incorporated by reference in its entirety.

The above-mentioned U.S. Ser. No. 14/675,768 claims priority and benefit from U.S. 61/973,855, filed on Apr. 2, 2014, which is hereby incorporated by reference in its entirety.

The above-mentioned U.S. Ser. No. 14/675,768 is a Continuation-in-Part (CIP) of U.S. Ser. No. 14/566,723, filed on Dec. 11, 2014, now U.S. Pat. No. 9,071,969 (issued on Jun. 30, 2015); which is a Continuation of U.S. Ser. No. 13/922,271, filed on Jun. 20, 2013, now U.S. Pat. No. 8,938,787 (issued on Jan. 20, 2015); which is a Continuation-in-Part (CIP) of U.S. Ser. No. 13/877,676, filed on Apr. 4, 2013, now U.S. Pat. No. 9,069,942 (issued on Jun. 30, 2015); which is a National Stage filing of PCT international application number PCT/IL2011/000907, having an International Filing Date of Nov. 29, 2011; which claims priority and benefit from U.S. 61/417,479, filed on Nov. 29, 2010; all of which are hereby incorporated by reference in their entirety.

The above-mentioned U.S. Ser. No. 16/416,222 is also a Continuation-in-Part (CIP) of U.S. Ser. No. 15/368,608, filed on Dec. 4, 2016, which is hereby incorporated by reference in its entirety.

The above-mentioned U.S. Ser. No. 15/368,608 is a Continuation-in-Part (CIP) of U.S. Ser. No. 15/001,259, filed on Jan. 20, 2016, now U.S. Pat. No. 9,541,995 (issued on Jan. 10, 2017); which is a Continuation of U.S. Ser. No. 14/320,653, filed on Jul. 1, 2014, now U.S. Pat. No. 9,275,337 (issued on Mar. 1, 2016); all of which are hereby incorporated by reference in their entirety.

The above-mentioned U.S. Ser. No. 14/320,653 claims priority and benefit from U.S. 61/843,915, filed on Jul. 9, 2013, which is hereby incorporated by reference in its entirety.

The above-mentioned U.S. Ser. No. 14/320,653 is also a Continuation-in-Part (CIP) of U.S. Ser. No. 13/922,271, filed on Jun. 20, 2013, now U.S. Pat. No. 8,938,787 (issued on Jan. 20, 2015), which is hereby incorporated by reference in its entirety.

The above-mentioned U.S. Ser. No. 14/320,653 is also a Continuation-in-Part (CIP) of U.S. Ser. No. 13/877,676, filed on Apr. 4, 2013, now U.S. Pat. No. 9,069,942 (issued on Jun. 30, 2015); which is a National Stage filing of PCT International Application number PCT/IL2011/000907, having an international filing date of Nov. 29, 2011; which claimed priority and benefit from U.S. 61/417,479, filed on Nov. 29, 2010; all of which are hereby incorporated by reference in their entirety.

The above-mentioned U.S. Ser. No. 15/368,608 is also a Continuation-in-Part (CIP) of U.S. Ser. No. 14/727,873, filed on Jun. 2, 2015, now U.S. Pat. No. 9,526,006 (issued on Dec. 20, 2016), which is hereby incorporated by reference in its entirety.

The above-mentioned U.S. Ser. No. 15/368,608 is also a Continuation-in-Part (CIP) of U.S. Ser. No. 15/360,291, filed on Nov. 23, 2016, now U.S. Pat. No. 9,747,436 (issued on Aug. 29, 2017); which is a Continuation-in-Part (CIP) of U.S. Ser. No. 14/718,096, filed on May 21, 2015, now U.S. Pat. No. 9,531,701 (issued on Dec. 27, 2016); all of which are hereby incorporated by reference in their entirety.

The above-mentioned U.S. Ser. No. 16/512,399 is also a Continuation-in-Part (CIP) of U.S. Ser. No. 16/242,015, filed on Jan. 8, 2019, now U.S. Pat. No. 10,685,355 (issued on Jun. 16, 2020), which is hereby incorporated by reference in its entirety.

The above-mentioned U.S. Ser. No. 16/242,015 claims benefit and priority from U.S. 62/621,600, filed on Jan. 25, 2018, which is hereby incorporated by reference in its entirety.

The above-mentioned U.S. Ser. No. 16/242,015 is a Continuation-in-Part (CIP) of U.S. Ser. No. 16/057,825, filed on Aug. 8, 2018, now U.S. Pat. No. 10,523,680 (issued on Dec. 31, 2019), which is hereby incorporated by reference in its entirety. The above-mentioned U.S. Ser. No. 16/242,015 further claims priority and/or benefit from all the patent applications from which U.S. Ser. No. 16/057,825 had directly or indirectly claimed priority and/or benefit.

The above-mentioned U.S. Ser. No. 16/242,015 is also a Continuation-in-Part (CIP) of U.S. Ser. No. 15/885,819, filed on Feb. 1, 2018, which is hereby incorporated by reference in its entirety. The above-mentioned U.S. Ser. No. 16/242,015 further claims priority and/or benefit from all the patent applications from which U.S. Ser. No. 15/885,819 had directly or indirectly claimed priority and/or benefit.

The above-mentioned U.S. Ser. No. 16/242,015 is also a Continuation-in-Part (CIP) of U.S. Ser. No. 15/368,608, filed on Dec. 4, 2016, which is hereby incorporated by reference in its entirety. The above-mentioned U.S. Ser. No. 16/242,015 further claims priority and/or benefit from all the patent applications from which U.S. Ser. No. 15/368,608 had directly or indirectly claimed priority and/or benefit.

FIELD

The present invention is related to the security of electronic devices and systems.

BACKGROUND

Millions of people around the world utilize mobile electronic devices, such as smartphones and tablets, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

Some embodiments of the invention comprise a system, a method, and a device of detecting identity of a user and authenticating a user; as well as detecting a possible attacker or impostor, and differentiating among users of an electronic device or of a computerized service.

For example, a mobile or portable electronic device is utilized to capture a self-taken image of a user, which is utilized as a user-authentication factor. The accelerometer and gyroscope of the mobile device, sense and measure geo-spatial device properties during, before or after the submission of the self-image authentication factor; and based on such geo-spatial device properties, the system determines liveness of the user, freshness of the submitted self-image, and possibly differentiates between a legitimate user and an attacker.

Similarly, geo-spatial device properties that accompany the entry or the submission of a biometric sample, such as fingerprint scan or retina scan, are used to detect liveness or freshness or authenticity of such biometric samples, and are used to differentiate between a legitimate user and an attacker.

The present invention may provide other and/or additional benefits or advantages.

BRIEF DESCRIPTION OF THE DRAWINGS

FIG. 2 is an illustration of three graphs, which demonstrate acceleration as a function of time over three separate axes, in accordance with some demonstrative embodiments of the present invention.

DETAILED DESCRIPTION OF THE INVENTION

Figure 1:
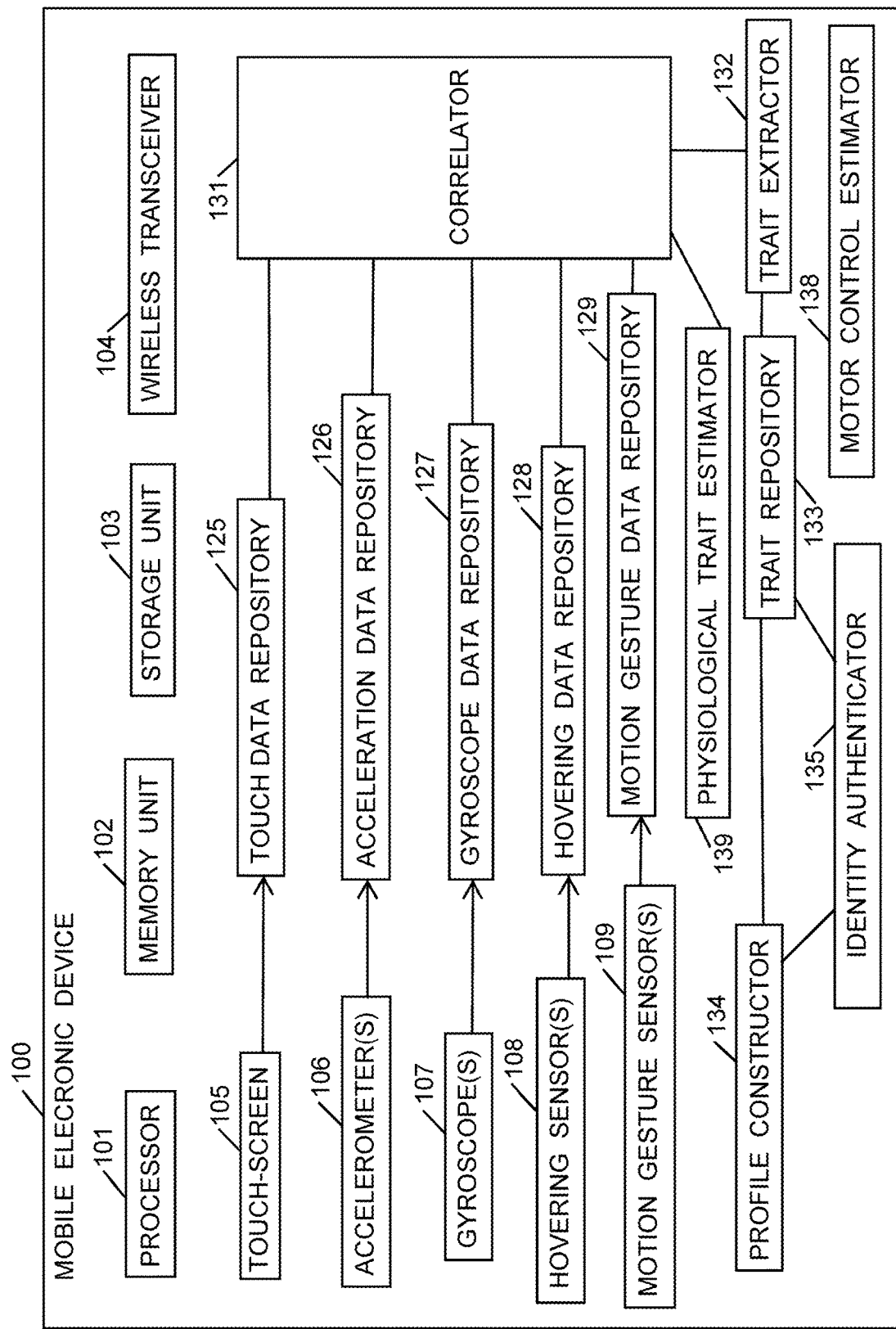
FIG. 1 is a schematic block diagram illustration of a mobile electronic device, in accordance with some demonstrative embodiments of the present invention.

The present invention may include, for example, systems, devices, and methods for detecting identity of a user of a mobile electronic device, and for determining that a mobile electronic device is used by a fraudulent user.

In accordance with the present invention, for example, a method for confirming identity of a user of a mobile electronic device may comprise: receiving touch data from a touch-screen of the mobile electronic device; receiving acceleration data from an accelerometer of the mobile electronic device; correlating between the touch data and the acceleration data; based on the correlating, generating a user-specific trait indicative of said user.

In accordance with the present invention, for example, the method may comprise: storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device.

In accordance with the present invention, for example, storing comprises: storing within said mobile electronic device; and said comparison is performed within said mobile electronic device.

In accordance with the present invention, for example, storing comprises storing externally to said mobile electronic device; and said comparison is performed externally to said mobile electronic device, and comprises wirelessly receiving at the mobile electronic device an indication of said comparison.

In accordance with the present invention, for example, said touch data comprises non-tactile touch data indicating a hovering user gesture in proximity to said touch-screen.

In accordance with the present invention, for example, the method may comprise: receiving gyroscope data from a gyroscope of the mobile electronic device; correlating between the touch data and the gyroscope data; based on the correlating between the touch data and the gyroscope data, generating another user-specific trait indicative of said user.

In accordance with the present invention, for example, the method may comprise: capturing non-tactile motion data indicating a user gesture; correlating between the non-tactile motion data and the acceleration data; based on the correlating between the non-tactile motion data and the acceleration data, generating another user-specific trait indicative of said user.

In accordance with the present invention, for example, the method may comprise: comparing between (a) a currently-calculated value of the user-specific trait, corresponding to a current usage of the mobile electronic device, and (b) a previously-calculated value of the user-specific trait, corresponding to a previous usage of the mobile electronic device; and based on a comparison result, performing at least one of: restricting access of said user to an online service; restricting access of said user to an application installed on said mobile electronic device; requiring the user to authenticate his identity to an online service; requiring the user to authenticate his identity to an application installed on said mobile electronic device.

In accordance with the present invention, for example, the method may comprise: based on said touch data, estimating user-specific motor control parameters and user-specific motor control noise; and based on the estimated user-specific motor control parameters and user-specific motor control noise, differentiating between said user and another user.

In accordance with the present invention, for example, the method may comprise: based on said touch data, estimating user-specific motor control parameters and user-specific motor control noise of a control loop which comprises translation error and gesture velocity error; and based on the estimated user-specific motor control parameters and user-specific motor control noise, differentiating between said user and another user.

In accordance with the present invention, for example, the method may comprise: based on said correlating, estimating a user-specific physiological trait of said user; and based on the user-specific physiological trait, differentiating between said user and another user.

In accordance with the present invention, for example, estimating the user-specific physiological trait of said user comprises at least one of: estimating a length of a finger of the user; estimating a width of a finger of the user; estimating a size-related parameter of a finger of the user; estimating a distance between a tip of a finger of the user and another part of a hand of the user.

In accordance with the present invention, for example, the method may comprise: based on said correlating, estimating a user-specific behavioral trait of said user; and based on the user-specific behavioral trait, differentiating between said user and another user.

In accordance with the present invention, for example, estimating the user-specific behavioral trait of said user comprises: determining that said user typically performs a particular inadvertent gesture while performing a user-intended input-providing gesture.

In accordance with the present invention, for example, estimating the user-specific behavioral trait of said user comprises one or more of: determining that said user typically moves the mobile electronic device at a particular direction while performing a touch gesture; determining that said user typically rotates the mobile electronic device while performing a touch gesture; determining that said user typically slants the mobile electronic device at a particular angle while performing a touch gesture.

In accordance with the present invention, for example, estimating the user-specific behavioral trait of said user comprises: determining that said user typically holds the mobile electronic device with a first hand of the user and concurrently performs an input-providing gesture with a second hand of the user.

In accordance with the present invention, for example, estimating the user-specific behavioral trait of said user comprises: determining that said user typically holds the mobile electronic device with a single hand and concurrently performs an input-providing gesture with said single hand.

In accordance with the present invention, for example, the method may comprise: based on said correlating, estimating a first user-specific behavioral trait of said user which corresponds to a first usage scenario; based on said correlating, estimating a second user-specific behavioral trait of said user which corresponds to a second usage scenario; based on the first and second user-specific behavioral traits, differentiating between said user and another user.

In accordance with the present invention, for example, the method may comprise: based on said correlating, estimating a first user-specific behavioral trait of said user which corresponds to a first usage scenario in which said user operates said mobile electronic device while the user holds said mobile electronic device; based on said correlating, estimating a second user-specific behavioral trait of said user which corresponds to a second usage scenario in which said user operates said mobile electronic device while the user does not hold said mobile electronic device; based on the first and second user-specific behavioral traits, differentiating between said user and another user.

In accordance with the present invention, for example, a mobile electronic device may be configured to confirm identity of a user of said mobile electronic device; the mobile electronic device comprising: a touch-screen to receive touch data; an accelerometer to receive acceleration data; a correlator module to correlate between the touch data and the acceleration data; a trait extractor module to generate a user-specific trait indicative of said user, based on correlation between the touch data and the acceleration data.

Applicants have realized that each user of a mobile electronic device may handle the device in a unique manner which may be detected and may be utilized for confirming the identity of the user, or for other security-related purposes or fraud-detection purposes. Applicants have realized, for example, that different users cause different type of acceleration to the mobile device when they perform the same operation or touch-gesture (e.g., swiping or tapping or scrolling on the touch-screen), or may tilt or rotate or slant the mobile device in different, unique ways when they perform such gestures or operations.

The present invention may include, for example, biometric modalities, personal trait extraction modalities, and/or identity authentication modalities which may be used in conjunction with a mobile or portable electronic device, and may utilize a combination of (or correlation between) acceleration parameters and/or touch data. Such parameters may be used in order to deduce unique insights regarding the identity or possible identity of the user of the mobile electronic device, or in order to determine whether or not the user is considered to be the "genuine" user, or in contrast, an attacker or impersonator or "fraudster".

The present invention may capture, monitor, or otherwise utilize for deduction of insights, the coupling or correlation between (a) touch-screen interaction, or other user gestures, and (b) accelerometer(s) measurements and/or gyroscope(s) measurements. The present invention may further deduce and/or utilize one or more other biometric traits or identity-authentication traits, for example, touch or swipe locations, pressure dynamics, identification of physiological regions (e.g., in the hand of the user) that move while other regions do not move when a user gesture is performed, or other suitable traits in order to assist in identification and/or authentication of the user of the mobile device.

The present invention may sufficiently capture unique qualities of a human user to be usable as a biometric for authentication. Different people may have different preferred orientations for holding or grasping (e.g., in their hand) a mobile device, and/or a different way in which they press or touch or tap the touch-screen (e.g., the applied force, the duration of the tapping, or the like).

Applicants have realized that physical traits such as, for example, hand size, hand mass, or other traits, may change the way in which a user's interacting hand and his device-holding hand are correlated. In a demonstrative example, the present invention may distinguish or differentiate between (a) a person who is using one single hand for both holding the mobile device and tapping on its touch-screen (or performing other touch gesture), and (b) a person who is using one hand to hold the mobile device and another hand to tap on its touch-screen (or to perform other touch gesture or user gesture).

Moreover, as Applicants have realized, different tap locations (e.g., top-left corner or region of the touch-screen, versus bottom-right corner or region) may create different torque(s) on the mobile device, further depending on the tap strength, the offset of the mobile device in the hand (e.g., the device being held high or low, with the palm area or the fingers area, or the like) and/or the size of the hand (e.g., if the same hand is used for both holding the device and tapping on its touch-screen).

The terms "mobile device" or "mobile electronic device" as used herein may include, for example, a smartphone, a cellular phone, a mobile phone, a tablet, a handheld device, a portable electronic device, a portable gaming device, a portable audio/video player, a smart-watch, a digital watch, a digital wrist-watch, an Augmented Reality (AR) or Virtual Reality (VR) device or glasses or helmet or headset (e.g., similar to Google Glass, or similar to Oculus Rift), a fitness band or fitness watch, a laptop computer, a tablet computer, a notebook computer, a netbook computer, an electronic device which comprises at least an accelerometer and a touch-screen, or the like.

The term "genuine user" as used herein may include, for example, an owner of a mobile electronic device; a legal or lawful user of a mobile electronic device; an authorized user of a mobile electronic device; a person who has legal authorization and/or legal right to utilize a mobile electronic device, for general purpose(s) and/or for one or more particular purpose(s); or the person who had originally defined user credentials (e.g., username and password) for performing an activity through the mobile electronic device.

The term "fraudulent user" as used herein may include, for example, any person who is not the "genuine user" of the mobile electronic device; an attacker; an intruder; a man-in-the-middle attacker; a man-in-the-browser attacker; an unauthorized user; an impersonator; a hacker; a cracker; a person attempting to hack or crack or compromise a security measure utilized by the mobile electronic device or utilized by an activity or service accessible through the mobile electronic device; a fraudster; a human fraudster; a "bot" or a malware or an automated computerized process (e.g., implemented by using software modules and/or hardware components) which attempts to imitate human behavior or which attempts to act as if such "bot" or malware or process was the genuine user; or the like.

The term "user gesture" as used herein may include, for example, a gesture or movement or other operation that a user of a mobile device performs on a touch-screen of the mobile device, or performs in proximity to the touch-screen of the mobile device; touch gesture; tap gesture or double-tap gesture or prolonged tap gesture; scroll gesture; drag gesture, or drag-and-drop gesture; release gesture; click or double-click gesture; hovering gestures, in which the user may hover with his finger(s) or hand(s) in proximity to the touch-screen of the mobile device but without necessarily touching the touch-screen device; hovering gestures that may be captured by a camera of the mobile device, or by a touch-screen of the mobile device (e.g., by taking into account electrical and/or magnetic effects of such gestures); hovering gestures which may be generally similar to touch-free hovering gestures that a Samsung Galaxy S4 smartphone is able to detect; finger(s) gestures and/or hand(s) gestures made in a three-dimensional space, for example, similar to movement gestures that a Microsoft Kinect motion sensing input device is able to sense; and/or a combination of such gestures or other gestures.

Reference is made to FIG. 1, which is a schematic block diagram illustration of a mobile device 100 in accordance with the present invention. Mobile device 100 may comprise, for example, a processor 101, a memory unit 102, a storage unit 103, a wireless transceiver 104, a touch-screen 105, one or more accelerometers 106, and one or more gyroscopes 107. Mobile device 100 may further comprise, for example, one or more hovering sensors 108, one or more motion gesture sensor(s) 109, a correlator 131, a trait extractor 132, a trait repository 133, a profile constructor module 134, an identity authenticator module 135, and a physiological trait estimator 139. Mobile device 100 may comprise other suitable hardware components and/or software modules, for example, a power source (e.g., a rechargeable battery), an Operating System, software applications, or the like.

Touch-screen 105 may receive user gestures, for example, tapping, double-tapping, dragging, pressing, holding down, releasing, scrolling, pinching fingers for zoom-out, spreading fingers for zoom-in, or the like). Touch data may be stored in a touch data repository 125, optionally in association with a time-stamp associated with each touch data-item being stored.

Accelerometer(s) 106 may comprise, for example, a three-axis accelerometer able to measure acceleration, separately, along three axes (X axis, Y axis, Z axis). Accelerometer readings may be stored in an acceleration data repository 126, optionally in association with a time-stamp associated with each acceleration data-item being stored.

Gyroscope(s) 107 may comprise, for example, a three-axis gyroscope able to measure orientation and/or rotation, e.g., separately along three axes (X axis, Y axis, Z axis). The measured data may be stored in a gyroscope data repository 127, optionally in association with a time-stamp associated with each orientation/rotation data-item being stored.

Hovering sensor(s) 108 may comprise, for example, one or more sensors (e.g., optical sensors, magnetic sensors, electric sensors, touch-screen components, camera components, or the like) able to sense hovering gesture(s) of the user of device 100, for example, in a three-dimensional space or separately along three axes (X axis, Y axis, Z axis). The measured data may be stored in a hovering data repository 128, optionally in association with a time-stamp associated with each hovering data-item being stored.

Motion gesture sensor(s) 109 may comprise, for example, one or more sensors able to sense motion gesture(s) of the user of device 100, for example, in a three-dimensional space or separately along three axes (X axis, Y axis, Z axis). The measured data may be stored in a motion gesture data repository 129, optionally in association with a time-stamp associated with each motion gesture data-item being stored.

Correlator 131 may search for, or identify or determine, correlation among (a) acceleration data and/or gyroscope data, and (b) touch data and/or hovering data and/or motion gesture data. Trait extractor 132 may determine one or more user-specific traits or characteristics which may be, or may appear to be, unique to (or indicative of) a particular user, based on one or more correlation(s) identified by correlator 131. Trait values or trait indicators, or data indicative of extracted user-specific traits, may be stored in a trait repository 133.

Profile constructor module 134 may utilize a learning algorithm to construct a user profile based on the one or more user-specific traits identified by trait extractor 132 and stored in trait repository 133. Profile construction may be performed over a per-defined time period (e.g., five hours, or three days) of the user interacting with device 100; or over a pre-defined number of interactions (e.g., 12 or 25 or 100 interactions) of the user with device 100. Optionally, profile constructor module 134 may dynamically extend or shorten or modify the required time-period or interaction number, for example, if traits of a particular user are distinctive and are rapidly extracted over a shorter period of time or over a smaller number of user interactions. Constructed user profiles may be stored in a user profile repository, which may be internal to device 100 or may be external thereto (e.g., in a remote server or in a "cloud computing" server), optionally with an associated flag or parameter indicating whether a particular user profile is fully constructed or under construction.

Identity authenticator module 135 may capture one or more traits of a user who is currently utilizing device 100, and may analyze and determine whether or not these traits are similar to, or different from, user-specific traits in a user profile associated with a user that is believed to be a "genuine" user of device 100. The analysis results may be notified by identity authenticator module 135 to other units or modules, within device 100 (e.g., an application or process running in device 100) and/or externally to device 100 (e.g., on a remote server, on a remote web-site or web-page, in a "cloud" server or device).

For example, if the analysis indicates that the current user of device 100 is not the genuine user, then, one or more fraud-stopping operations or additional authentication operations may be triggered and performed, for example, requiring the user to re-enter his password or pass-phrase or Personal Identification Number (PIN), requiring the user to answer one or more security questions, requiring the user to perform log-in operations or to provide account details (e.g., to provide date-of-birth data), requiring the user to place a phone call to a fraud department or a security department of a service or entity associated with an application running on device 100; blocking or restricting or curtailing access of the user to one or more services or features which may be generally available through device 100; or the like.

Correlator 131 may identify user-specific physiological correlations. For example, correlator 131 may identify one or more geometric place(s), on touch-screen 105 or in a space proximate to touch-screen 105, in which a user gesture is associated with movement of a user body part (e.g., the thumb; one or more fingers; the palm or wrist) while also being associated with rest or non-movement of other body parts of the user. Based on the user-specific physiological correlations, trait extractor 132 may extract user-specific physiological trait(s).

In a demonstrative example, trait extractor 132 may determine that for the user Adam, a vertical scroll-down touch-gesture is typically associated with movement of the root of the thumb, while the other fingers are at rest and while the wrist or palm-base are at rest; whereas, for the user Bob, a vertical scroll-down touch-gesture is typically associated with both movement of the root of the thumb, as well as with slight rotational movement of fingers that hold or support the rear of the mobile device, and while the wrist or palm-base are at rest. This may be subsequently used for user authentication or for identity confirmation, to distinguish between a "genuine" user (e.g., Adam) and a fraudulent user or non-genuine user (e.g., Bob) when the user of device 100 performs a similar user gesture.

In another demonstrative embodiment, correlator 131 may determine that the user of device 100 (e.g., the "genuine" user), while performing a primary gesture or an intended gesture (e.g., required in order to provide user input to device 100), typically also performs a secondary gesture an inadvertent gesture (e.g., not required in order to provide user input to device 100). For example, the primary gesture may be a scrolling gesture, a zoom-in or zoom-out gesture, a dragging gesture, a tapping gesture, or other user input gesture; whereas, the secondary gesture (e.g., the inadvertent or unintended gesture, to which the user may not even be aware) may be, for example, slight or significant rotating or spinning of device 100, slight or significant movement of device 100 (e.g., in a particular direction), slight or significant tilting or slanting of device 100 (e.g., at a particular angle or range-of-angles), or the like.

In another demonstrative embodiment, correlator 131 may be associated with, or may operate in conjunction with, physiological trait estimator 139 which may be able to indirectly estimate one or more physiological traits or physiological characteristics of the user of device 100, and particularly, of the hand(s) or finger(s) (e.g., a finger, a thumb, or the like) of that user. For example, physiological trait estimator 139 may estimate a width of a finger or thumb based on a width of a swiping trace performed by the finger on touch-screen 105; may estimate a length of a finger or thumb based on a radius of a circular or arched or curved swiping motion on touch-screen 105; may estimate the distance between the tip of a finger or thumb and the palm of the hand, or the wrist; may estimate other dimensions of hand-parts, or relations between such hand parts; or the like. Physiological trait estimator 139 may thus estimate physiological characteristics which may be unique to a particular user, and may assist in confirming user identity and/or in detecting a non-genuine user impersonating the genuine user.

Additionally or alternatively, correlator 131 may be associated with, or may operate in conjunction with, a motor control estimator 138 which may estimate user-specific motor control parameters based on the user's interaction with mobile device 100. Such parameters may include, for example, parameters of the action-perception loop modeling the hand-eye coordination, as well as control loop parameter, motor noise, perception noise, or the like. Motor control estimator 138 may estimate user-specific parameters of motor control, which may be more inherent to the user and may be less action-dependent.

In a demonstrative implementation, for example, motor control estimator 138 may track a user gesture on the touch-screen (e.g., a scroll or swipe gesture). The movement or gesture may begin at rest in a start-point ($X_0$, $Y_0$), and may end at rest in an end-point ($X_1$, $Y_1$). A demonstrative control loop of the second order, for example, may assume that the force of the hand is governed by a linear combination of two error terms: a translation error, and the current velocity error.

The translation error may be represented as:

$$\Delta x = (x_1 - x(t))$$

The current velocity error may be represented as:

$$\Delta v_x = \frac{d}{dt} x(t)$$

The control loop may be represented (for the X-axis, and similarly and separately also for the Y-axis) as:

$$\frac{d^2 x(t)}{dt^2} = \alpha_x \Delta x + \beta_x v_x + n_x$$

In the last equation, $\alpha_x$ and $\beta_x$ are control loop parameters, and $n_x$ is motor control noise (e.g., Gaussian random variable). Accordingly, motor control estimator 138 may estimate or may simulate trajectories which may be similar to human trajectories; and although a velocity curve may be different for each movement of the same movement, the velocity curve may be generated by the same model parameters of that specific user. Motor control estimator 138 may thus estimate these three parameters (for the X-axis, and/or for the Y-axis), thereby estimating user-specific motor control traits which may be used for differentiating between a genuine user and an impersonator or attacker, regardless of the specific movement(s) or gesture(s) performed. The above is only a demonstrative example, and motor control estimator 138 may utilize other motor control estimations, forward model(s), feedback model(s), estimation of similar peak velocity (or other movement properties) for different movements (e.g., if the error terms are distorted by a non-linear function).

Additionally or alternatively, correlator 131 may identify user-specific behavioral correlations. For example, correlator 131 may identify that when a particular user performs a particular user-gesture, performance of the gesture affects in a particular way the acceleration data and/or the orientation/rotation data of device 100. Based on the user-specific behavioral correlations, trait extractor 132 may extract user-specific behavioral trait(s).

In a demonstrative example, trait extractor 132 may determine that for the user Adam, a horizontal swipe gesture is typically associated with a counter-clockwise rotation in the range of 10 to 15 degrees around a vertical axis (e.g., a rotation axis parallel to the longest dimension of device 100); whereas, for the user Bob, a horizontal swipe gesture is typically associated with a clockwise rotation in the range of 5 to 10 degrees (or, with substantially no rotation at all) around that vertical axis. This may be subsequently used for user authentication or for identity confirmation, to distinguish between a "genuine" user (e.g., Adam) and a fraudulent user or non-genuine user (e.g., Bob) when the user of device 100 performs a similar user gesture.

Correlator 131 may be configured to search for, and detect, other user-specific behavioral correlations, for example: correlations based on the manner of holding device 100 (e.g., a primary angle of holding), and the effect of various user gestures on such holding or on the primary angle of holding; correlations based on the stability or the shakiness of device 100 (e.g., optionally taking into account the amount and/or frequency and/or timing of hand vibrations or hand movements), and the effect of various user gestures on such device stability or shakiness, or on stability or shakiness of the hand of the user that holds or operates device 100; correlations based on movement, spinning, rotation and/or acceleration of device 100, along one axis or two axes or three axes, as a result of (or concurrently with) a user gesture such as, for example, tap, double-tap, prolonged tap, release, drag, drag and drop, click, double-click, rotation or movement of an on-screen object, rotation of device 100 by 90 degrees or 180 degrees or 270 degrees, horizontal or vertical or diagonal swipe gesture, scroll gesture, zoom-in or zoom-out gestures, user operations on physical buttons or sliders or interface components of device 100 (e.g., volume interface, camera button, button for capturing an image or a video), or the like.

Correlator 131 may further detect correlations based on movement, spinning, rotation and/or acceleration of device 100, along one axis or two axes or three axes, that occur prior to or subsequent to a user gesture. For example, correlator 131 may detect that a first particular user typically tilts the phone from being generally perpendicular to the ground, to being generally parallel to the ground, immediately prior to performing a zoom-out gesture (e.g., a "pinching" gesture with two fingers on touch-screen 105). Similarly, correlator 131 may detect that a second particular user typically rotates the phone counter-clockwise, immediately subsequent to performing a zoom-in gesture (e.g., spacing apart two fingers on touch-screen 105). In some implementations, for example, a correlation may be detected while the user gesture is performed, immediately before the user gesture is performed (e.g., within 0.5 seconds prior to the user gesture), and/or immediately after the user gesture is performed (e.g., within 0.5 seconds subsequent to the user gesture).

Optionally, correlator 131 may detect other suitable correlations, and may take into account other types of readings or sensed data, for example, data indicating a temperature or moisture level or sweat level which may be associated with a user gesture, data indicating the amount of pressure or force applied by a user (e.g., when pressing on touch-screen 105), or the like.

In a demonstrative example, a first user may typically scroll down with his finger on touch-screen 105 while slightly rotating the mobile device 100 around its longest axis; and a correlation may be identified between the respective touch data and acceleration/orientation data, indicative of the first user. In contrast, a second user may typically scroll down while maintaining the mobile device 100 non-rotating, or while rotating mobile device 100 at a different direction or angle, or at a different acceleration value, thereby allowing to identify a different correlation, indicative of the second user.

Optionally, the present invention may identify, create and utilize a first set of behavioral traits which correspond to the behavior of a particular user when he is utilizing his mobile device in a first holding scenario (e.g., when the user is holding the mobile device in his hand), and a second (different) set of behavioral traits which correspond to the behavior of that particular user when he is utilizing his mobile device in a second holding scenario (e.g., when the mobile device is placed on a table or flat surface and the user operates the mobile device without holding it). Accordingly, the present invention may create and utilize a behavioral profile for that user, which may comprise multiple sub-profiles of behavioral traits that correspond to such multiple usage scenarios by the same (e.g., "genuine") user. In a subsequent usage of the mobile device, the system may compare the behavioral traits of the subsequent user, to each one (e.g., separately) of the pre-stored sets of behavioral traits (or behavioral sub-profiles), in order to detect or determine whether that subsequent user is the "genuine" user operating in one of the known usage scenarios, or alternatively a fraudulent user or attacker. Similarly, the present invention may generate and/or utilize complex profiles that may comprise of sub-profiles or sets of traits (e.g., behavioral traits, physiological traits, motor control traits), such that each set or sub-profile may correspond to a particular usage scenario or a particular holding scenario of the user; and a subsequent usage may be compared, separately, to each one of those sub-profiles (or sets of traits) in order to determine user authenticity.

The terms "correlation", "correlator", "to correlate", and similar or equivalent terms which may be used herein, are used for demonstrative purpose only; they may include, for example, statistical correlation, or statistically-significant correlation, or any other type of relation or indication or matching between two parameters or between groups of values. In some embodiments, there need not be statistically-significant correlation between, for example, touch data and acceleration data, in order to identify or extract unique user trait(s); but rather, there may be other type of relation or matching between touch-data and acceleration data in order to determine such "correlation".

In accordance with the present invention, mobile device 100 may continuously track and/or monitor the correlation between touch-data and acceleration/orientation data. Correlation values may be used to determine user-specific traits, that are indicative of the user of the mobile device 100, which may be regarded initially as the "genuine" user. Then, during subsequent usage of the mobile device 100, correlation between touch-data and acceleration/orientation data may be tracked and identified, and may be compared to the correlation previously-determined for the genuine user, in order to confirm that a current user is indeed the genuine user, or in order to determine or to estimate that a current user is a non-genuine user.

In a demonstrative implementation, an application or a website may be accessible through device 100 through an access control process or a user authentication process. Such application or website may be, for example, an email account, a social network account, a video conference application, a chat application, an online banking application or website, a securities trading application or website, an electronic commerce account or website, or the like. The user may be prompted to create a new user account (e.g., define a username and password); and then, or in parallel, user-specific traits may be captured through passive means and/or active means, which may be known to the user or may be hidden from the user.

For example, a profile creation page or application may require the user to perform various touch operations (e.g., tapping, scrolling, dragging, or the like), and may capture touch data as well as acceleration/orientation data, which may then be correlated in order to identify a biometric trait indicative of the user who is currently creating the profile, or who is otherwise believed to be a genuine user (e.g., based on password entry and/or responses to security questions or other challenge-response mechanisms). Optionally, an active challenge may be posed to the user, for example, by explicitly asking the user to perform one or more particular touch gestures on touch-screen 105, either as "hidden" challenges (in which the user is not aware that he is actively challenged for security purposes) or as non-hidden challenges (in which the user is advised that, as a security measure, he is required to perform certain touch gestures in order to extract biometric traits).

Figure 5:
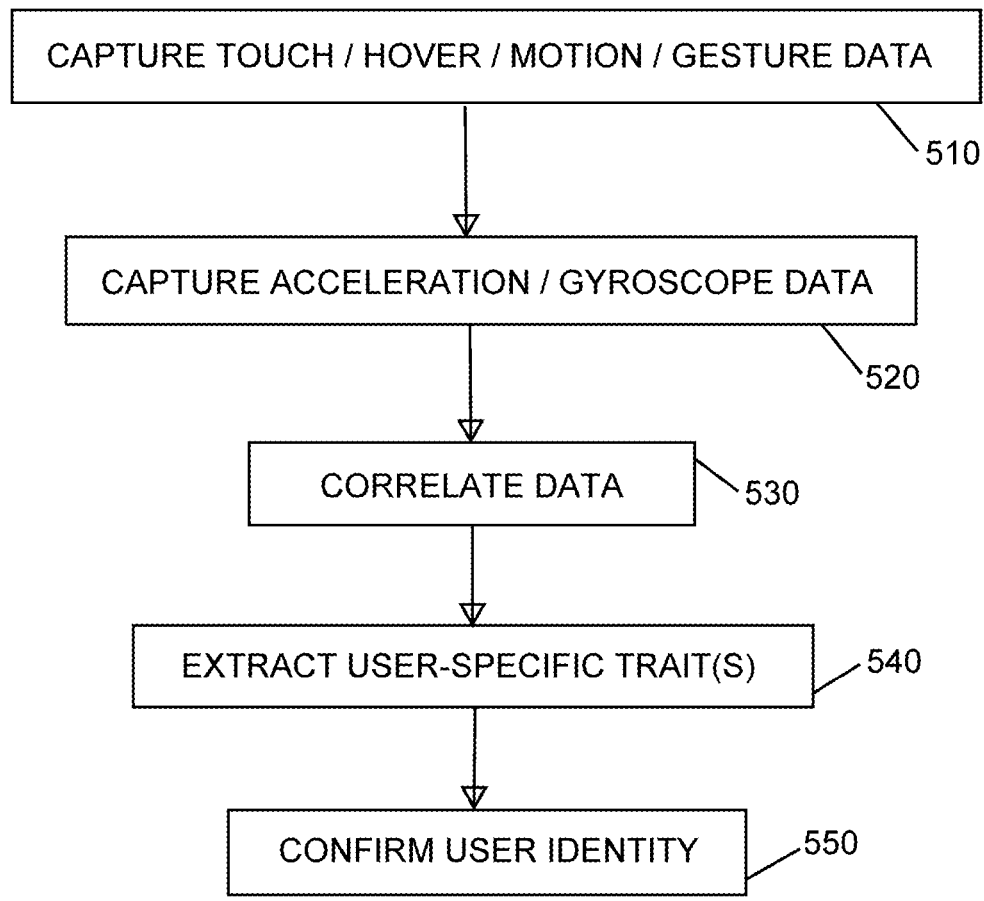
FIG. 5 is a flow-chart of a method, in accordance with some demonstrative embodiments of the present invention.

Reference is made to FIG. 5, which is a flow-chart of a method in accordance with some demonstrative embodiments of the present invention. The method may be implemented by a mobile electronic device, by one or more hardware components and/or software modules of a mobile electronic device, by a system, or the like.

The method may include, for example, capturing at least one of touch data, hovering data, motion data, gesture data (block 510).

The method may include, for example, capturing at least one of acceleration data, gyroscope data, device orientation/rotation data, principal axes rotation data (e.g., normal axis or yaw, lateral axis or pitch, longitudinal axis or roll) (block 520).

The operations of block 520 may be performed simultaneously or concurrently with, or in parallel to, the operations of block 510.

The method may include, for example, correlating or matching (block 530) between the data captured in block 510 and the data captured in block 520.

The method may include, for example, extracting a user-specific trait (block 540) based on the correlating or matching of block 530. The user-specific trait may include, for example, one or more behavioral traits, physiological traits, motor control traits, or other user-specific characteristics.

The method may include, for example, subsequently, confirming user identity based on said user-specific trait (block 550).

Other suitable operations may be used in accordance with the present invention.

Some embodiments of the present invention may be utilized, or may operate, in conjunction with methods, algorithms, devices and/or systems which are described in PCT International Application Number PCT/IL2011/000907, titled "Method and Device for Confirming Computer End-User Identity", published on Jun. 7, 2012 as International Publication Number WO/2012/073233, which is hereby incorporated by reference in its entirety; and/or in U.S. patent application Ser. No. 13/877,676, filed on Apr. 4, 2013, which is hereby incorporated by reference in its entirety.

In accordance with the present invention, correlation between touch-data and acceleration/orientation data may be identified and/or checked locally in mobile device 100; or remotely, such as in a remote server which may receive such data via a wireless communication link from mobile device 100; or by using other suitable architecture, for example, a hybrid architecture in which some operations may be performed locally and other operations may be performed remotely. Accordingly, components or modules that are depicted, for demonstrative purposes, as being included in mobile device 100, may be implemented at a remote server or within other suitable units. The present invention may be implemented in a stand-alone mobile device, such that data collection and processing may be performed within device 100; or in a client-server architecture, such that device 100 may collect data and may wirelessly transmit the collected data to a remote server for processing and analysis; or in a "cloud computing" architecture in which data is stored remotely and is also processed remotely. Other suitable architectures may be used, to deploy a system in which a particular mobile device "knows" or recognizes its genuine user, or, to deploy a system in which a particular application or website "know" or recognize a genuine user, based on the above-mentioned correlations.

In a demonstrative experiment in accordance with the present invention, multiple participants were asked to hold a particular mobile device (an iPad tablet), to drag (with a finger) a displayed green circle towards a displayed red target, and then to release the dragged item once it reached the red target. Accelerometer data and touch data were collected while performing the requested operations.

The experiment measured the touch and release signals, as well as accelerometer measurements; and then triggered the acceleration data according to the touch time. FIG. 2 depicts three graphs 201-203, which demonstrate acceleration as a function of time over three separate axes, thereby demonstrating at least two identifying characteristics which may be used as a user-specific trait. As a first identifying characteristic, the phasic level (observed at the X axis) may have different values for different people, corresponding to different posture of the mobile device. As a second identifying characteristic, the transient shape once the device is clicked (observed at the Z axis) may have different values for different people. This data may be transformed or analyzed, for example, by using dimension reduction techniques (e.g., kernel-principle-component-analysis), thereby demonstrating the biometric capability of synergizing between touch data and acceleration data.

Figure 3:
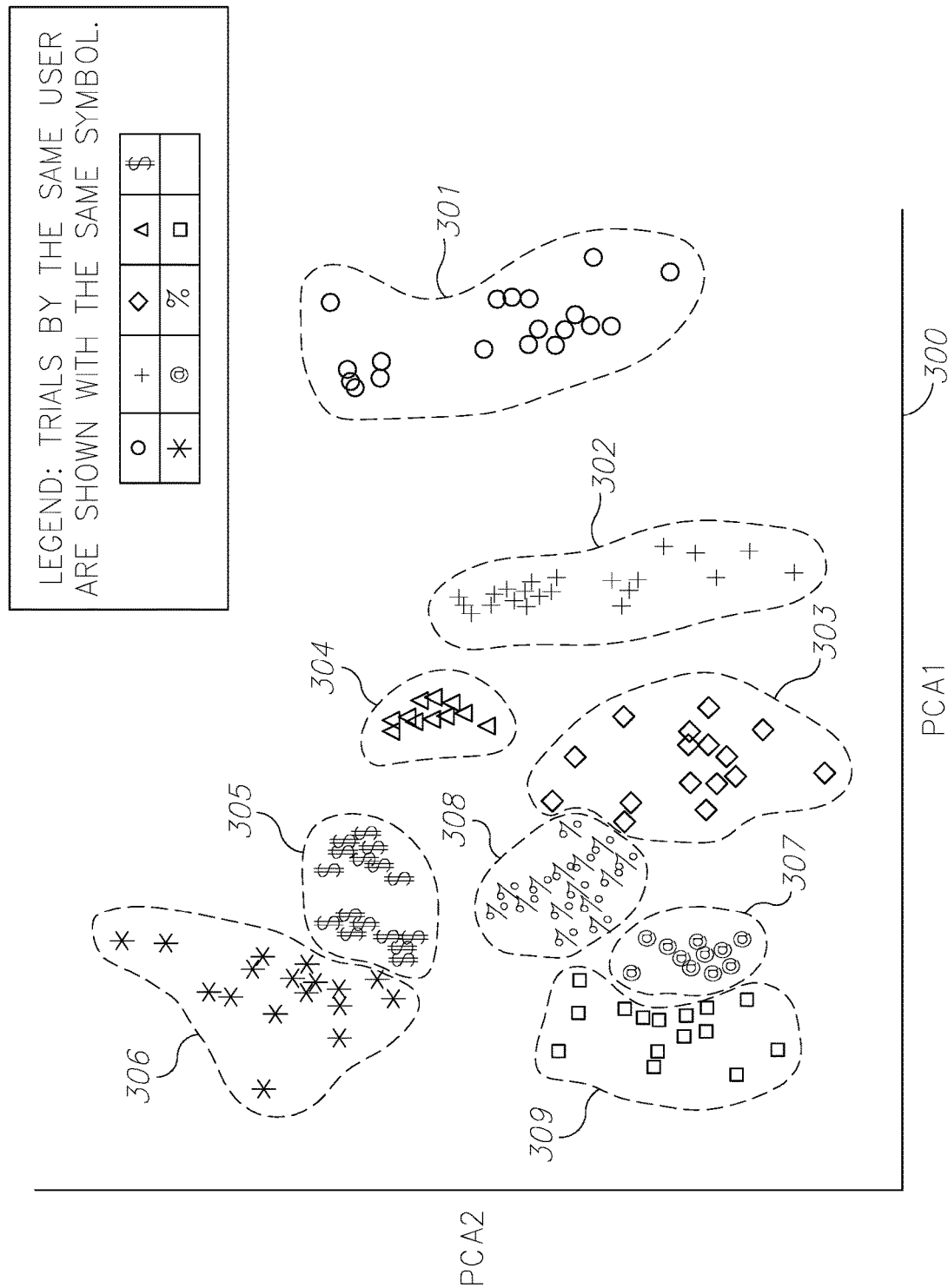
FIG. 3 is an illustration of a graph of the main axes of dimension-reduced space of accelerometer reaction to tapping, in accordance with some demonstrative embodiments of the present invention.

Reference is made to FIG. 3, which demonstrates a graph 300 of the main axes of the dimension-reduced space of the accelerometer reaction to tapping. Each small item in graph 300 represents one trial, and each shape or character in graph 300 (e.g., circle, square, diamond, triangle) represents a different user. This drawing demonstrates identifiable clusters 301-309 of trials, each such cluster corresponding to a different user.

Figure 4:
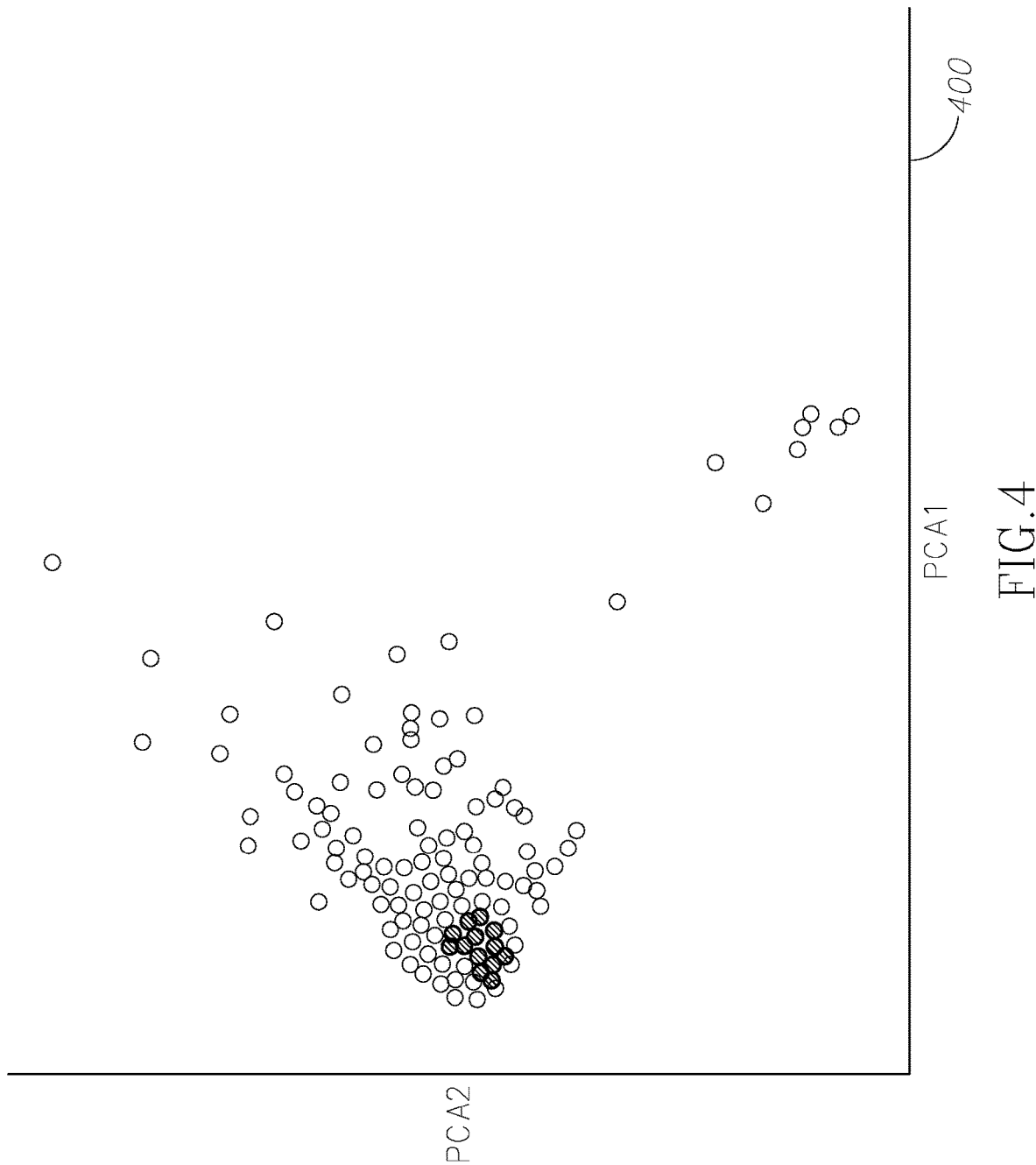
FIG. 4 is an illustration of a graph depicting feature space, in accordance with some demonstrative embodiments of the present invention.

In certain scenarios, posture data (e.g., phasic response) may be neglected or may not be available, for example, if the mobile device is operated while being placed on a table or a flat surface and is not hand-held by the user. In such scenarios, only the device's kinematics during taps may be taken into account, and still the present invention may capture sufficient information for biometric functions. Reference is made to FIG. 4 which illustrates a graph 400 depicting the feature space, where each dot represents a trial; greyed circles represent trials performed by one particular user, and black circles represent trials performed by the other participants. This drawing demonstrates dimension reduction when only the device's kinematics are taken into account, showing that, still, sufficient significant biometric information may be captured and determined.

The present invention may be used in order to automatically identify that a user (e.g., an attacker or a "fraudster") is attempting to pose as (or impersonate, or "spoof") another user (e.g., the "real" user or the genuine user). In accordance with the present invention, the attacker would need to carefully and correctly imitate the exact accelerometer response for tapping (or for other suitable touch-screen operations, such as scrolling, dragging, releasing), taking into account the particular kinematics properties of the genuine user; and such imitation may be extremely difficult and unlikely, or even impossible, for most attackers.

The present invention may utilize signal processing and/or machine learning techniques, in order to build or generate a template model or a profile which corresponds to the genuine user; and then compare subsequent instance(s) or sample(s) to the pre-built (and locally stored, or remotely stored) model or profile. If the subsequent samples are consistent with the pre-built model or profile, then a first output score may be generated (e.g., having a high value in a predefined numeric range, such as a value of 98 on a scale of 0 to 100); whereas, if the subsequent samples are inconsistent with the pre-built model or profile, then a second output score may be generated (e.g., having a lower value on the predefined numeric range, such as a value of 34 on the scale of 0 to 100). In some implementations, an output score greater than a threshold value may be used (alone, or in combination with other biometric traits and/or other authentication measures) as an indication that the current user is the genuine user; whereas an output score lower than the threshold value may be used (alone, or in combination with other biometric traits and/or other authentication measures) as an indication that the current user is not the genuine user.

The present invention may further be used to differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., manual) behavior, such as the touch features (e.g., speed, pressure) and/or its accelerometer correlated measurements.

The present invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PPI of the genuine user and/or of the fraudster.

The present invention may detect correlations and extract user-specific traits based on passive data collection and/or based on active challenges. In passive data collection, the mobile device may detect that the user is performing a particular operation (e.g., a vertical scroll gesture), and may further detect that performing this gesture affects in a user-specific way the acceleration and/or the orientation/rotation of the mobile device. In an active challenge, the mobile device (or an application or process thereof) may actively present a challenge to the user, such as, a requirement to the user to perform horizontal scrolling, in order to capture data and detect user-specific correlation(s). The active challenge may be hidden or may be unknown to the user, for example, implemented by creating a Graphical User Interface (GUI) that requires the button to scroll in order to reach a "submit" button or a "next" button or a "continue" button, thereby "forcing" the user to unknowingly perform a particular user-gesture which may be useful for correlation detection or for extraction of user-specific traits, as described. Alternatively, the active challenge may be known to the user, and may be presented to the user as an additional security feature; for example, by requesting the user to drag and drop an on-screen object from a first point to a second point, as an action that may be taken into account for confirming user identity.

Some embodiments of the present invention may be implemented, for example, as a built-in or integrated security feature which may be a component or a module of a mobile device, or may be a downloadable or install-able application or module, or plug-in or extension; or as a module of a web-site or web-page, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein. Some units, components or modules, that are shown in FIG. 1 for demonstrative purposes as comprised within mobile device 100, may be implemented externally to mobile device 100, may be implemented in a remote server, a web server, a website or webpage, a "cloud computing" server or database, a client/server system, a distributed system, a peer-to-peer network or system, or the like.

In some embodiments of the present invention, the analysis or correlation or matching (e.g., between accelerometer/gyroscope data, and touch-data or hovering data or other user-gesture data) may be location-based and/or application-based, or may otherwise take into account a geographical location or geo-spatial location of the mobile device or the application(s) being used or that are installed on the device. In a demonstrative example, a suitable module (e.g., a location-aware module or location-determining module) in the mobile device may determine the current location of the mobile device, based on GPS data or Wi-Fi data or cellular triangulation data or mobile network cell data or other location-identification techniques. The mobile phone may then utilize a suitable module (e.g., a correlator or matching module between location and user-specific behavioral usage traits) in order to deduce or determine, for example: that when the user utilizes his mobile device in a first location (e.g., in his office), then the mobile phone is typically placed horizontally on a flat surface (e.g., a table); that when the user utilizes his mobile phone in a second location or type of location (e.g., outdoor, on the street, in the park), then the mobile phone is typically held by the hand of the user at a slanted angle or diagonally (e.g., at approximately 45 to 60 degrees relative to the ground); that when the user utilizes his mobile phone in a third location or type of location (e.g., at a Point-Of-Sale (POS) terminal or register or cashier, at a supermarket or a retail store), then the mobile phone is typically held generally horizontally by the hand of the user (e.g., generally parallel to the ground); that when the user utilizes his mobile phone in a fourth location or type of location (e.g., at an Automatic Teller Machine (ATM) or a vending machine), then the mobile phone is typically held generally vertically by the hand of the user (e.g., at an angle of approximately 90 degrees, or between 80 to 100 degrees, relative to the ground); or the like. These determinations may be location-based or location-aware, thereby triangulating or crossing among three dimensions, namely, behavioral user-specific traits (e.g., holding the phone diagonally), gesture data (e.g., performing a scroll-down gesture), and location data (e.g., when utilizing the phone at a retailer); and such determinations may be part of the user-specific profile of that user. In a subsequent usage of the mobile device, similar determinations may be made, in order to analyze whether or not a current user is indeed the same user as in previous usage session(s) or is a "genuine" user. In a demonstrative example, this three-prone approach may raise an alert if, for example, typically the user of the mobile device holds his mobile device horizontally when performing a scroll-operation at a Point of Sale terminal; and in a subsequent usage session of the mobile device, a user holds that phone vertically when performing a scroll-operation at such Point of Sale terminal, thereby indicating that the subsequent user may not be the genuine or authorized user of the mobile device. In some embodiments, these multi-prone determinations may further be augmented with, or matched or correlated with, application-specific data or application-specific determinations, in order to improve the tailoring of the behavioral traits to the specific user. For example, the mobile device may differentiate and determine that the genuine user typically holds the phone vertically (e.g., anywhere, or in a particular location or type of location) when utilizing the camera application of the mobile device, but typically holds the phone horizontally (e.g., anywhere, or in that particular location or type of location) when utilizing the address book application of the mobile device; and these user-specific traits may be extracted and subsequently compared to data captured in a subsequent usage session of that mobile device, to authenticate user identity.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

Some embodiments may provide a method for confirming identity of a user of an electronic device, the method comprising: receiving touch data from a touch-screen of the electronic device; receiving acceleration data from an accelerometer of the electronic device; determining a relation between the touch data and the acceleration data; based on said relation between the touch data and the acceleration data, generating a user-specific trait indicative of said user of said electronic device; storing, either locally within said electronic device or on a remote server, a reference value of said user-specific trait; in a subsequent usage session, generating and storing a current value of the user-specific trait indicating relation between touch data and acceleration data; and based on a comparison process between (A) the current value of the user-specific trait that was generated, and (B) the reference value of the user-specific trait that was previously generated, determining whether or not a current user of the smartphone is an authorized user of the smartphone.

In some embodiments, said touch data comprises non-tactile touch data indicating a hovering user gesture in proximity to said touch-screen of said electronic device.

In some embodiments, the method comprises: receiving gyroscope data from a gyroscope of the electronic device; determining a relation between the touch data and the gyroscope data and the acceleration data; based on said relation between the touch data and the gyroscope data and the acceleration data, generating another user-specific trait indicative of said user.

In some embodiments, the method comprises: based on the relation between the touch data and the acceleration data, (A) determining that a first physiological region of said user moves when a particular gesture is performed, and (B) determining that a second physiological region of said user does not move when said particular gesture is performed; based on said two determining operations, differentiating among multiple users.

In some embodiments, the method comprises: determining an offset of holding said electronic device in a hand of said user, wherein the offset comprises an offset selected from the group consisting of: the electronic device being held with a palm area of the hand, and the electronic device being held with a fingers area of the hand; based on said offset of holding the electronic device in the hand, differentiating among multiple users.

In some embodiments, the method comprises: determining whether (A) the same hand of the user is utilized for both holding the electronic device and tapping the touch-screen of the electronic device, or (B) a first hand of the user is utilized for holding the electronic device and a second hand of the user is utilized for tapping the touch-screen of the electronic device; based on said determining, differentiating among multiple users.

In some embodiments, the method comprises: constructing a user-specific profile based on said touch data and said acceleration data, wherein the constructing is performed over a pre-defined time-period; dynamically shortening the pre-defined time period for constructing said user-specific profile if one or more identified traits of said user are distinctive.

In some embodiments, the method comprises: constructing a user-specific profile based on said touch data and said acceleration data, wherein the constructing is performed within a constraint selected from the group consisting of: (A) a pre-defined time-period, and (B) a pre-defined number of user interactions; dynamically modifying said constraint for constructing said user-specific profile, based on distinctiveness of one or more traits of said user; storing a flag indicating whether said user-specific profile is either (i) under construction, or (ii) fully constructed.

In some embodiments, the method comprises: constructing a user-specific profile which indicates that for a user-gesture that is performed at a particular geometric place of the touch-screen of said electronic device, a first body part of the user is moving while a second body part of the user is at rest; based on said user-specific profile, differentiating among multiple users.

In some embodiments, the method comprises: constructing a user-specific profile which indicates that for a scrolling gesture that is performed on the touch-screen of said electronic device, a first hand-region of the user is moving while a second hand-region of the user is at rest; based on said user-specific profile, differentiating among multiple users.

In some embodiments, the method comprises: analyzing touch-data of a swipe gesture performed by the user on the touch-screen of said electronic device, to determine an estimated width of a finger of said user; constructing a user-specific profile which comprises said estimated width of the finger of the user; based on said user-specific profile, differentiating among multiple users.

In some embodiments, the method comprises: analyzing touch-data of a swipe gesture performed by the user on the touch-screen of said electronic device, to determine an estimated width of a finger of said user; constructing a user-specific profile which comprises said estimated width of the finger of the user; based on said user-specific profile, differentiating among multiple users.

In some embodiments, the method comprises: analyzing touch-data of a circular swipe gesture performed by the user on the touch-screen of said electronic device, to determine an estimated distance between (A) a tip of a swiping finger of a hand of said user, and (B) a palm of said hand of said user; constructing a user-specific profile which comprises said estimated distance between the tip of the swiping finger and the palm of the hand; based on said user-specific profile, differentiating among multiple users.

In some embodiments, the method comprises: analyzing touch-data of generally-straight swipe gestures performed by user on the touch-screen of said electronic device; determining that a first user typically rotates the electronic device clockwise while performing generally-straight swipe gestures; determining that a second user typically rotates the electronic device counter-clockwise while performing generally-straight swipe gestures; based on said determinations, differentiating among said first and second users.

In some embodiments, the method comprises: analyzing said touch data and said acceleration data of said electronic device, to determine a level of shakiness of the electronic device while the user operates said electronic device; analyzing said touch data and said acceleration data of said electronic device, to determine an effect, of a performed user-gesture, on said level of shakiness of the electronic device; constructing a user-specific profile which comprises an indication of the effect of the performed user-gesture on the level of shakiness of the electronic device; based on said user-specific profile, differentiating among multiple users.

In some embodiments, the method comprises: analyzing said touch data and said acceleration data of said electronic device, to determine that immediately prior to performing an on-screen zoom gesture, the user of the electronic device modifies a tilt angle of the electronic device relative to ground; constructing a user-specific profile which comprises an indication that immediately prior to performing on-screen zoom gestures, the user of the electronic device modifies the tilt angle of the electronic device relative to ground; based on said user-specific profile, differentiating among multiple users.

In some embodiments, the method comprises: sensing by said electronic device a sweat level of the user while the user performs a gesture on said electronic device; determining a relation between the sensed sweat level of the user and at least one of: said touch data of the electronic device, and said acceleration data of said electronic device; based on said relation, differentiating among multiple users.

In some embodiments, the method comprises: sensing by said smartphone a temperature of a body part of the user while the user performs a gesture on said electronic device; determining a relation between the sensed temperature and at least one of: said touch data of the electronic device, and said acceleration data of said electronic device; based on said relation, differentiating among multiple users.

In some embodiments, the method comprises: sensing by said electronic device an amount of pressure of a body part of the user while the user performs a gesture on said electronic device; determining a relation between the sensed amount of pressure and at least one of: said touch data of the electronic device, and said acceleration data of said electronic device; based on said relation, differentiating among multiple users.

In some embodiments, the method comprises: determining a current location of the electronic device; determining a relation among: (A) the current location of the electronic device, and (B) said touch data of the electronic device, and (C) said acceleration data of the electronic device; based on said relation, differentiating among multiple users.

In some embodiments, the method comprises: determining geographic location of the electronic device; determining a relation among: (A) the current location of the electronic device, and (B) said touch data of the electronic device, and (C) said acceleration data of the electronic device; based on said relation, (a) determining that a first user, typically places the electronic device horizontally on a flat surface when utilizing the electronic device in a first geographic location, and (b) determining that said first user, typically holds the electronic device slanted relative to the ground when utilizing the electronic device in a second geographic location; based on said determinations, differentiating among the first user and another user.

In some embodiments, the method comprises: determining a currently-used application of the electronic device, that the user is currently utilizing on said electronic device; determining a relation among: (A) the currently-used application of the electronic device, and (B) said touch data of the electronic device, and (C) said acceleration data of said electronic device; based on said relation, differentiating among multiple users.

In some embodiments, the method comprises: determining a currently-used application of the electronic device, that the user is currently utilizing on said electronic device; determining a relation among: (A) the currently-used application of the electronic device, and (B) said touch data of the electronic device, and (C) said acceleration data of the electronic device; based on said relation, (a) determining that a first user typically holds the electronic device vertically when utilizing a first particular application of the electronic device, and (b) determining that said first user typically holds the electronic device slanted relative to the ground when utilizing a second particular application of the electronic device; based on said determinations, differentiating among multiple users.

In some embodiments, the method comprises: determining whether a current location of the electronic device is outdoors or indoors; determining a relation among: (A) the current location of the electronic device being either outdoors or indoors, and (B) said touch data of the electronic device, and (C) said acceleration data of said electronic device; based on said relation, differentiating among multiple users.

The present invention provides a method for confirming identity of a user of a mobile electronic device, the method including: receiving touch data from a touch-screen of the mobile electronic device; receiving acceleration data from an accelerometer of the mobile electronic device; correlating between the touch data and the acceleration data; based on the correlating, generating a user-specific trait indicative of said user. The method further includes storing a reference value of the user-specific trait, indicative of said user; in a subsequent usage session of the mobile electronic device, generating a current value of the user-specific trait correlating between touch data and acceleration data; and based on a comparison between the current value of the user-specific trait and the reference value of the user-specific trait, determining whether or not a current user of the mobile electronic device is an authorized user of the mobile electronic device.

Some embodiments of the present invention may enable the system to ensure and/or to confirm "Liveness" of the user, of an image or video of the user, or a self-image or self-video of the user, that are submitted by a user or by an electronic device having a camera or imager, for purposes of user authentication or user identity determination, or for purposes of authorizing or blocking access of a user to a local or remote computerized service and/or to the electronic device itself; and/or to prevent, avoid, eliminate, block and/or mitigate a problem or a fraud-attempt in which an attacker or a non-legitimate user or an impostor attempts to perform "spoofing" by submitting to the system (or the electronic device itself, or to a local or remote authentication module) a non-fresh image or video, or a non-freshly-taken image or video, or a previously-recorded image or video or self-image or self-video, or a recording or a capturing of the user or of an image of the user of a video of the user, or of a play-back or a replay or a re-broadcast attempt that attempts to re-submit to the authentication module a previously-captured image or video or an attempt to submit an image or video that lack Liveness and/or that lack Freshness; as well as to provide Liveness Detection and/or Freshness Detection for such user-authentication system.

It is also clarified that although portions of the discussion herein may relate, for demonstrative purposes, to utilization of an image or an image-stream or a video-sequence for user-authentication purposes, the present invention may also be used in conjunction with user-authentication systems and methods and modules that utilize other biometric traits and/or user-specific traits, for example, user speech, user utterance, user audio sample, user audible sounds or words, a combination of audio and video, a combination of audio and an image, a combination of audio and a set of images, a fingerprint of a user, a combination of fingerprint with image and/or video and/or audio, and/or other suitable biometric features and/or combination of biometric features.

The present invention may provide methods, devices, and systems for user authenticating a user, based on an image or photograph or video of the user; and for enabling a log-in process or a sign-in process, to a device or to a local computerized service or to a remote computerized service, based on an image or photograph or video of the user; and for authorizing (or approving, or denying, or blocking) access of a user to a computerized service or to an electronic device, based on an image or photograph or video of the user; and for authorizing a user to "unlock" an electronic device, or to switch an electronic device from "sleep mode" or "standby mode" to fully operational mode, or from being deactivated to being activated, or from being partially-operational to being fully-operational, based on an image or photograph or video of the user. The present invention may further be utilized in other contexts, for example, to authorize or to block physical access of a user into a building or through a physical gate or entrance or exit; to authorize or to block access of a user to a vehicle, or to authorize or to block an attempt of the user to ignite or to start or to drive a vehicle, or the like.

In accordance with the present invention, a freshly-captured image or a video or a photograph of the user may be utilized for user-authentication purposes, in order to authenticate the user to a local device, a remote device, a local service and/or a remote service. For example, a system may firstly or initially capture or receive or obtain a Trusted Image of the user; for example, an image or a video of the user that the user takes in the presence of a third party (e.g., in the presence of a bank clerk, when the computerized service is a banking website or a banking application), or an image or a video of the user that the user takes upon initial creation of a user account, or upon opening a new account, or during a session that is known to be authenticated (e.g., during a usage session that was authorized via a two-step authentication process or via a two-factor authentication process). The Trusted Image, or other such "Reference Image", may be securely stored locally (e.g., in the electronic device, smartphone, tablet, laptop computer, or the like), and/or may be securely stored remotely (e.g., in a remote server, web server, application server, "cloud computing" server, or the like).

Subsequently, when the user requests to re-access that service or that electronic device, the user is requested to capture a Fresh Image of himself, via an imager or a camera of an electronic device being utilized by the user (e.g., smartphone, tablet). The Fresh Image is compared to the Trusted Image, or is analyzed in relation to it. If the two images are generally matching each other, then the user is authenticated; otherwise, the authentication attempt is blocked or rejected.

In some embodiments, the user may be required to perform one or more gestures or modifications or actions, as part of the authentication process, in order to "prove" to the authentication system that the user is indeed capturing a Fresh Image using the camera, and not, for example, pointing the camera of the device towards a previously-taken image of the user; for example, in order to stop an attacker who obtains a still image of the legitimate user, and then attempts to merely point the camera of the electronic device towards such still image. For example, the system may request the user to Blink one eye, or two eyes, or to perform a sequence of Eye Blinks, or to perform other gestures (e.g., touch his nose with one finger), in order to utilize image analysis and/or video analysis processes, to ensure that the captured image(s) or video indeed depict the required gestures or actions; thereby preventing an attacker from merely pointing the camera towards a still image, or towards a previously-captured image or video of the legitimate user.

Applicants have realized that conventional systems that attempt to utilize a Fresh Image of a user as means for user authentication, suffer from one or more of the following problems or disadvantages: (1) many users utilize a mobile electronic device, such as smartphone or tablet, which has a limited power source (e.g., internal rechargeable battery), and utilization of the camera consumes significant power from the internal power source electronic device, thereby depleting the power source rapidly, and thereby causing resentment of users from continuously utilizing the device's camera for user-authentication purposes. (2) Any third-party application or software module, that performs user authentication based on a freshly-captured image or video of the user, that is installed on the mobile device by any third-party other than the original manufacturer of the electronic device, may be inherently insecure and may be compromised; for example, a malicious code or Trojan or computerized virus or a Remote Access Trojan (RAT) may be used by an attacker in order to gain access to the electronic device and then capture or obtain an image or a "selfie" or a "selfy" image of the user, or to obtain or copy an image or a video of the user from the Gallery of images or videos that is stored locally within the electronic device, thereby compromising the user-authentication process, since the attacker may then utilize the stolen image or the stolen video of the user to authenticate, pretending to be the legitimate user. (3) A third-party application that activates and/or utilizes the camera of the device, for a prolonged time or from prolonged periods of times, or continuously for user authentication purposes, create a privacy risk to the user and/or a security risk; since such application may become a tool or a backdoor for hackers or attackers that may continuously capture images and/or videos of the user, without the user's knowledge or consent. (4) Continuous analysis of image(s) and/or video-sequences, for purposes of user authentication, is a process that consumes significant resources (e.g., memory resources, processing resources, power/battery resources), thereby depleting or draining the resources of the electronic device and/or degrading the quality of operation of the electronic device (e.g., making the device slower, less responsive).

The Applicants have realized that utilization of an image or video of the user, or a "selfie" photograph (self-taken photograph) of the user, for purposes of user authentication, thus suffers from multiple problems or disadvantages: firstly, it attempts to utilize a "secret" or "confidential data" of the user, which is actually available to the general public since an attacker may capture an image or video of the legitimate user, and/or which is available to a skilled hacker by accessing images or videos of the legitimate user (e.g., on the device itself; in a "cloud" repository of images or videos of the user; on a Social Network website or service in which the user posts or shares his videos or images, or in which friends or relatives of the user post or share their own images or videos that contain the legitimate user within them). The security risk increases when the authentication module is not built-in within the electronic device, but rather is a third-party application or a part thereof. Additionally or alternatively, the image-based or video-based user authentication, which appears at first glance to be a "convenient" or a "rapid" process of authentication that many users may like, actually drains or depletes resources of the mobile device (e.g., battery resources, processing resources, memory resources), thereby creating resentment of some users to continuous or frequency utilization of such user-authentication process via a resources-limited electronic device.

The present invention may strengthen the user-authentication process, by including in the authentication process also a sub-process in which the system takes into account "spatial properties" of the device, such as, accelerometer data, gyroscope data, device orientation data, device positioning data, device movement data, device tilt data (e.g., is the device generally horizontal, or generally vertical, or slanted at approximately 30 degrees), device traits that characterize the device when the user captures an image or a video, and/or user-specific traits that characterize the user when he captures an image or a video for authentication purposes; and/or the modification or the change in values of such "spatial properties"; and/or such traits and such data (or, the change in values of such spatial properties) during a time period (e.g., 1 or 2 or 3 or 5 or 10 or K seconds) immediately prior to capturing the image or video for authentication purposes; and/or such traits and such data during a time period (e.g., 1 or 2 or 3 or 5 or 10 or K seconds) immediately after capturing the image or video for authentication purposes. Such additional data and traits may be correlated with the other user-authentication data (e.g., the actual content of the image or the video), in order to improve and strengthen the user-authentication process.

The system of the present invention may correlate between: (I) content of an image or a video, or a "freshly captured" image or video, or a "selfie" photograph or video, or an indicator that a self-image or self-video is being captured or has recently been captured; with (II) accelerometer data and/or gyroscope data and/or device-orientation data and/or device-tilt data, in order to further authenticate the user or to raise a flag that a possible attack is being performed by an attacker instead of the legitimate user.

In a first demonstrative example, the system may monitor the physical traits of the electronic device (e.g., acceleration, orientation, tilting, position, velocity, shaking, or the like), during the time in which the self-image or self-video are captured (and/or immediately before, and/or immediately after); and may determine that the physical traits of the electronic device do not match a physical process of capturing a video or capturing an image. For example, the camera of the electronic device may "see" or may capture an image or a video that appears to be of the user; whereas the device itself reports being at rest and/or not moving, and/or not sufficiently moving in correlation with capturing of an image or a video; thereby indicating that an attacker may be controlling the authentication process, for example, by attempting to submit a previously-captured image or video of the legitimate user. The attacker or possible-attack may be determined or estimated; and the authentication of the user to the device (or to the computerized service, which may be local or remote) is blocked or rejected.

In a second demonstrative example, the system may determine that user Adam, who from time to time authenticates by using a self-taken image of himself, typically or always captures his own image by (a) lifting his smartphone to be at approximately chest level, and (b) tilting his smartphone to be at an angle of approximately 45 degrees relative to the ground. However, in a subsequent user-authentication attempt, the system may monitor the device traits, and may determine that (A) the device is lifted to be at eye level, and/or (B) the device is capturing the image while the device is generally perpendicular to the ground. The system may determine that these fresh traits that characterize the fresh capturing of the self-image or self-video, do not match the historic or previous traits that characterized the capturing of the image or video in prior authentication sessions, or in when a Trusted or a Reference image (or video) was captured; thereby enabling the system to determine or to estimate that an attacker is attempting to authenticate, and not the legitimate user.

In a third example, the electronic device may request the user to take a self-image, and may actually capture a stream or set of images or a video sequence (e.g., including images before, during and after the moment in which the user pushes a "snapshot" button). The electronic device may determine that the sequence of multiple frames or multiple images, does not show any "shaking movement"; whereas accelerometer data and/or gyroscope data indicate that the device was "shaken" or "shaking" during that time period or a portion thereof. The system may thus determine or estimate that a fraudulent log-in attempt or a fraudulent authentication attempt is being carried out, and may block or reject the attacker.

The present invention may thus correlate between self-taken image(s) and/or self-taken video, or "freshly captured" image(s) or video, and fresh data and traits of the electronic device during (and/or before, and/or after) capturing such image or video, in order to verify: (a) that the image or video was indeed freshly captured in real time, based on accelerator data, gyroscope data, device orientation data, or the like, rather than the image or the video being submitted by an attacker; (b) that the image (or video) and the accelerometer data (or gyroscope data, or other device data) match (or do not contradict each other) from orientation perspective or from gyroscope perspective, or the like; for example, "shake" events of the image or the video are indeed correlating to actual "shake" movements of the electronic device; image or video shakes are correlated with accelerometer data; that the orientation and gyroscope data are matching to the camera position in relation to the user; that hands shaking are the same, that video movements are matching with gyroscope and accelerometer data, or the like.

In some embodiments, the system of the present invention may provide a power-saving and/or resources-saving user authentication process that utilizes a self-image or a self-video of the user; for example, by selectively activating the imager or the camera only in the beginning of (or, only during an initial phase of) the user-authentication process; then, deactivating or turning-off the camera or imager of the device, to conserve power; and subsequently, to re-activate or turn-on the imager or camera again, only if device traits (e.g., accelerometer data, gyroscope data, device-orientation data) indicate that a risk is estimated or that an additional or extended validation of the user identity is required.

For example, instead of continuous activation of the camera or imager during an entirety of the user authentication process (e.g., spanning a period of ten seconds), the present invention may utilize a three-step method.

(A) Firstly, the camera is turned-on for a shortened time-period (e.g., only two seconds; by a camera activation unit or module), thereby capturing a short sequence of images or video, while the device also collects or senses or monitors device-traits (e.g., acceleration, gyroscope data, device orientation, device tilt, or the like).

(B) Then, the camera is turned-off or deactivated (by a camera deactivation unit or module), to conserve power or to save power, or to reduce power consumption; while the electronic device continues to sense, monitor and collect device-traits (e.g., acceleration, gyroscope data, device orientation, device tilt, or the like).

(C) Then, the method proceeds by branching into one of two branches of operations. In a first branch (C1), immediate analysis of the device traits, indicates that the device traits indeed correlate with the image (or video) that were captured; and therefore no further imaging is required. Alternatively, in a second branch (C2), immediate analysis of the device traits, indicates that the device traits do not correlate with (or do not match) the image (or video) that were allegedly captured, and the camera is again activated (or turned on) in order to capture additional frame(s) of the user for further user-authentication purposes.

In accordance with this method, the user authentication begins with face recognition in correlation with accelerometer/gyroscope data (or other spatial properties of the device, as sensed or measured via the sensor(s) of the device; and then continues without an activated camera and only with the accelerometer/gyroscope activated, in order to save battery and save power consumption, while the system "knows" that indeed the same user is being authenticated. The accelerometer/gyroscope of the electronic device thus operate as a "continuation" means to the freshly-captured video (or sequence of frames or images), but thereby consuming significantly less power relative to an active camera or imager; and only if the device or the system estimates a risk, based on the accelerometer/gyroscope data, then the camera will again be activated for further validation or for final validation of the user identity The method and system of the present invention may be utilized with a variety of devices, and/or for authenticating a user to a variety of purposes; for example, for accessing a smartphone or tablet or smart-watch or laptop computer or desktop computer; for accessing an Internet of Things (IoT) device or appliance, or an Internet connected appliance or device; for accessing a website or a web-based service, a mobile application, an "app", a computerized service, a "cloud computing" service, a remote service, a secured service that requires authentication (e.g., email account, web-mail account, social network account, online banking account, online brokerage account); for accessing or traversing or entering or exiting a physical gate or door or entrance or exit (e.g., of a building, an office, a vehicle); for igniting or starting or driving a vehicle; and/or for other suitable tasks or systems in which user authentication is utilizes as a condition for granting or blocking access.

Some embodiments of the present invention may perform, utilize, determine and/or estimate, for example, relation or correlation or other association between: (a) one or more behavioral parameters or traits, or one or more device-specific traits or user-specific traits that may be sensed or measured or estimated when (or during, or before, or after) the user handles or operates the electronic device (e.g., acceleration of the electronic device, information sensed by accelerometer(s) and/or gyroscope(s) of the electronic device, slanting or tilting of the electronic device, or the like), or user-specific behavioral traits (e.g., user Adam typically lifts his smartphone vertically before capturing a self-image; user Bob typically spins his smartphone counter-clockwise immediately before or immediately after taking a self-image); and, (b) the actual content of the biometric user-identifying or user-authenticating trait, such as, self-image or image of the user, self-video or vide of the user, audio or speech or voice of the user, fingerprint of the user, or the like.

The monitoring of these two groups or sets of parameters or information, and the estimation or the detection of a relation or a correlation or an association between the two groups or sets, may be utilized: (A) to ensure Liveness or to confirm Liveness, and/or (B) to eliminate or reduce "spoofing" attacks or other attacks or fraud attempts, and/or (C) to increase the reliability and/or the Freshness of the biometric content that is relied upon (e.g., the content of the image or video or audio or fingerprint), and/or (D) to save or conserve battery consumption or power consumption, particularly in an authentication system that utilizes such biometric authentication frequently (e.g., several times per hour or per day) and/or continuously (e.g., by selectively activating the imager or other biometric sensor only part-time during an initial stage of the user-authentication process, and utilizing other sensors such as accelerometer and gyroscopes, which are less power-consuming, to provide assistive measurements which may be correlated or associated as described above).

In some embodiments, the electronic device may comprise one or more fingerprint scanner(s) and/or fingerprint reader(s), which may be located at the front side (e.g., screen size) of the device and/or at the rear side (e.g., back side) of the device. The fingerprint scanner may capture a fingerprint scan of a user, which may be used by the electronic device, or by a remote server, for user-authentication purposes, or as a user-authentication factor (e.g., by itself, or as part of a multi-factor user-authentication processes). For example, a reference fingerprint scan of the user may be initially (or periodically) captured; and it may be stored (or, its digital representation or hashed value or encrypted version may be stored), locally within storage or secure storage of the electronic device and/or remotely at a remote server to which the user authenticates. In a subsequent log-in or log-on or user-authentication session, the user is requested to capture and/or to submit, for authentication purposes, a fresh or freshly-captured fingerprint scan, which is then compared to (or analyzed for similarity relative to) the reference fingerprint scan. If the freshly-captured fingerprint scan, is sufficiently similar to the previously-stored reference fingerprint scan (or, if their hashed values are sufficiently similar), taking into account one or more threshold values of similarity and/or range of values that indicate similarity, then the user is authenticated.

Applicants have realized that utilization of such fingerprint scan(s) may suffer from a "liveness" problem, in which an attacker or an impostor may submit a "lifted" fingerprint or an imitation fingerprint, or a digital representation thereof, as an attempt to authenticate as the legitimate user. Accordingly, the present invention may check whether, during the submission of the fresh fingerprint scan, and/or shortly before such submission (e.g., in the K seconds or milliseconds that immediately precede the submission of the "fresh" fingerprint scan to the authentication module or process; for example, K being 1 second or 2 seconds or 3 seconds), and/or shortly after such submission, the electronic device has or has not sensed, via its sensors (e.g., accelerometer(s), gyroscope(s), compass unit(s), other sensors), geo-spatial characteristics or device characteristics that correspond to a user touching or engaging with such fingerprint scanner; such as, change in acceleration or deceleration of the device, change in device orientation or slanting angle or tilt, change in device velocity or speed of movement in space, spinning or rotation of the device, or the like. Detection of such geo-spatial changes may indicate that the currently-submitted fingerprint scan is indeed "freshly captured"; whereas, lack of such geo-spatial changes, or detection of insufficient or small spatial changes (e.g., smaller than a pre-defined threshold value), may indicate (by itself, and/or with other factors) that the currently-submitted fingerprint scan is non-fresh or non-freshly-captured.

For example, the electronic device may detect, that a fingerprint scan was allegedly captured and then was submitted for user authentication; however, during the 4 seconds (or K seconds) that preceded immediately prior to such submission, and/or during such submission operation, and/or during the 2 seconds (or N seconds) that immediately followed such submission, the device accelerometers have sensed no device acceleration, and/or have measured insufficient device acceleration (e.g., below a predefined threshold value) that does not correspond to an indication that the device was moved or tilted for capturing the alleged fresh fingerprint; and/or that the device gyroscope(s) have sensed no change in device orientation or position or tilt or slanting, and/or have measured insufficient change in device orientation or slanting or position or tilt (e.g., below a predefined threshold value) that does not correspond to an indication that the device was moved or tilted for capturing the alleged fresh fingerprint. In such situation, the device may determine that the alleged, freshly-submitted, fingerprint scan, was not accompanied (during the submission, and/or immediately prior to the submission, and/or immediately after the submission) with geo-spatial changes of the device (or its acceleration, orientation, tilt, geo-spatial positioning or slanting) or with sufficient geo-spatial changes (e.g., based on threshold values, or a range of values), and therefore lack of "liveness" or lack of "freshness" is declared; and in turn, the user authentication is denied or is rejected, or the user is required to perform additional authentication steps.

In some embodiments, a lookup table of reference values, and/or a range of reference values, as well as lookup operations or comparison operations of measured (or sensed) values relative to such reference values, may be used in order to determine sufficiency or insufficiency of changes in device properties that accompany a touch-event or a capture (or submission) of a self-image or a capture (or submission) of a fingerprint scan, or in order to establish whether or not the measured or sensed spatial properties of the device match an "expected" set or range of values that are "expected" to accompany a capturing or an inputting or a submission of such sample, or that are "expected" to precede immediately prior to (or to follow immediately after) such capturing or submission or inputting of such sample.

For example, a lookup table or a pre-defined range of values, may be configured such that, device acceleration of at least K m/s$^2$ indicates sufficient device acceleration that accompanies a fresh capturing of self-taken image or fingerprint scan or touch event or other biometric sample; whereas, device acceleration that is smaller than said value is insufficient and the "fresh" sample is estimated to be illegitimate (e.g., an attacker, an impostor, a replay attack, or the like). In another example, a lookup table or a pre-defined range of values, may be configured such that, device orientation of at least K degrees relative to a vertical plane, indicates sufficient device orientation that accompanies a fresh capturing of self-taken image or fingerprint scan or touch event or other biometric sample; whereas, device orientation that is smaller than said value is insufficient and the "fresh" sample is estimated to be illegitimate (e.g., an attacker, an impostor, a replay attack, or the like). Other conditions may be used.

In some embodiments, the user authentication process, which is performed by a user authentication module or unit of the electronic device and/or by a user authentication module or unit of a remote server, further takes into account, a comparison or the similarity between: (i) the changes in geo-spatial properties or characteristics of the device during (and/or immediately before, and/or immediately after) the current submission and/or the current alleged-capturing of fingerprint scan, and (ii) the changes in geo-spatial properties or characteristics of the device during (and/or immediately before, and/or immediately after) the time in which the reference fingerprint scan was captured. The level of similarity, e.g., optionally calculated by using a lookup table or a suitable weighted formula or equation, or by using reference values or pre-defined threshold values, may be used in order to confirm the identity of the user and/or the authenticity of the submitted "fresh" fingerprint scan. For example, during (and/or immediately prior to, and/or immediately after) the capturing of the original, Reference, fingerprint scan, the electronic device measures and senses and stores the geo-spatial properties of the device and the changes in such properties (e.g., device acceleration, orientation, tilt, slanting, spinning, rotation, lifting up, moving down, or the like); and it may generate and store a reference signature of one or more such changes that accompanied the inputting of the Reference fingerprint scan. For example, when user Adam inputs his initial, Reference, fingerprint scan, user Adam accelerated the device at 30 degrees relative to the ground and/or has tilted the device 45 degrees horizontally immediately prior to scanning his finger (e.g., within the 2 seconds immediately prior to capturing and/or submitting of the Reference fingerprint scan). Subsequently, attacker or impostor Bob attempts to authenticate via the electronic device, and submits a "freshly captured" fingerprint scan (or a digital representation thereof); while doing so, attacker Bob moves the electronic device, thereby causing the system to confirm Liveness; however, attacker Bob moves the electronic device in a different manner, during or before or after the submission or the capturing of the fresh fingerprint scan, a manner that is different from the Reference Manner that the legitimate user Adam had exhibited when user Adam has captured the original, Reference, fingerprint scan (e.g., user Bob rotates the device counter-clockwise by 70 degrees prior to the scanning of the current fingerprint; whereas user Adam did not exhibit such rotation, and instead had exhibited other geo-spatial changes to the device).

Accordingly, the electronic device (or a remote server) may compare and analyze the properties of the electronic device, sensed immediately before and/or during and/or immediately after the submission of the fresh fingerprint scan; and may compare the currently-sensed parameters to one or more of: (i) the historical parameters of the device (acceleration, device orientation, device tilt, device slanting, or the like) that had accompanied, and were measured and sensed at, the initial capturing of the Reference fingerprint scan; and/or (ii) a set of one or more geo-spatial parameters of the device, that were captured during one or more previous authentication sessions of that user; and/or (iii) an average, or weighted average, or other statistical formula or function, or previously-captured changes in the geo-spatial properties of the electronic device during previous fingerprint-based authentication sessions (e.g., detecting that Typically, use Adam rotates his device clockwise by 80 degrees, immediately prior to scanning his fingerprint; whereas the current user does not exhibit this change in properties of the device, that was sensed in 92 percent of the previous user authentication sessions of user Adam); and/or (iv) the geo-spatial properties of the device, as captured in a recent user-authentication session that was approved (e.g., within the past K days, the past 3 days, the most-recent 7 days, or the like), or in the most-recent authentication session that was approved.

The present invention may thus utilize the geo-spatial properties and characteristics of the electronic device, as well as changes in such geo-spatial properties and characteristics, that are sensed and measured by the device during and/or immediately prior to and/or immediately subsequent to the submission (and/or the capturing) of the "current" fingerprint scan, in order to: (i) confirm or detect "liveness" or "freshness" of the currently-submitted fingerprint scan;

and/or (ii) reject a fingerprint scan that is estimated to be non-fresh or that is estimate to lack liveness or to lack sufficient liveness properties; and/or (iii) compare the currently-measured geo-spatial properties of the device, to previously-sensed geo-spatial properties that had accompanied the inputting of the Reference fingerprint scan, in order to detect a possible attacker or impostor; and/or (iv) compare the currently-measured geo-spatial properties of the device, to previously-sensed geo-spatial properties that had accompanied the inputting of one or more previous fingerprint scan(s), in order to detect a possible attacker or impostor.

It is clarified that the system or the device may take into account, analysis of sensed device parameters (e.g., geo-spatial parameters, acceleration, deceleration, device orientation, device tilt, device slanting, or the like) that "accompany" the submission and/or the capturing of a user-authentication factor (e.g., a fingerprint scan; a retina scan; entry of a password or PIN or pass-phrase; entry of a biometric sample, voice sample, speech sample, audio sample; capturing of a "selfie" or "selfy" image or photograph or video-clip; a user-specific behavioral parameter that can be extracted from tracking of user interactions with the electronic device and/or with the computerized system; a user-specific cognitive parameter that can be extracted from tracking of user interactions with the electronic device and/or with the computerized system; a user-specific physiological parameter that can be extracted from tracking of user interactions with the electronic device and/or with the computerized system; a level or an intensity (or other characteristic) of force or pressure that the user applies to a touch-screen or to a touch-pad or to other touch-based unit or input unit or interface; or the like); wherein such "accompanying" parameters are sensed or captured during the submission of the user-authentication factor and/or immediately prior to such submission and/or immediately following such submission; and/or wherein such "accompanying" parameters are sensed and captured during the alleged or the proffered capturing of the currently-submitted fingerprint or immediately prior to such alleged capturing or immediately following such alleged capturing. It is further clarified that although portions of the discussion herein my relate, for demonstrative purposes, to a self-taken image and/or to a fingerprint scan as biometric factors or as user-authentication factors, the present invention may be utilized in conjunction with other biometric features and/or other biometric samples and/or other user-authentication factors, whose liveness and/or freshness and/or authenticity may thus be confirmed or detected (or denied) by using the mechanisms of the present invention.

The similarity, or the level of similarity, between the currently-sensed geo-spatial properties or device properties, that are sensed as accompanying a current submission or a current alleged capturing of a fresh sample (e.g., self-image, fingerprint scan), may be compared to a previous set of reference values, or to a set of one or more threshold values. Comparison operations may be used to determine whether sufficient similarity is detected. For example, if the reference sample was captured when the device exhibits a rotation counter-clockwise of 85 degrees; and a fresh sample is captured when the device exhibits a rotation counter-clockwise of 79 degrees; then, the device or the computerized system may determine that the two properties are sufficiently close to each other, since, for example, the freshly-measured value (counter-clockwise rotation) is the same type of device property as the reference measurement (counter-clockwise rotation), and the currently-measured numerical value (79 degrees of rotation) is within K percent of the reference measurement value (85 degrees of rotation), such as, K may be configured as 5 percent or 10 percent of 16 percent or other suitable similarity level that allows some pre-defined level of difference while still enabling to detect similarity. Additionally or alternatively, a Range of values may be used to determine similarity or sufficient similarity; such as, for example, the device may be configured to accept as "sufficiently similar" a contemporary counter-clockwise rotation in the range of 75 to 95 degrees (namely, plus or minus ten degrees relative to the Reference value). Other suitable methods may be used to determine sufficient similarity or match or matching of current and historical (or reference) geo-spatial properties or device properties.

Some embodiments may include a method comprising: (a) generating a user-authentication process that utilizes at least a self-taken image of a user of an electronic device, as an authentication factor for authenticating said user to a computerized service; (b) in said user-authentication process, determining whether: (I) a submission by said user of said self-taken image, follows after a time-period in which geo-spatial characteristics of the electronic device indicate that the electronic device was utilized for capturing said self-image of the user, or (II) the submission by said user of said self-taken image, does not follow a time-period in which geo-spatial characteristics indicate that the electronic device was utilized for capturing said self-image of the user; (c) if it is determined that the submission by said user of said self-taken image, does not follow a time-period in which geo-spatial characteristics indicate that the electronic device was utilized for capturing said self-image of the user, then: triggering an alert that said self-taken image is estimated to be a not-freshly-captured image of said user.

In some embodiments, the method comprises: sensing via an accelerometer of the electronic device, device-acceleration data that accompanies the submission by said user of said self-taken image; determining that device-acceleration data, that accompanies the submission by said user of said self-taken image, does not correspond to device-acceleration data that is expected to accompany submission of a fresh self-taken image; and based on said determining, triggering a determination that said self-taken image is estimated to be a not-freshly-captured image of said user.

In some embodiments, the method comprises: sensing via a gyroscope of the device, device-orientation data that accompanies the submission by said user of said self-taken image; determining that device-orientation data, that accompanies the submission by said user of said self-taken image, does not correspond to device-orientation data that is expected to accompany submission of a fresh self-taken image; and based on said determining, triggering a determination that said self-taken image is estimated to be a not-freshly-captured image of said user.

In some embodiments, the method comprises: sensing via an accelerometer of the electronic device, device-acceleration data immediately prior to the submission by said user of said self-taken image; determining that device-acceleration data, that was sensed immediately prior to the submission by said user of said self-taken image, does not correspond to device-acceleration data that is expected to precede submission of a fresh self-taken image; and based on said determining, triggering a determination that said self-taken image is estimated to be a not-freshly-captured image of said user.

In some embodiments, the method comprises: sensing via a gyroscope of the electronic device, device-orientation data immediately prior to the submission by said user of said self-taken image; determining that device-orientation data, that was sensed immediately prior to the submission by said user of said self-taken image, does not correspond to device-orientation data that is expected to precede submission of a fresh self-taken image; and based on said determining, triggering a determination that said self-taken image is estimated to be a not-freshly-captured image of said user.

In some embodiments, a process comprises: (a) generating a user-authentication process that utilizes at least a self-taken image of a user of an electronic device, as an authentication factor for authenticating said user to a computerized service; (b) capturing a reference self-image of the user, to be used subsequently as an authentication factor for authenticating said user; (c) during said capturing of the reference self-image of the user, sensing also spatial properties of said electronic device, via at least one of: an accelerometer of said electronic device, and a gyroscope of said electronic device; (d) subsequently, receiving from said user a currently-submitted self-image, that the user submits as a user-authentication factor; (e) determining whether or not during a time-period, that is immediately prior to submission of the currently-submitted self-image, the electronic device sensed spatial device properties that are at least similar, beyond a pre-defined threshold of similarity, to the spatial device properties that were sensed during the capturing of the reference self-image in step (c); and (f) if it is determined that during said time-period, that is immediately prior to submission of the currently-submitted self-image, the electronic device sensed spatial device properties that are at least similar, beyond a pre-defined threshold of similarity, to the spatial device properties data that was sensed during the capturing of the reference self-image in step (c), then: triggering an alert that said self-taken image is estimated to be a not-freshly-captured image of said user.

In some embodiments, step (c) comprises: during said capturing of the reference self-image of the user, sensing device-acceleration data of said electronic device, via the accelerometer of said electronic device; wherein step (e) comprises: determining whether or not during the time-period, that is immediately prior to submission of the currently-submitted self-image, the accelerometer of the electronic device sensed device-acceleration data that is least similar, beyond a pre-defined threshold of similarity, to the device-acceleration data that was sensed during the capturing of the reference self-image in step (c); wherein step (f) comprises: if it is determined that during the time-period, that is immediately prior to submission of the currently-submitted self-image, the accelerometer of the device did not sense device-acceleration data that is least similar, beyond a pre-defined threshold of similarity, to the device-acceleration data that was sensed during the capturing of the reference self-image in step (c), then: triggering an alert that said self-taken image is estimated to be a not-freshly-captured image of said user.

In some embodiments, step (c) comprises: during said capturing of the reference self-image of the user, sensing device-orientation data of said electronic device, via the gyroscope of said electronic device; step (e) comprises: determining whether or not during the time-period, that is immediately prior to submission of the currently-submitted self-image, the gyroscope of the electronic device sensed device-orientation data that is least similar, beyond a pre-defined threshold of similarity, to the device-orientation data that was sensed during the capturing of the reference self-image in step (c); step (f) comprises: if it is determined that during the time-period, that is immediately prior to submission of the currently-submitted self-image, the gyroscope of the electronic device did not sense device-orientation data that is least similar, beyond a pre-defined threshold of similarity, to the device-orientation data that was sensed during the capturing of the reference self-image in step (c), then: triggering an alert that said self-taken image is estimated to be a not-freshly-captured image of said user.

In some embodiments, a method comprises: (a) generating a user-authentication process that utilizes at least a fingerprint scan of a user of an electronic device, captured via a fingerprint scanner of said electronic device, as an authentication factor for authenticating said user to a computerized service; (b) in said user-authentication process, determining whether (I) a submission by said user of said fingerprint scan, is accompanied by sensed spatial characteristics of the electronic device which indicate that the electronic device is being utilized for capturing said fingerprint scan, or (II) the submission by said user of said fingerprint scan, is accompanied by sensed spatial characteristics of the electronic device which indicate that the electronic device is not being utilized for capturing said fingerprint scan; (c) if it is determined that the submission by said user of said fingerprint scan, is accompanied by sensed spatial characteristics of the electronic device which indicate that the electronic device is not being utilized for capturing said fingerprint scan, then: triggering an alert that said fingerprint scan is estimated to be a not-freshly-captured fingerprint scan.

In some embodiments, the method comprises: sensing via an accelerometer of the electronic device, device-acceleration data that accompanies the submission by said user of said fingerprint scan; determining that device-acceleration data, that accompanies the submission by said user of said fingerprint scan, does not correspond to device-acceleration data that is expected to accompany submission of a fresh fingerprint scan; and based on said determining, triggering a determination that said fingerprint scan is estimated to be a not-freshly-captured image of said user.

In some embodiments, the method comprises: sensing via a gyroscope of the electronic device, device-orientation data that accompanies the submission by said user of said fingerprint scan; determining that device-orientation data, that accompanies the submission by said user of said fingerprint scan, does not correspond to device-orientation data that is expected to accompany submission of a fresh fingerprint scan; and based on said determining, triggering a determination that said fingerprint scan is estimated to be a not-freshly-captured image of said user.

In some embodiments, the method comprises: sensing via an accelerometer of the electronic device, device-acceleration data immediately prior to the submission by said user of said fingerprint scan; determining that device-acceleration data, that was sensed immediately prior to the submission by said user of said fingerprint scan, does not correspond to device-acceleration data that is expected to precede submission of a fresh fingerprint scan; and based on said determining, triggering a determination that said fingerprint scan is estimated to be a not-freshly-captured fingerprint scan of said user.

In some embodiments, the method comprises: sensing via a gyroscope of the electronic device, device-orientation data immediately prior to the submission by said user of said fingerprint scan; determining that device-orientation data, that was sensed immediately prior to the submission by said user of said fingerprint scan, does not correspond to device-orientation data that is expected to precede submission of a fresh fingerprint scan; and based on said determining, triggering a determination that said fingerprint scan is estimated to be a not-freshly-captured fingerprint scan of said user.

In some embodiments, a process comprises: (a) generating a user-authentication process that utilizes at least a fingerprint scan of a user of an electronic device, captured via a fingerprint scanner of said electronic device, as an authentication factor for authenticating said user to a computerized service; (b) capturing a reference fingerprint scan of the user, to be used subsequently as an authentication factor for authenticating said user; (c) during said capturing of the reference fingerprint scan, sensing also acceleration data/gyroscope data/device-orientation data of said electronic device, from an accelerometer/gyroscope of said electronic device; (d) subsequently, receiving from said user a currently-submitted fingerprint scan, that the user submits as a user-authentication factor; (e) determining whether or not during a time-period, that is immediately prior to submission of the currently-submitted fingerprint scan, the electronic device sensed acceleration data/gyroscope data/device-orientation data that are at least similar, beyond a pre-defined threshold of similarity, to the acceleration data/gyroscope data/device-orientation data that was sensed during the capturing of the reference fingerprint scan in step (c); (f) if it is determined that during a time-period, that is immediately prior to submission of the currently-submitted fingerprint scan, the electronic device did not acceleration data/gyroscope data/device-orientation data that are at least similar, beyond a pre-defined threshold of similarity, to the acceleration data/gyroscope data/device-orientation data that was sensed during the capturing of the reference fingerprint scan in step (c), then: triggering an alert that the currently-submitted fingerprint scan is estimated to be a not-freshly-captured fingerprint scan.

In some embodiments, step (c) comprises: during said capturing of the reference fingerprint scan of the user, sensing device-acceleration data of said electronic device, via the accelerometer of said electronic device; wherein step (e) comprises: determining whether or not during the time-period, that is immediately prior to submission of the currently-submitted fingerprint scan, the accelerometer of the electronic device sensed device-acceleration data that is least similar, beyond a pre-defined threshold of similarity, to the device-acceleration data that was sensed during the capturing of the reference fingerprint scan in step (c); wherein step (f) comprises: if it is determined that during the time-period, that is immediately prior to submission of the currently-submitted fingerprint scan, the accelerometer of the electronic device did not sense device-acceleration data that is least similar, beyond a pre-defined threshold of similarity, to the device-acceleration data that was sensed during the capturing of the reference fingerprint scan in step (c), then: triggering an alert that said self-taken image is estimated to be a not-freshly-captured fingerprint scan of said user.

In some embodiments, step (c) comprises: during said capturing of the reference fingerprint scan of the user, sensing device-orientation data of said electronic device, via the gyroscope of said electronic device; wherein step (e) comprises: determining whether or not during the time-period, that is immediately prior to submission of the currently-submitted fingerprint scan, the gyroscope of the electronic device sensed device-orientation data that is least similar, beyond a pre-defined threshold of similarity, to the device-orientation data that was sensed during the capturing of the reference fingerprint scan in step (c); wherein step (f) comprises: if it is determined that during the time-period, that is immediately prior to submission of the currently-submitted fingerprint scan, the gyroscope of the electronic device did not sense device-orientation data that is least similar, beyond a pre-defined threshold of similarity, to the device-orientation data that was sensed during the capturing of the reference fingerprint scan in step (c), then: triggering an alert that said fingerprint scan is estimated to be a not-freshly-captured fingerprint scan of said user.

The terms "self-taken item" or "self-taken visual item" or "self-taken camera-acquired item" or "self-taken visual acquisition item" or "self-taken visual acquisition input", as used herein, may include a self-taken image ("selfie" image) and/or a self-taken photograph and or a self-taken video ("selfie" video) and/or a self-taken batch-of-images and/or a self-taken group of video frames, or other visual or camera-based input that may be utilized for signing-in or logging-in or face-based sign in or user authentication.

In accordance with the present invention, a user authentication unit or module or device may capture (via one or more cameras) a selfie image or a selfie video, or a set or series of selfie images or frames, which are then utilized for authenticating the user; and also for determining whether the submitted or captured image or video is a "fresh" one or a freshly-captured one or a recently-captured one, rather than being a previously-captured or previously-submitted item (e.g., captured or submitted a minute or an hour or a day or a year prior to the current authentication attempt); and also for determining Liveness, namely, that the captured image or video reflect therein a live human user, rather than (for example) being an image (or a video) of a two-dimensional printed photograph of a person.

In some embodiments, for example, the user authentication unit may comprise a Video/Image Content Analyzer, which may perform computer vision analysis on video or video frames or image(s) captured or submitted for authentication purposes, in order to extract from such imaged or captured or submitted content, one or more features that may be correlated or conversely may be contradicted with data that is sensed or measured or captured by one or more other sensors or units of the electronic device that allegedly (or factually) submitted or captured such video or image(s); such as, features or data acquired by one or more accelerometer(s), gyroscope unit(s), compass unit(s), device orientation sensor(s), device spatial-orientation sensor(s), device slanting/tilt sensor, device location-determining sensor, Global Positioning System (GPS) sensor, or the like. If a mismatch is determined or is found, between (i) content that appears in the submitted video or image, and (ii) data that is collected or sensed by or from such sensors of the submitting electronic device, then, the user authentication unit may deny or unauthorize the access, or may reject or deny the authentication attempt or the log-in attempt, or may respond negatively to such authentication attempt or log-in attempt, or may declare that the user is not authenticated; or in some embodiments, may trigger or may initiate one or more fraud mitigation operations, for example, requiring the user to perform authentication via an additional factor (e.g., to answer pre-defined security questions) or to perform a two-factor authentication (TFA) or multi-factor authentication (MFA) or to contact a customer service representative by phone or in person, or the like.

In a first set of examples, the user authentication unit, which may be located within the electronic device and/or may be part of a remote server, receives a submitted selfie image or selfie video. The content analyzer unit performs computer vision analysis of the content shown, and detects that the submitted three-seconds video (or, that the submitted 2 or 8 or 60 consecutive frames that were taken during the selfie acquisition) shows the user and/or its background in an absolutely still and idle position, such that the submitted video (or group of images) does not reflect any type of shaking or movement of the hand of the user that allegedly took the video or images. For example, content analysis of the submitted video, or of the submitted set of images, shows the user's head being located at exactly the same position within the frame(s) or video or image(s); for example, an image of a "head" appears in the center of the frame, and does not have any offset or any displacement from one frame to another frame. This is highly unusual or irregular in a true acquisition of a three-second selfie video; as even the most proficient human user would typically cause some shaking or vibration or movement or instability or steadiness of the electronic device during the acquisition period. Furthermore, the user authentication unit may now correlate or contradict or match this content from the selfie video or image(s), with data collected by the sensors of the electronic device. For example, data sensed or measured by the accelerometer(s) and/or gyroscope unit(s) and/or compass unit(s) and/or device orientation sensor(s) and/or device spatial-orientation sensor(s) and/or device slanting/tilt sensor(s) and/or device location-determining sensor(s) and/or device's GPS sensor, as captured during the capturing or the acquisition or the submitting of the selfie image or selfie video, or within T seconds before and/or after such acquisition or submission (e.g., T being 1 or 2.5 or 3 seconds), indicate that such sensor(s) do report movement or instability or non-steadiness or motion or acceleration or deceleration or shaking of the electronic device. Accordingly, the system determines that the stable and idle or steady (non-moving) Content that is recognized in the submitted selfie video or selfie image(s), contradicts or does not match or does not correlate with the data or features as extracted or learned from the device's sensor(s). Such determination by the system may thus lead to denial of the authentication request or rejection of the authentication attempt.

In a second set of examples, the user authentication unit, which may be located within the electronic device and/or may be part of a remote server, receives a submitted selfie image or selfie video. The content analyzer unit performs computer vision analysis of the content shown, and detects that the submitted four-seconds video (or, that the submitted 4 or 9 or 50 consecutive frames that were taken during the selfie acquisition) shows the user and/or its background in a manner that indicates that the capturing device was slightly shaking or moving or was instable or non-steady or non-idle, such that the submitted video (or group of images) reflects at least some shaking or movement of the hand of the user that allegedly took the video or images. For example, content analysis of the submitted video, or of the submitted set of images, shows the user's head being located at slightly different positions within the frame(s) or video or image(s); for example, an image of a "head" appears in the center frame #1, and then appears at an offset of one pixel to the right of the center in frame #2, and then appears at an offset of three pixels to the left of the center in frame #3, and so forth, reflecting some displacement from one frame to another frame. This is usual or regular in a true acquisition of a four-second selfie video; as even the most proficient human user would typically cause some shaking or vibration or movement or instability or non-steadiness of the electronic device during the acquisition period. However, the user authentication unit may now correlate or contradict or match this content from the selfie video or image(s), with data collected by the sensors of the electronic device. For example, data sensed or measured by the accelerometer(s) and/or gyroscope unit(s) and/or compass unit(s) and/or device orientation sensor(s) and/or device spatial-orientation sensor(s) and/or device slanting/tilt sensor(s) and/or device location-determining sensor(s) and/or device's GPS sensor, as captured during the capturing or the acquisition or the submitting of the selfie image or selfie video, or within T seconds before and/or after such acquisition or submission (e.g., T being 1 or 2.5 or 3 seconds), indicate that such sensor(s) do not report any movement or instability or non-steadiness or motion or acceleration or deceleration or shaking of the electronic device. Accordingly, the system determines that the shaking or non-stable or non-steady or non-idle Content that is recognized in the submitted selfie video or selfie image(s), contradicts or does not match or does not correlate with the data or features as extracted or learned from the device's sensor(s) which indicate an idle device or a non-moving device or a completely stable device. Such determination by the system may thus lead to denial of the authentication request or rejection of the authentication attempt.

In a third set of examples, the user authentication unit, which may be located within the electronic device and/or may be part of a remote server, receives a submitted selfie image or selfie video. The content analyzer unit performs computer vision analysis of the content shown, and detects that the submitted four-seconds video (or, that the submitted 4 or 9 or 50 consecutive frames that were taken during the selfie acquisition) shows the user and/or its background in a manner that indicates that the capturing device was slightly shaking horizontally or moving horizontally or was horizontally instable or was horizontally non-idle or was horizontally non-steady, such that the submitted video (or group of images) reflects horizontal shaking or movement of the hand of the user that allegedly took the video or images; while also reflecting (as determined by the content analyzer) non-shaking or non-movement or steadiness in the vertical direction or the vertical axis. For example, content analysis of the submitted video, or of the submitted set of images, shows the user's head being located at slightly different positions within the frame(s) or video or image(s); for example, an image of a "head" appears in the center frame #1, and then appears at an offset of one pixel to the right of the center in frame #2, and then appears at an offset of three pixels to the left of the center in frame #3, and so forth, reflecting some Horizontal displacement from one frame to another frame. This may be usual or regular in a true acquisition of a four-second selfie video; as even the most proficient human user would typically cause some shaking or vibration or movement or instability or non-steadiness of the electronic device during the acquisition period. However, the user authentication unit may now correlate or contradict or match this content from the selfie video or image(s), with data collected by the sensors of the electronic device. For example, data sensed or measured by the accelerometer(s) and/or gyroscope unit(s) and/or compass unit(s) and/or device orientation sensor(s) and/or device spatial-orientation sensor(s) and/or device slanting/tilt sensor(s) and/or device location-determining sensor(s) and/or device's GPS sensor, as captured during the capturing or the acquisition or the submitting of the selfie image or selfie video, or within T seconds before and/or after such acquisition or submission (e.g., T being 1 or 2.5 or 3 seconds), indicate that such sensor(s) do indeed report movement or instability or motion or acceleration or deceleration or shaking of the electronic device, but such movement or instability or shaking are actually reported by the device's sensor(s) as being Vertical and not horizontal, or as being Diagonal (e.g., both vertical and horizontal; and not only horizontal). Accordingly, the system determines that the Horizontal shaking or non-stable or non-idle Content that is recognized in the submitted selfie video or selfie image(s), contradicts or does not match or does not correlate with the data or features as extracted or learned from the device's sensor(s) which indicate a Vertically moving device, or a vertically-and-horizontally moving device. Such determination by the system may thus lead to denial of the authentication request or rejection of the authentication attempt.

In a fourth set of examples, the user authentication unit, which may be located within the electronic device and/or may be part of a remote server, receives a submitted selfie image or selfie video. The content analyzer unit performs computer vision analysis of the content shown, and detects that the submitted four-seconds video (or, that the submitted 4 or 9 or 50 consecutive frames that were taken during the selfie acquisition) shows the user and/or its background in a manner that indicates that the capturing device was only Slightly shaking horizontally or only Slightly moving horizontally or was horizontally slightly instable or was horizontally slightly non-idle, such that the submitted video (or group of images) reflects a small amount of horizontal shaking or movement of the hand of the user that allegedly took the video or images; while also reflecting (as determined by the content analyzer) non-shaking or non-movement in the vertical direction or the vertical axis. For example, content analysis of the submitted video, or of the submitted set of images, shows the user's head being located at slightly different positions within the frame(s) or video or image(s); for example, an image of a "head" appears in the center frame #1, and then appears at an offset of one pixel to the right of the center in frame #2, and then appears at an offset of three pixels to the left of the center in frame #3, and so forth, reflecting some Horizontal displacement from one frame to another frame. This may be usual or regular in a true acquisition of a four-second selfie video; as even the most proficient human user would typically cause some shaking or vibration or movement or instability of the electronic device during the acquisition period. However, the user authentication unit may now correlate or contradict or match this content from the selfie video or image(s), with data collected by the sensors of the electronic device. For example, data sensed or measured by the accelerometer(s) and/or gyroscope unit(s) and/or compass unit(s) and/or device orientation sensor(s) and/or device spatial-orientation sensor(s) and/or device slanting/tilt sensor(s) and/or device location-determining sensor(s) and/or device's GPS sensor, as captured during the capturing or the acquisition or the submitting of the selfie image or selfie video, or within T seconds before and/or after such acquisition or submission (e.g., T being 1 or 2.5 or 3 seconds), indicate that such sensor(s) have actually reported gross or significant or non-slight movement or instability or motion or acceleration or deceleration or shaking of the electronic device, for example, indicating that the end-user device was actually rotated or spun horizontally in a manner that corresponds to 45 or 60 degrees of the 360 degrees around it; and therefore, while the Content of the selfie video (or group of images) show the user's head as moving or displaced by just a few pixels to the right or to the left, a True selfie video (or set of images) would have shown a large displacement of the user's head from frame to frame by at least 30 or 50 pixels, or would have even shown the left half of the user's head becoming outside of the field-of-view being acquired. Accordingly, the system determines that the Slight or negligible horizontal shaking reflected in the Content that is recognized in the submitted selfie video or selfie image(s), contradicts or does not match or does not correlate with the data or features as extracted or learned from the device's sensor(s) which indicate a Gross or non-negligible movement or shaking. Such determination by the system may thus lead to denial of the authentication request or rejection of the authentication attempt.

In a fifth set of examples, the user authentication unit, which may be located within the electronic device and/or may be part of a remote server, receives a submitted selfie image or selfie video. The content analyzer unit performs computer vision analysis of the content shown, and detects that the submitted four-seconds video (or, that the submitted 4 or 9 or 50 consecutive frames that were taken during the selfie acquisition) shows the user's head located clearly on a pillow within a bed, corresponding to a user that is lying down in a bed and holding his smartphone above his head with the smartphone being generally parallel to the ground and facing downwardly towards the pillow and the user's head. However, the user authentication unit may now correlate or contradict or match this content from the selfie video or image(s), with data collected by the sensors of the electronic device. For example, data sensed or measured by the accelerometer(s) and/or gyroscope unit(s) and/or compass unit(s) and/or device orientation sensor(s) and/or device spatial-orientation sensor(s) and/or device slanting/tilt sensor(s) and/or device location-determining sensor(s) and/or device's GPS sensor, as captured during the capturing or the acquisition or the submitting of the selfie image or selfie video, or within T seconds before and/or after such acquisition or submission (e.g., T being 1 or 2.5 or 3 seconds), indicate that such sensor(s) have actually reported that the smartphone was continuously being held Vertically and perpendicular to the ground, and not Horizontally; and/or that the smartphone was held horizontally but with its screen and its front-side camera Facing Upwardly towards the ceiling. Accordingly, the system determines that the location of positioning of the user or his head or body or body-organ(s) as recognized in the Video content or the Image(s) content, and/or the Surrounding of the user (e.g., pillow, bed, floor, walls), do not match or do not correlate with, or even contradict, the spatial orientation or the spatial positioning of the end-user device during (and/or immediately before, and/or immediately after) the acquisition or the submission of the selfie video or selfie image(s). In another example, the computer vision analysis or the image/video recognition process, may indicate that the user is standing against a wall and extending his arm forward (e.g., as common in taking a selfie photo) such that the smartphone is generally perpendicular to the ground; whereas, the actual data sensed by the end-user device, during or before or after submission or acquisition, indicates that the end-user device was slanted at 45 degrees relative to the ground, such that it would have been impossible for a user to capture such photo from that angle or device slanting or device orientation. Such determination(s) by the system may thus lead to denial of the authentication request or rejection of the authentication attempt.

In another set of examples, the content analysis of the selfie video or the selfie image(s), indicates that they show the user being clearly located indoors, as the content analyzer recognizes image-portions that correspond to indoor items (e.g., a floor lamp, a television, a microwave oven in the background, a framed painting hanging on the wall); however, the user authentication unit checks and finds that the geographical location of the end-user device, as determined or sensed and reported by its GPS sensor or other location-determining unit (e.g., based on Wi-Fi based location determination; based on Cellular based location determination or triangulation; or the like) clearly indicate that the end-user device is actually located in Central Park in New York City, or is located in the Grand Canyon in Nevada, or in an area or venue that is clearly an outdoors area or a non-indoors area. Such contradiction or mismatch, between (i) the content shown in the selfie video or the selfie image(s), and (ii) the content or surrounding or ambient items that are expected to be (or, that are expected not to be) in the geographical location of the end-user device as reported by its location-determining unit, may lead the user authentication unit to deny or reject the authentication request.

Similarly, in another example, content analysis of the selfie video or selfie image shows the user standing in a busy street with many vehicles passing by or passing behind him; whereas, GPS or location-based data of the end-user device, indicates that the end-user device is located at the Grand Canyon in Nevada, or is located inside a particular Sports Stadium, or inside a geographical region that is known to be vehicle-free (e.g., a forest, or a nature center); and such detected contradiction may lead to denial or rejection of the authentication request.

In another example, the user authentication unit determines that the GPS sensor and/or the Wi-Fi transceiver of the end-user device, indicate clearly that the end-user device is located in Miami; whereas the Content of the selfie video or selfie image, clearly show the user wearing a fur coat and being located in a back yard that is visibly covered or blanketed in heavy snow. The system may determine, based on pre-defined rules, that if Snow is detected in the video or image, but in contrast the location-determining sensor(s) indicate that the end-user device is in a snow-less region (or in a reason that does not have snow at this time of the year), then the user authentication request would be denied or rejected.

In another example, the user authentication unit determines that the GPS sensor and/or the Wi-Fi transceiver of the end-user device, indicate clearly that the end-user device is located at a location that, according to current weather data (e.g., obtained from a weather reporting server, or from the Internet) currently has sunny weather with no snow and no rain; whereas, the selfie image or selfie video that was just submitted, allegedly from that location, clearly shows a user holding an umbrella under a cloudy sky with heavy rain. Such mismatch may cause the system to reject or deny the authentication request, or at least to require additional authentication factor(s) to be utilized.

In another set of examples, the content analysis of the selfie image(s) or selfie video(s), may even perform more advanced analysis which may optionally comprise Optical Character Recognition (OCR). For example, the content analysis of the selfie video or image(s), shows the user standing at a street intersection, next to a street sign that says "Broadway" and "West 57th Street"; or next to a sign that says "Madison Square Garden", or next to a sign that says "Carnegie Hall"; thereby enabling the content analysis unit to determine that the location depicted in the selfie item is a particular intersection or location in Manhattan, N.Y. However, the user authentication unit checks and finds that the GPS unit or other location-determining unit of the end-user device, indicates that the location of the device is actually Los Angeles, Calif. Such mismatch or contradiction may cause the user authentication unit to reject or deny the authentication attempt.

In another example, the content analysis of the selfie image(s) or selfie video(s), shows the user standing at a street intersection, next to a street sign that says "Avenue de Champs-Elysees" and "Rue Honore de Balzac", and optionally also showing street signs in French language; thereby enabling the content analysis unit to determine that the location depicted in the selfie item is in Paris, France. However, the user authentication unit checks and finds that the GPS unit or other location-determining unit of the end-user device, indicates that the location of the device is actually Austin, Tex. Such mismatch or contradiction may cause the user authentication unit to reject or deny the authentication attempt.

In another set of examples, the content analysis of the selfie image(s) or selfie video, shows the user standing outdoors (e.g., showing street environment and vehicles passing behind him), and further showing sunny blue sky above him or over his shoulders or over his head; thereby indicating to the user authentication unit that the selfie image or selfie video was captured at daytime. However, the GPS component or other location-determining unit of the electronic device, reports that the electronic device is currently located in California; and the user authentication system checks what is the current local time in California and finds that it is currently 1:30 AM. The user authentication system thus detects a contradiction or mismatch or non-correlation, between (i) the time-of-day as deduced from computer vision analysis of the selfie image or selfie video, and (ii) the time-of-day as deduced from the geographic location that is reported by the GPS component or other location-determining component of the electronic device. Such mismatch or contradiction may cause the user authentication unit to reject or deny the authentication attempt. In an opposite example, content analysis of the selfie image or selfie video indicate that they were taken at night-time (e.g., showing therein the user standing outdoor, with dark black sky over his head, and with lit street lamps and lit houses behind him); yet the GPS component (or other location-determining sensor) of the electronic device has sensed and reported that the electronic device is actually located in Florida, in which the current time now is 11 AM which corresponds to day-time and not night-time; and Such mismatch or contradiction may cause the user authentication unit to reject or deny the authentication attempt.

All the above are various non-limiting examples of user authentication processes and determinations and comparisons that may be performed by some embodiments of the present invention. Other suitable determinations or rules or lookup tables may be used, to determine a mismatch or non-correlation or even a clear contradiction, between (i) one or more features that are extracted or derived or deduced from Content Analysis of a selfie video or selfie image(s), and (ii) data sensed or measured or captured by the end-user device sensors (accelerometer, compass, gyroscope, device-orientation sensor, GPS, location-determining sensor, or the like). In some embodiments, computer vision algorithms may be used, to extract or to deduce from the selfie image(s) or selfie video, indications of the end-user device's position, orientation, spatial orientation, slanting, tilting, manner of being held by the user (e.g., horizontally, vertically, diagonally, upside down, facing down, facing up, facing sideway), being idle or stable or being moving or non-stable or non-idle or shaking, the angle or slanting of the device relative to the floor or ground or ceiling, the geo-spatial or geographic location of the device, indoor indications, outdoor indications, weather or weather-related indications, or the like; and such indications may be compared to or matched with data sensed or measured or reported by the relevant sensors of the end-user device. A contradiction or mismatch may thus lead to rejection or denial of the authentication attempt, or at least to requiring the user to utilize an additional authentication factor or authentication means.

One or more computer vision algorithms or image recognition algorithms, may be used for analysis of the content of the selfie image(s) or selfie video; for example, image recognition based on prior training with a large data-set of items or objects, or based on machine learning (ML) or deep learning or artificial intelligence (AI), or by using a Neural Network (NN), or based on object recognition, computer vision algorithms based on edge matching and/or edge detection, or based on CAD-like object models, or using appearance-based object recognition methods (e.g., based on comparison with known example images or known exemplars or known templates), divide-and-conquer image searches that divide an image or a frame into cells or blocks, grayscale matching algorithms (e.g., computing pixel distance as a function of both pixel position and pixel intensity), gradient matching, methods that utilize eigenvectors of templates (or eigenfaces), feature-based recognition methods, methods that utilize image interpretation tree(s), pose consistency, pose clustering, geometric hashing, scale-invariant feature transform (SIFT), speeded up robust features (SURF), or the like.

In some embodiments, a method comprises: (a) generating a user-authentication process for authenticating a user of an electronic device, wherein the user-authentication process utilizes a self-taken visual-acquisition input of said user, wherein the self-taken visual-acquisition input comprises one of: a self-taken image, a self-taken video; (b) performing image recognition on content shown in said self-taken visual-acquisition input, and extracting a particular feature based on image recognition of said content; (c) determining a characteristic of said electronic device, based on data sensed by one or more non-camera sensors of said electronic device during acquisition of said self-taken visual-acquisition input; (d) detecting a mismatch between (I) said particular feature that was extracted in step (b) based on image recognition of the content of the self-taken visual-acquisition input, and (II) said characteristic of the electronic device that was determined in step (c) based on data sensed by said one or more non-camera sensors of said electronic device; (e) based on said mismatch detected in step (d), denying an authentication request received from said electronic device.

In some embodiments, step (d) comprises: detecting that the content of the self-taken visual-acquisition input, indicates that the electronic device was held vertically during acquisition; detecting that a spatial-orientation sensor of the electronic device, indicates that the electronic device was held non-vertically during acquisition; based on the above detecting operations, determining said mismatch, and denying said authentication request.

In some embodiments, step (d) comprises: detecting that the content of the self-taken visual-acquisition input, indicates that the electronic device was held horizontally during acquisition; detecting that a spatial-orientation sensor of the electronic device, indicates that the electronic device was held non-horizontally during acquisition; based on the above detecting operations, determining said mismatch, and denying said authentication request.

In some embodiments, step (d) comprises: detecting that the content of the self-taken visual-acquisition input, indicates that the electronic device was held facing towards a first direction during acquisition; detecting that a spatial-orientation sensor of the electronic device, indicates that the electronic device was held facing towards a second direction during acquisition; based on the above detecting operations, determining said mismatch, and denying said authentication request.

In some embodiments, step (d) comprises: detecting that the content of the self-taken visual-acquisition input, indicates that the electronic device was held steadily during acquisition; detecting that one or more non-camera sensors of the electronic device, indicate that the electronic device was held non-steadily during acquisition; based on the above detecting operations, determining said mismatch, and denying said authentication request.

In some embodiments, step (d) comprises: detecting that the content of the self-taken visual-acquisition input, indicates that the electronic device was held non-steadily during acquisition; detecting that one or more non-camera sensors of the electronic device, indicate that the electronic device was held steadily during acquisition; based on the above detecting operations, determining said mismatch, and denying said authentication request.

In some embodiments, step (d) comprises: detecting that the content of the self-taken visual-acquisition input, indicates that the electronic device was held during acquisition while being moved along a particular axis of movement; detecting that one or more non-camera sensors of the electronic device, indicate that the electronic device was held steadily during acquisition; based on the above detecting operations, determining said mismatch, and denying said authentication request.

In some embodiments, step (d) comprises: detecting that the content of the self-taken visual-acquisition input, indicates that the electronic device was held during acquisition while being moved along a first particular axis of movement; detecting that one or more non-camera sensors of the electronic device, indicate that the electronic device was held during acquisition while being moved along a second particular axis of movement that is different from said first particular axis of movement; based on the above detecting operations, determining said mismatch, and denying said authentication request.

In some embodiments, step (d) comprises: detecting that the content of the self-taken visual-acquisition input, indicates that the electronic device was moved during acquisition in accordance with a first spatial movement pattern; detecting that one or more non-camera sensors of the electronic device, indicate that the electronic device was moved during acquisition in accordance with a second, different, spatial movement pattern; based on the above detecting operations, determining said mismatch, and denying said authentication request.

In some embodiments, step (d) comprises: detecting that the content of the self-taken visual-acquisition input, indicates that the electronic device was located indoors during acquisition; detecting that one or more non-camera sensors of the electronic device, indicate that the electronic device was located outdoors during acquisition; based on the above detecting operations, determining said mismatch, and denying said authentication request.

In some embodiments, step (d) comprises: detecting that the content of the self-taken visual-acquisition input, indicates that the electronic device was located outdoors during acquisition; detecting that one or more non-camera sensors of the electronic device, indicate that the electronic device was located indoors during acquisition; based on the above detecting operations, determining said mismatch, and denying said authentication request.

In some embodiments, step (d) comprises: detecting that the content of the self-taken visual-acquisition input, indicates that the electronic device was located at a first particular geographic location during acquisition; detecting that one or more non-camera sensors of the electronic device, indicate that the electronic device was located at a second particular geographic location during acquisition; based on the above detecting operations, determining said mismatch, and denying said authentication request.

In some embodiments, step (d) comprises: detecting that the content of the self-taken visual-acquisition input, indicates that the electronic device was moved during acquisition at a movement range of N degrees; detecting that one or more non-camera sensors of the electronic device, indicate that the electronic device was moved during acquisition at a movement range of M degrees, wherein the difference between M and N is at least P percent of N, wherein P and M and N are pre-defined values; based on the above detecting operations, determining said mismatch, and denying said authentication request.

In some embodiments, step (d) comprises: determining that there exists a contradiction between (I) spatial orientation of the electronic device as sensed by one or more non-camera spatial orientation sensors of the electronic device during acquisition, and (II) spatial orientation of the electronic device as determined from computer vision analysis of content shown in said self-taken visual-acquisition input; based on said determining, denying said authentication request.

In some embodiments, step (d) comprises: determining that there exists a contradiction between (I) spatial orientation of the electronic device as sensed by one or more gyroscope sensors of the electronic device during acquisition, and (II) spatial orientation of the electronic device as determined from computer vision analysis of content shown in said self-taken visual-acquisition input; based on said determining, denying said authentication request.

In some embodiments, step (d) comprises: determining that there exists a contradiction between (I) acceleration of the electronic device as sensed by one or more accelerometers of the electronic device during acquisition, and (II) acceleration of the electronic device as determined from computer vision analysis of content shown in said self-taken visual-acquisition input; based on said determining, denying said authentication request.

In some embodiments, step (d) comprises: determining that there exists a contradiction between (I) spatial spinning characteristic of the electronic device as sensed by one or more spatial characteristic sensors of the electronic device during acquisition, and (II) spatial spinning characteristic of the electronic device as determined from computer vision analysis of content shown in said self-taken visual-acquisition input; based on said determining, denying said authentication request.

In some embodiments, step (d) comprises: determining that there exists a contradiction between (I) geographic location of the electronic device as sensed by a Global Positioning System (GPS) sensor of the electronic device during acquisition, and (II) geographic location of the electronic device as determined from computer vision analysis of content shown in said self-taken visual-acquisition input; based on said determining, denying said authentication request.

In some embodiments, step (d) comprises: determining a contradiction between (A) output of an image recognition analysis applied to said self-taken visual-acquisition input, and (B) data sensed by one or more of (B1) accelerometer of the electronic device, (B2) gyroscope of the electronic device, (B3) spatial-orientation sensor of said electronic device, (B4) Global Positioning System (GPS) sensor of the electronic device, (B5) location-determining sensor of the electronic device; based on said contradiction, denying said authentication request.

In some embodiments, the user authentication process, that is based on said self-taken visual-acquisition input, is configured to authorize or deny user access to at least one of: said electronic device (e.g., a smartphone, a tablet, a laptop computer, a desktop computer, a smart-watch, a gaming device), an electronic mail account, a social network account, an online retailer account, an online banking account, a vehicle, an ignition system or a starting system of a vehicle, a physical venue or house or residence or office (e.g., protected or blocked by a door, a gate, a turnstile, or other obstacle or barrier).

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments of the present invention may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A method comprising:
    (a) generating a user-authentication process for authenticating a user of an electronic device, wherein the user-authentication process utilizes a self-taken visual-acquisition input of said user, wherein the self-taken visual-acquisition input comprises one of: a self-taken image, a self-taken video;
    (b) performing image recognition on content shown in said self-taken visual-acquisition input, and extracting a particular feature based on image recognition of said content;
    (c) determining a characteristic of said electronic device, based on data sensed by one or more non-camera sensors of said electronic device during acquisition of said self-taken visual-acquisition input;

(d) detecting a mismatch between (I) said particular feature that was extracted in step (b) based on image recognition of the content of the self-taken visual-acquisition input, and (II) said characteristic of the electronic device that was determined in step (c) based on data sensed by said one or more non-camera sensors of said electronic device;

(e) based on said mismatch detected in step (d), denying an authentication request received from said electronic device wherein step (d) comprises:

detecting that the content of the self-taken visual-acquisition input, indicates that the electronic device was held vertically during acquisition;

detecting that a spatial-orientation sensor of the electronic device, indicates that the electronic device was held non-vertically during acquisition;

based on the above detecting operations, determining said mismatch, and denying said authentication request.

2. The method of claim 1, wherein step (d) comprises:

detecting that the content of the self-taken visual-acquisition input, indicates that the electronic device was held horizontally during acquisition;

detecting that a spatial-orientation sensor of the electronic device, indicates that the electronic device was held non-horizontally during acquisition;

based on the above detecting operations, determining said mismatch, and denying said authentication request.

3. The method of claim 1, wherein step (d) comprises:

detecting that the content of the self-taken visual-acquisition input, indicates that the electronic device was held facing towards a first direction during acquisition;

detecting that a spatial-orientation sensor of the electronic device, indicates that the electronic device was held facing towards a second direction during acquisition;

based on the above detecting operations, determining said mismatch, and denying said authentication request.

4. The method of claim 1, wherein step (d) comprises:

detecting that the content of the self-taken visual-acquisition input, indicates that the electronic device was held steadily during acquisition;

detecting that one or more non-camera sensors of the electronic device, indicate that the electronic device was held non-steadily during acquisition;

based on the above detecting operations, determining said mismatch, and denying said authentication request.

5. The method of claim 1, wherein step (d) comprises:

detecting that the content of the self-taken visual-acquisition input, indicates that the electronic device was held non-steadily during acquisition;

detecting that one or more non-camera sensors of the electronic device, indicate that the electronic device was held steadily during acquisition;

based on the above detecting operations, determining said mismatch, and denying said authentication request.

6. The method of claim 1, wherein step (d) comprises:

detecting that the content of the self-taken visual-acquisition input, indicates that the electronic device was held during acquisition while being moved along a particular axis of movement;

detecting that one or more non-camera sensors of the electronic device, indicate that the electronic device was held steadily during acquisition;

based on the above detecting operations, determining said mismatch, and denying said authentication request.

7. The method of claim 1, wherein step (d) comprises:

detecting that the content of the self-taken visual-acquisition input, indicates that the electronic device was held during acquisition while being moved along a first particular axis of movement;

detecting that one or more non-camera sensors of the electronic device, indicate that the electronic device was held during acquisition while being moved along a second particular axis of movement that is different from said first particular axis of movement;

based on the above detecting operations, determining said mismatch, and denying said authentication request.

8. The method of claim 1, wherein step (d) comprises:

detecting that the content of the self-taken visual-acquisition input, indicates that the electronic device was moved during acquisition in accordance with a first spatial movement pattern;

detecting that one or more non-camera sensors of the electronic device, indicate that the electronic device was moved during acquisition in accordance with a second, different, spatial movement pattern;

based on the above detecting operations, determining said mismatch, and denying said authentication request.

9. The method of claim 1, wherein step (d) comprises:

detecting that the content of the self-taken visual-acquisition input, indicates that the electronic device was located indoors during acquisition;

detecting that one or more non-camera sensors of the electronic device, indicate that the electronic device was located outdoors during acquisition;

based on the above detecting operations, determining said mismatch, and denying said authentication request.

10. The method of claim 1, wherein step (d) comprises:

detecting that the content of the self-taken visual-acquisition input, indicates that the electronic device was located outdoors during acquisition;

detecting that one or more non-camera sensors of the electronic device, indicate that the electronic device was located indoors during acquisition;

based on the above detecting operations, determining said mismatch, and denying said authentication request.

11. The method of claim 1, wherein step (d) comprises:

detecting that the content of the self-taken visual-acquisition input, indicates that the electronic device was located at a first particular geographic location during acquisition;

detecting that one or more non-camera sensors of the electronic device, indicate that the electronic device was located at a second particular geographic location during acquisition;

based on the above detecting operations, determining said mismatch, and denying said authentication request.

12. The method of claim 1,
wherein step (d) comprises:
determining a contradiction between
(A) time-of-day that is determined from image recognition analysis applied to said self-taken visual-acquisition input, and
(B) time-of-day that is reported by a GPS sensor or other location-determining sensor of said electronic device;
based on said contradiction, denying said authentication request.

13. The method of claim 1,
wherein step (d) comprises:
determining that there exists a contradiction between (I) spatial orientation of the electronic device as sensed by one or more non-camera spatial orientation sensors of the electronic device during acquisition, and (II) spatial orientation of the electronic device as determined from computer vision analysis of content shown in said self-taken visual-acquisition input;
based on said determining, denying said authentication request.

14. The method of claim 1,
wherein step (d) comprises:
determining that there exists a contradiction between (I) spatial orientation of the electronic device as sensed by one or more gyroscope sensors of the electronic device during acquisition, and (II) spatial orientation of the electronic device as determined from computer vision analysis of content shown in said self-taken visual-acquisition input;
based on said determining, denying said authentication request.

15. The method of claim 1,
wherein step (d) comprises:
determining that there exists a contradiction between (I) acceleration of the electronic device as sensed by one or more accelerometers of the electronic device during acquisition, and (II) acceleration of the electronic device as determined from computer vision analysis of content shown in said self-taken visual-acquisition input;
based on said determining, denying said authentication request.

16. The method of claim 1,
wherein step (d) comprises:
determining that there exists a contradiction between (I) spatial spinning characteristic of the electronic device as sensed by one or more spatial characteristic sensors of the electronic device during acquisition, and (II) spatial spinning characteristic of the electronic device as determined from computer vision analysis of content shown in said self-taken visual-acquisition input;
based on said determining, denying said authentication request.

17. The method of claim 1, wherein step (d) comprises:
determining that there exists a contradiction between (I) geographic location of the electronic device as sensed by a Global Positioning System (GPS) sensor of the electronic device during acquisition, and (II) geographic location of the electronic device as determined from computer vision analysis of content shown in said self-taken visual-acquisition input;
based on said determining, denying said authentication request.

18. The method of claim 1,
wherein step (d) comprises:
determining a contradiction between
(A) output of an image recognition analysis applied to said self-taken visual-acquisition input, and
(B) data sensed by one or more of (B1) accelerometer of the electronic device, (B2) gyroscope of the electronic device, (B3) spatial-orientation sensor of said electronic device, (B4) Global Positioning System (GPS) sensor of the electronic device, (B5) location-determining sensor of the electronic device;
based on said contradiction, denying said authentication request.

19. The method of claim 1,
wherein the user authentication process, that is based on said self-taken visual-acquisition input, is configured to authorize or deny user access to at least one of: said electronic device, an electronic mail account, a social network account, an online retailer account, an online banking account, a vehicle, a physical venue.

20. A non-transitory storage medium having stored thereon instructions that, when executed by one or more hardware processors, cause said one or more hardware processors to perform a method comprising:
(a) generating a user-authentication process for authenticating a user of an electronic device, wherein the user-authentication process utilizes a self-taken visual-acquisition input of said user, wherein the self-taken visual-acquisition input comprises one of: a self-taken image, a self-taken video;
(b) performing image recognition on content shown in said self-taken visual-acquisition input, and extracting a particular feature based on image recognition of said content;
(c) determining a characteristic of said electronic device, based on data sensed by one or more non-camera sensors of said electronic device during acquisition of said self-taken visual-acquisition input;
(d) detecting a mismatch between (I) said particular feature that was extracted in step (b) based on image recognition of the content of the self-taken visual-acquisition input, and (II) said characteristic of the electronic device that was determined in step (c) based on data sensed by said one or more non-camera sensors of said electronic device;
(e) based on said mismatch detected in step (d), denying an authentication request received from said electronic device
wherein step (d) comprises:
detecting that the content of the self-taken visual-acquisition input, indicates that the electronic device was held vertically during acquisition;
detecting that a spatial-orientation sensor of the electronic device, indicates that the electronic device was held non-vertically during acquisition;
based on the above detecting operations, determining said mismatch, and denying said authentication request.

21. A system comprising:
one or more processors, operably associated with one or more memory units,
wherein the one or more processors are configured:
(a) to generate a user-authentication process for authenticating a user of an electronic device, wherein the user-authentication process utilizes a self-taken visual-acquisition input of said user, wherein the self-taken visual-acquisition input comprises one of: a self-taken image, a self-taken video;

(b) to perform image recognition on content shown in said self-taken visual-acquisition input, and to extract a particular feature based on image recognition of said content;

(c) to determine a characteristic of said electronic device, based on data sensed by one or more non-camera sensors of said electronic device during acquisition of said self-taken visual-acquisition input;

(d) to detect a mismatch between (I) said particular feature that was extracted in (b) based on image recognition of the content of the self-taken visual-acquisition input, and (II) said characteristic of the electronic device that was determined in (c) based on data sensed by said one or more non-camera sensors of said electronic device;

(e) based on said mismatch detected in (d), to deny an authentication request from said electronic device wherein step (d) comprises:

detecting that the content of the self-taken visual-acquisition input, indicates that the electronic device was held vertically during acquisition;

detecting that a spatial-orientation sensor of the electronic device, indicates that the electronic device was held non-vertically during acquisition;

based on the above detecting operations, determining said mismatch, and denying said authentication request.

* * * * *